US012692395B2

(12) United States Patent　　(10) Patent No.: US 12,692,395 B2
Reinke et al.　　(45) Date of Patent: Jul. 28, 2026

(54) RECYCLING OF STEROL-CONTAINING ASPHALT BINDER

(71) Applicants: A.L.M. Holding Company, Onalaska, WI (US); Ergon Asphalt & Emulsions, Inc., Jackson, MS (US)

(72) Inventors: Gerald H. Reinke, La Crosse, WI (US); Gaylon L. Baumgardner, Arkadelphia, AR (US); Andrew Hanz, La Crosse, WI (US)

(73) Assignees: A.L.M. Holding Company, Onalaska, WI (US); Ergon Asphalt & Emulsions, Inc., Jackson, MS (US)

( * ) Notice: Subject to any disclaimer, the term of this patent is extended or adjusted under 35 U.S.C. 154(b) by 577 days.

(21) Appl. No.: 16/930,186

(22) Filed: Jul. 15, 2020

(65) Prior Publication Data

US 2021/0017386 A1　　Jan. 21, 2021

Related U.S. Application Data

(60) Provisional application No. 63/027,845, filed on May 20, 2020, provisional application No. 62/887,811, filed on Aug. 16, 2019, provisional application No. 62/874,196, filed on Jul. 15, 2019.

(51) Int. Cl.
| | |
|---|---|
| *C08L 95/00* | (2006.01) |
| *C04B 26/26* | (2006.01) |
| *E01C 7/14* | (2006.01) |
| *C08K 5/05* | (2006.01) |
| *G01Q 60/24* | (2010.01) |

(52) U.S. Cl.
CPC ............. *C08L 95/00* (2013.01); *C04B 26/26* (2013.01); *E01C 7/14* (2013.01); *C08K 5/05* (2013.01); *C08L 2207/22* (2013.01); *C08L 2555/10* (2013.01); *C08L 2555/34* (2013.01); *C08L 2555/52* (2013.01); *C08L 2555/64* (2013.01); *C08L 2555/74* (2013.01); *G01Q 60/24* (2013.01)

(58) Field of Classification Search
CPC ...................................................... C08L 95/00
See application file for complete search history.

(56) References Cited

U.S. PATENT DOCUMENTS

| | | | |
|---|---|---|---|
| 1,112,492 | A | 10/1914 | Turner, V |
| 2,280,843 | A | 4/1942 | Oliver et al. |
| 2,286,244 | A | 6/1942 | Whitacre et al. |
(Continued)

FOREIGN PATENT DOCUMENTS

| | | |
|---|---|---|
| CA | 3 026 997 A1 | 12/2017 |
| CL | 2011002791 A1 | 4/2012 |
(Continued)

OTHER PUBLICATIONS

Sterol Composition of 19 Vegetable Oils Itoh et al. JAOCS vol. 50 p. 122-125 Apr. 1973 (Year: 1973).*
(Continued)

*Primary Examiner* — Alexandra M Moore
(74) *Attorney, Agent, or Firm* — Kagan Binder, PLLC

(57) ABSTRACT

Disclosed are asphalt binder compositions and methods for making such compositions with sterol. The sterol improves various rheological and chemical properties of asphalt binder.

15 Claims, 73 Drawing Sheets
(73 of 73 Drawing Sheet(s) Filed in Color)

(56) References Cited

U.S. PATENT DOCUMENTS

| | | | |
|---|---|---|---|
| 2,392,863 A * | 1/1946 | Rudd | C08L 95/00 |
| | | | 106/269 |
| 2,411,634 A | 11/1946 | Pearson | |
| 2,585,336 A | 2/1952 | McCoy | |
| 2,715,638 A | 8/1955 | Albrecht et al. | |
| 2,728,682 A | 12/1955 | Kalinowski et al. | |
| 2,793,138 A | 5/1957 | Wilkinson | |
| 2,860,067 A | 11/1958 | Crews et al. | |
| 3,032,507 A | 5/1962 | Wright | |
| 3,044,373 A | 7/1962 | Sommer | |
| 3,556,827 A | 1/1971 | McConnaughay | |
| 3,691,211 A | 9/1972 | Julian | |
| 3,926,936 A | 12/1975 | Lehtinen | |
| 3,951,676 A | 4/1976 | Elste, Jr. | |
| 4,044,031 A | 8/1977 | Johansson et al. | |
| 4,549,834 A * | 10/1985 | Allen | E01C 19/1004 |
| | | | 404/75 |
| 4,874,432 A | 10/1989 | Kriech et al. | |
| 5,234,494 A * | 8/1993 | Sawatzky | C08L 95/00 |
| | | | 106/284.4 |
| 5,437,717 A | 8/1995 | Doyle et al. | |
| 5,473,000 A | 12/1995 | Pinomaa | |
| 5,496,400 A | 3/1996 | Doyle et al. | |
| 6,027,557 A | 2/2000 | Hayner | |
| 6,057,462 A | 5/2000 | Robinson et al. | |
| 6,107,456 A | 8/2000 | Huibers et al. | |
| 6,770,127 B2 | 8/2004 | Kriech et al. | |
| 6,987,207 B1 | 1/2006 | Ronyak | |
| 7,448,825 B2 | 11/2008 | Kasahara et al. | |
| 7,575,767 B2 | 8/2009 | May et al. | |
| 7,576,148 B2 | 8/2009 | Kluttz et al. | |
| 7,811,372 B2 | 10/2010 | Nigen-Chaidron et al. | |
| 8,440,011 B2 | 5/2013 | Naidoo et al. | |
| 8,513,338 B2 | 8/2013 | Rodrigues | |
| 8,696,806 B2 | 4/2014 | Williams et al. | |
| 8,741,052 B2 | 6/2014 | Naidoo et al. | |
| 8,821,064 B1 | 9/2014 | Morris et al. | |
| 9,481,794 B2 | 11/2016 | Cox | |
| 9,828,506 B2 | 11/2017 | Grady et al. | |
| 9,994,485 B2 | 6/2018 | Warner et al. | |
| 10,030,145 B2 | 7/2018 | Severance et al. | |
| 10,077,356 B2 | 9/2018 | Fini | |
| 10,167,390 B2 | 1/2019 | Cox | |
| 10,669,202 B2 | 6/2020 | Reinke et al. | |
| 10,793,720 B2 | 10/2020 | Puchalski et al. | |
| 10,961,395 B2 | 3/2021 | Williams et al. | |
| 11,097,981 B2 | 8/2021 | Reinke et al. | |
| 11,124,926 B2 | 9/2021 | Fennell et al. | |
| 11,168,214 B2 | 11/2021 | Reinke et al. | |
| 11,427,697 B2 | 8/2022 | Reinke et al. | |
| 11,542,668 B2 | 1/2023 | Reinke et al. | |
| 11,667,570 B2 | 6/2023 | Reinke et al. | |
| 11,718,756 B2 | 8/2023 | Reinke et al. | |
| 11,760,882 B2 | 9/2023 | Reinke et al. | |
| 11,912,874 B2 | 2/2024 | Reinke et al. | |
| 12,084,577 B2 | 9/2024 | Reinke et al. | |
| 12,163,294 B2 | 12/2024 | Reinke et al. | |
| 12,234,189 B2 | 2/2025 | Reinke et al. | |
| 2003/0087789 A1 | 5/2003 | Scheffler | |
| 2003/0144536 A1 | 7/2003 | Sonnier et al. | |
| 2007/0122235 A1 | 5/2007 | Kasahara et al. | |
| 2007/0151480 A1 | 7/2007 | Bloom et al. | |
| 2010/0170417 A1 | 7/2010 | Naidoo et al. | |
| 2010/0190892 A1 | 7/2010 | Binkley | |
| 2010/0227954 A1 | 9/2010 | Naidoo et al. | |
| 2010/0305342 A1 | 12/2010 | Wong et al. | |
| 2010/0319577 A1 | 12/2010 | Naidoo et al. | |
| 2011/0020519 A1 | 1/2011 | Bowman et al. | |
| 2012/0060722 A1 | 3/2012 | Montpeyroux et al. | |
| 2014/0234027 A1 | 8/2014 | Morris | |
| 2014/0338565 A1 | 11/2014 | Severance et al. | |
| 2015/0087753 A1 | 3/2015 | Koleas et al. | |
| 2015/0329702 A1 | 11/2015 | Hwang et al. | |
| 2016/0122507 A1 | 5/2016 | Cox | |
| 2016/0160453 A1 | 6/2016 | Donelson | |
| 2016/0304718 A1 | 10/2016 | Bindschedler et al. | |
| 2016/0362338 A1 * | 12/2016 | Reinke | C08K 5/05 |
| 2017/0370899 A1 | 12/2017 | Porot et al. | |
| 2018/0171146 A1 | 6/2018 | Allen et al. | |
| 2018/0209102 A1 | 7/2018 | Baumgardner et al. | |
| 2018/0215919 A1 | 8/2018 | Reinke et al. | |
| 2019/0152850 A1 | 5/2019 | Warner et al. | |
| 2019/0153229 A1 | 5/2019 | Reinke et al. | |
| 2019/0265221 A1 | 8/2019 | Reinke et al. | |
| 2020/0207944 A1 | 7/2020 | Reinke et al. | |
| 2020/0277497 A1 | 9/2020 | Reinke et al. | |
| 2021/0380477 A1 | 12/2021 | Reinke et al. | |
| 2022/0195193 A1 | 6/2022 | Reinke et al. | |
| 2022/0251387 A1 | 8/2022 | Reinke et al. | |
| 2023/0128467 A1 | 4/2023 | Reinke et al. | |
| 2023/0257303 A1 | 8/2023 | Reinke et al. | |
| 2023/0323126 A1 | 10/2023 | Reinke et al. | |
| 2025/0067004 A1 | 2/2025 | Reinke et al. | |
| 2025/0075078 A1 | 3/2025 | Reinke et al. | |

FOREIGN PATENT DOCUMENTS

| | | | |
|---|---|---|---|
| CL | 2014002871 A1 | 7/2015 | |
| CN | 103387749 A | 11/2013 | |
| CN | 104245850 A | 12/2014 | |
| CN | 104364318 A | 2/2015 | |
| CN | 104629392 A | 5/2015 | |
| CN | 110799597 A | 2/2020 | |
| EP | 1 728 831 A1 | 12/2006 | |
| EP | 2 966 128 A1 | 1/2016 | |
| GB | 233430 A * | 2/1924 | C08L 95/005 |
| GB | 575484 A | 2/1946 | |
| JP | 53-37724 A | 4/1978 | |
| JP | 56-20052 A | 2/1981 | |
| JP | H10-81827 A | 3/1998 | |
| JP | H11-60960 A | 3/1999 | |
| JP | 2005-154465 A | 6/2005 | |
| JP | 2012-093108 A | 5/2012 | |
| JP | 2016-509611 A | 3/2016 | |
| WO | 01/072315 A1 | 10/2001 | |
| WO | 2004/016336 A1 | 2/2004 | |
| WO | 2010/110651 A1 | 9/2010 | |
| WO | 2010/128105 A1 | 11/2010 | |
| WO | 2013/090283 A1 | 6/2013 | |
| WO | 2013/163467 A1 | 10/2013 | |
| WO | WO-2013163463 A1 * | 10/2013 | C08K 3/34 |
| WO | 2014/047462 A1 | 3/2014 | |
| WO | 2015/070180 A1 | 5/2015 | |
| WO | 2016/065270 A1 | 4/2016 | |
| WO | 2016/073442 A1 | 5/2016 | |
| WO | 2017/011747 A1 | 1/2017 | |
| WO | 2017/027096 A2 | 2/2017 | |
| WO | 2017/213692 A1 | 12/2017 | |
| WO | 2017/213693 A1 | 12/2017 | |
| WO | 2018/031540 A1 | 2/2018 | |
| WO | 2018/144731 A1 | 8/2018 | |
| WO | 2019/023172 A1 | 1/2019 | |
| WO | 2019/079101 A1 | 4/2019 | |
| WO | 2021/011704 A1 | 1/2021 | |
| WO | 2022/232119 A1 | 11/2022 | |

OTHER PUBLICATIONS

Faller, R., "Chapter 1.6: Sterols and Sterol Induced Phases," from UCD Biophysics 241: Membrane Biology, Mar. 2021, 4 pp.

International Search Report and Written Opinion of International Application No. PCT/US2022/026310, mailed Jul. 11, 2022, 11 pp.

International Search Report and Written Opinion of International Application No. PCT/US2018/016451, mailed May 8, 2018, 18 pp.

International Search Report and Written Opinion of International Application No. PCT/US2020/042203, mailed Oct. 15, 2020, 27 pp.

King et al., "Temperature Dependent Imaging of Aged Asphalt Binders using AFM," Petersen Asphalt Research Conference, Jul. 2019, 28 pp.

Reinke et al., "Retardation of Binder Aging Using Sterol Chemistry—Focused on Re-Aging Properties of Treated Binder Based on Theological & Compositional Properties for Six Treatments & Four

(56) References Cited

OTHER PUBLICATIONS

Aging Levels," Petersen Asphalt Research Conference, Jul. 2019, 41 pp.

"B-Sitosterol from Soybeans" downloaded from http://www.mpbio.com/product.php?pid=02102886, May 21, 2015, 2 pages.

"Material Safety Data Sheet (Aug. 8, 2013)", Sylfat.TM. DP8, Arizona Chemical Company LLC, 7 pages.

"Product Data Sheet from MP Biomedicals Website", Catalog No. 102886, beta-Sitosterol, 2015, 1 page.

"Refining and Properties of Asphalt Binders", Asphalt Handbook, 7th Edition, 2007, 2 pages.

"Sylvaroad.TM. RP 1000 Performance Additive", Safety Data Sheet, Arizona Chemical Company LLC, Apr. 1, 2015, 7 pages.

"Tall Oil Fatty Acid", Ataman Kimya, retrieved on Aug. 10, 2021, 8 pages.

"Tallex Pitch", Ingevity Holdings SPRL, Safety Data Sheet, Jul. 21, 2017, 12 pages.

"Wood Chemistry PSE 406/Chem E 470, Lecture 13, Diterpenes and Triterpenes", Wood Chemistry, 2015, 5 pages.

Allen, et al. (2013) "Microstructural Characterization of the Chemo-Mechanical Behavior of Asphalt in Terms of Aging and Fatigue Performance Properties", UMI Dissertation Publishing, Proquest LLC., 162 pages.

Anderson, et al. (1994) "Binder Characterization and Evaluation, vol. 3: Physical Characterization", SHRP-A-369, Strategic Highway Research Program, 4 pages.

Anonymous, (2001), "Standard Test Method for Determining the Flexural Creep Stiffness of Asphalt Mixtures Using the Bending Beam Rheometer (BBR)", ASTM D 6648-01, pp. 1-22, Retrieved from the Internet: http://www.eng. auburn.edu/research/centers/ncat/rap/files/meetings/05-10/aashto-draft-sp- ecs.pdf.

Anonymous, (2016), "The Use of REOB/VTAE in Asphalt (IS-235)", Asphalt Institute, pp. 1-87, Retrieved from the Internet: URL:http://www.asphaltinstitute.org/wp-content/uploads/IS235_REOB_VTAE_Asphaltinstitute.pdf (retrieved on: Mar. 20, 2017).

Arnaud, et al. (2009) "Digging into Asphaltenes", Analytical Chemistry, 87(38), downloaded from http://pubs.acs.Urg/cen/coverstory/87/8738cover.html, 7 pages.

ASTM D6521-13 (2013) "Standard Practice for Accelerated Aging of Asphalt Binder Using a Pressurized Aging Vessel (PAV)", ASTM International, 6 pages.

B-Sitosterol Powder, Supplier: MP Biomedicals, Printed from VWR Website, Date: Jun. 9, 2016,1 page.

Cantrill, Richard (2008) "Phytosterols, Phytostanols and Their Esters, Chemical and Technical Assessment", 69th JECFA, 13 pages.

Cao, et al. (2011) "Chemical Structures of Swine-Manure Chars Produced under Different Carbonization Conditions Investigated by Advanced Solid-State 13C Nuclear Magnetic Resonance (NMR) Spectroscopy ", Energy Fuels, 25:388-397.

Cox, Russell Brian "Asphalt Binders Containing a Glyceride and Fatty Acid Mixture and Methods for Making and Using Same", U.S. Appl. No. 62/074,526, filed Nov. 3, 2014, 64 pages.

Endo, Yasushi (1990) "Minor Components in Edible Fats and Oils" Oil Chemistry, 39(9):611-617 (English Abstract on p. 611).

Farrar, et al. (2012) "Thin Film Oxidative Aging and low Temperature Performance Grading using Small Plate Dynamic Shear Rheometry: An Alternative to Standard RTFO, PAV, and BBR", 5th Eurasphalt & Eurobitume Congress, 10 pages.

Fini et al. (2012) "Application of Swine Manure in Development of Bio-Adhesive", Allen D. Leman Swine Conference, p. 244.

Fini, et al. (2010) "Characterization and Application of Manure-Based Bio-Binder in Asphalt Industry", Transportation Research Board 89th Annual Meeting, 14 pages.

Fini, et al. (2011) "Chemical Characterization of Biobinder from Swine Manure: Sustainable Modifier for Asphalt Binder", Journal of Materials in Civil Engineering, 23(11):1506-1513.

Fini, et al.(2011) "Application of Bio-Binder from Swine Manure in Asphalt Binder", Annual Meeting, 15 pages.

Hanz, et al. (2017) "Extended Aging of RAS Mixes with Rejuvenator," Binder expert Task Group Meeting, Aug. 10, 2016, 40 pages, retrieved from the internet: URL:https://www.asphaltpavement.org/PDFs/Engineering_ETGs/Binder_201609/06 Hanz Extened Aging of RAS Mixes with Rejuvenator.pdf., retrieved on Nov. 23, 2017.

Harhar, et al., "Chemical Characterization and Oxidative Stability of Castor Oil Grown in Morocco", Moroccan Journal of Chemistry, 4(2):279-284.

Hill, (2015) "The When, How and Benefits of Using Thinlays for Pavement Preservation", Equipment World, 9 pages.

Holmbom, et al., (1978), "Compostion of Tall Oil Pitch", Journal of the American Oil Chemist's Society, 55:342-344.

International Search Report and Written Opinion for International Application No. PCT/US2016/037077, dated Apr. 5, 2017, 20 pages.

International Search Report and Written Opinion for International Application No. PCT/US2016/064950, dated Apr. 19, 2017, 12 pages.

International Search Report and Written Opinion for International Application No. PCT/US2016/064961, dated Apr. 5, 2017, 23 pages.

International Search Report and Written Opinion for International Application No. PCT/US2017/045887, dated Dec. 8, 2017, 13 pages.

International Search Report and Written Opinion for International Application No. PCT/US2018/043387, dated Nov. 28, 2018, 17 pages.

International Search Report and Written Opinion for International Application No. PCT/US2018/055443, mailed on Jan. 31, 2019, 14 pages.

International Search Report and Written Opinion for International Application No. PCT/US2020/042202, dated Oct. 15, 2020, 24 pages.

Jarde, et al. (2007) "Using Sterols to Detect Pig Slurry Contribution to Soil Organic Matter", Water Air Soil Pollut, 178:169-178.

Kriz, et al. (2007) "Glass Transition and Phase Stability in Asphalt Binders", Road Materials and Pavements Design, 30 pages.

Logan, R.L., (Nov. 1979) "Tall Oil Fatty Acids", Journal of American Oil Chemists Society, 56:777A-779A.

Loughrin, et al. (2006) "Free Fatty Acids and Sterols in Swine Manure", Journal of Environmental Science and Health, Part B, 41:31-42.

Martin, et al. (2015) "The Effects of Recycling Agents on Asphalt Mixtures with High RAS and RAP Binder Ratios, Project N 9-58", National Cooperative Highway Research Program Transportation Research Board of the National Academics, pp. 1-184.

Material Safety Data Sheet, Catalog No. 102886, Revision date: Apr. 26, 2006, Product Name: beta-Sitosterol Practical Grade, 5 pages.

McSweeney, et al. (Jan. 1, 1987) "Composition of Crude Tall Oil & Fractionation Products (Chapter 2)" in "Tall Dil and Its Uses—II", Pulp Chemicals Association, 6 pages.

Mogawer, et al. (2012) "Performance Characteristics of High Rap Bio-Modified Asphalt Mixtures", Transportation Research Board 91st Annual Meeting, 16 pages.

Muhlen, et al., Introduction to Atomic Force Microscopy and its Application to the Study of Lipid Nanoparticles , Chapter 7 in Particle and Surface Characterization Methods, ISBN 3887630572, pp. 98-127.

Overney, et al. (1992) "Friction Measurement on Phase-Separated Thin Films with a Modified Atomic Force Microscope", Nature, 359:133-135.

Reinke, et al. (2015) "Further Investigations Into the Impact of REOB & Paraffinic Oils on the Performance of Bitiminous Mixtures", Binder ETG Meeting, Fall River, MA, pp. 1-92.

Reinke, et al. (2017) "Extended Aging of RAS Mixes with Rejuvenator (An Update)", Binder Expert Task Group Meeting, May 4, 2017, retrieved from the internet: URL: https://www.asphaltpavement.org/PDFs/Engineering_ETGs/Binder_201705/1-2_Reinke&Hanz_UpdateExtendedAgingofRAS.pdf, retrieved on Nov. 23, 2017, 34 pages.

(56)         References Cited

OTHER PUBLICATIONS

Reinke, et al. (2017) "Investigation of Sterol Chemistry to Retard the Aging of Asphalt Binders", Transportation Research Record, 2633:127-135.

Rossi, et al. (2017) "Adhesion Promoters in Bituminous Road Materials: A Review", Applied Sciences, 7(524):1-10.

Rowe, (2015), "Asphalt Modification", The 56th Illinois Bituminous Paving Conference, Champaign, Illinois, USA, pp. 1-42.

Wang et al., "Study of extraction of phytosterol from masson pine raw tall oil," Journal of Wood Science, vol. 48, No. 6, Dec. 2002, pp. 505-511 (XP002580474).

Zaumanis et al., "Evaluation of Rejuvenator's Effectiveness with Conventional Mix Testing for 100% Reclaimed Asphalt Pavement Mixtures," Transportation Research Board of the National Academies, vol. 2370, No. 1, Jan. 2013, pp. 17-25. (XP055526878).

Zaumanis et al., "Influence of six rejuvenators on the performance properties of Reclaimed Asphalt Pavement (RAP) binder and 100% recycled asphalt mixtures," Construction and Building Materials, vol. 71, Sep. 2014, pp. 538-550. (XP029080483).

Rowe, (2016), "[Delta]Tc-Some Thoughts on the Historical Development," Binder ETG Meeting, pp. 1-43.

Rubab, et al. (2011) "Effects of Engine Oil Residues on Asphalt Cement Quality", Canadian Technical Asphalt Association Conference, 12 pages.

Sui, et al. (2010) "New Technique for Measuring Low-Temperature Properties of Asphalt Binders with Small Amounts of Material", Transportation Research Record, vol. 2179, Transportation Research Board, Washington, DC, pp. 23-28.

Sui, et al. (2011) "New Low-Temperature Performance-Grading Method: Using 4-mm Parallel Plates on a Dynamic Sher Rheometer," Transportation Research Record, 2207:43-48.

Takano, et al., (1999), "Chemical and Biochemical Analysis Using Scanning Force Microscopy", Chemical Reviews, 99(10):2845-2890.

Verleyan et al. (2002), "Influence of the Vegetable Oil Refining Process on Free and Esterified Sterols", Journal of the American Oil Chemists' Society, 8 pages.

Verleyan et al. (2002), "Analysis of Free and Esterified Sterols in Vegetable Oils", Journal of the American Oil Chemists' Society, 7 pages.

Wakefield, Amma (Aug. 15, 2018) "ΔTc: A Parameter to Monitor Asphalt Binder's Kryptonite" Asphalt, 33(2):24-27.

Yan, et al., (2011), "Recovery of Phytosterols from Waste Residue of Soybean Oil Deodorizer Distillate", Soybean—Applications and Technology, 13 pages.

Zaumanis, et al. (2014) "Evaluation of Different Recycling Agents for Restoring Aged Asphalt Binder and Performance of 100 % Recycled Asphalt", Materials and Structures, 48(8):2475-2488.

Allen, Robert, "Structural Characterization of Micromechanical Properties in Asphalt Using Atomic Force Microscopy," Thesis, Office of Graduate Studies at Texas A&M University for a Master of Science Degree, Dec. 2010, pp. 104.

Alvarez-Henao et al., "Supercritical fluid extraction of phytosterols from sugarcane bagasse: Evaluation of extraction parameters," The Journal of Supercritical Fluids, vol. 179, Oct. 2021, 105427. (8 pp).

Appleton et al., "The Sterol Content of Fungi II. Screening of Representative Yeasts and Molds for Sterol Content," Applied Microbiology Applied Microbiology, vol. 3, No. 4, Mar. 1955, pp. 249-251.

"Sterols" retrieved from http://www.cyberlipid.org/sterols/ster0003. htm, Nov. 2016, 22 pp.

Weete et al., "Phylogenetic Distribution of Fungal Sterols," PLoS ONE, vol. 5, No. 5, May 2010, e10899, p. 6.

Anderson et al., "Evaluation of the Relationship Between Asphalt Binder Properties and Non-Load Related Cracking," Journal of the Association of Asphalt Paving Technologies, vol. 80, 2011, pp. 615-664. (Abstract Only).

Carden et al., "Dietary Plant Sterol Esters Must be Hydrolyzed to Reduce Intestinal Cholesterol Absorption in Hamsters," The Journal of Nutrition Biochemical, Molecular, and Genetic Mechanisms, vol. 145, No. 7, May 2015, pp. 1402-1407.

Carr et al., "Stearate-Enriched Plant Sterol Esters Lower Serum LDL Cholesterol Concentration in Normo- and Hypercholesterolemic Adults," The Journal of Nutrition Biochemical, Molecular and Genetic Mechanisms, vol. 139, No. 8, Jun. 2009, pp. 1445-1450.

"Distilled Tall Oil, Crops—Identification of Petitioned Substance," CAS No. 8002-26-4, Technical Evaluation Report compiled by Savan Group for the USDS National Organic Program, Aug. 12, 2021, 18 pp.

Fernandes et al., "Phytosterols: Applications and recovery methods," Bioresource Technology, vol. 98, No. 12, Nov. 2006, pp. 2335-2350.

Davis, "Preventing and repairing potholes and pavement cracks" Asphalt magazine, https://www.asphaltmagazine.com/preventing-and-repairing-potholes-and-pavement-cracks/, Aug. 2, 2011, pp. 4.

Asphalt Magazine, "Applications for asphalt emulsions" Asphalt magazine, https://www.asphaltmagazine.com/applications-for-asphalt-emulsions/, Oct. 27, 2008, pp. 4.

ASTM D312/D312M-16a "Standard Specification for Asphalt Used in Roofing," ASTM International, Reapproved 2023, 2 pages.

Jianying et al., "Aging and Anti-Aging of Asphalt Materials," Wuhan University of Technology Press, Dec. 2012, w-Eng. Trans. pp. 14.

Mercado et al., "Asphalt emulsions formulation: State-of-the-art and dependency of formulation on emulsions properties," Construction and Building Materials, vol. 123, Oct. 2016, pp. 162-173. (Abstract Only).

Ex parte Gerald H. Reinke, Gaylon L. Baumgardner, and Andrew Hanz, Appeal No. 2025-001519, Decision on Appeal in U.S. Appl. No. 15/179,858, Patent Trial and Appeal Board, Dec. 4, 2025. 13 pages.

\* cited by examiner

PLOT OF ASPHALTENE CONCENTRATION AS A FUNCTION OF BINDER AGING FOR AGED BASE BINDER WITH 0%, 0.5%, 2.5%, 5%, 7.5%, 10% & 12.5% STEROL LOADING

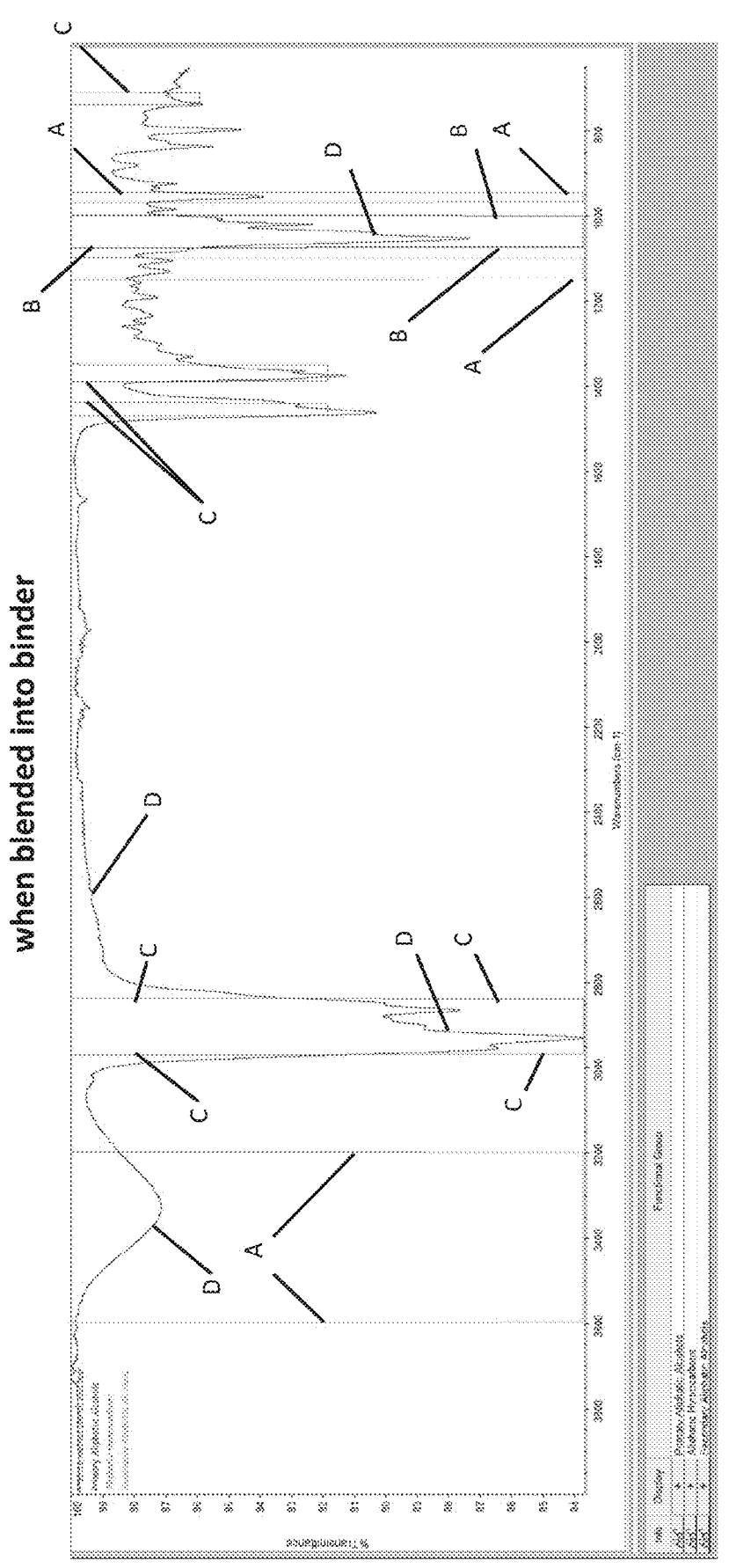

FTIR spectra of pure phytosterol showing regions related to alcohol functionality, regions of interest Are the 1150 to 950 cm⁻¹ wavenumbers; the broad region centered around 3325 cm⁻¹ nearly disappears when blended into binder A: Light blue banded regions denote secondary aliphatic alcohols
B: Light purple banded regions denote primary aliphatic alcohols
C: Light green banded regions denote aliphatic hydrocarbons
D: Red regions denote the FTIR Transmittance Spectrum for pure phytosterol

Fig. 2

An enlarged plot of the wavenumber region of interest for sterols. The relevant peaks are identified and labeled. The primary aliphatic alcohol peaks at 1054 & 1021 cm⁻¹ aren't prominent in when blended into binders. Based on our analysis the primary region of interest for sterol is 1145 to 943 cm⁻¹

An enlarged plot of the FTIR subtraction result for 60-hour PAV with 5% sterol minus the FTIR of 60-hour PAV with no sterol. The area in the region 1145 to 943 cm⁻¹ was 0.0649

An enlarged plot of the subtraction result for FTIR of 60-hour PAV of 50/50 blend of 0% Sterol and 10% sterol minus FTIR of 60-hour PAV with no sterol. The area in the region 1145 to 943 cm$^{-1}$ was 0.0639

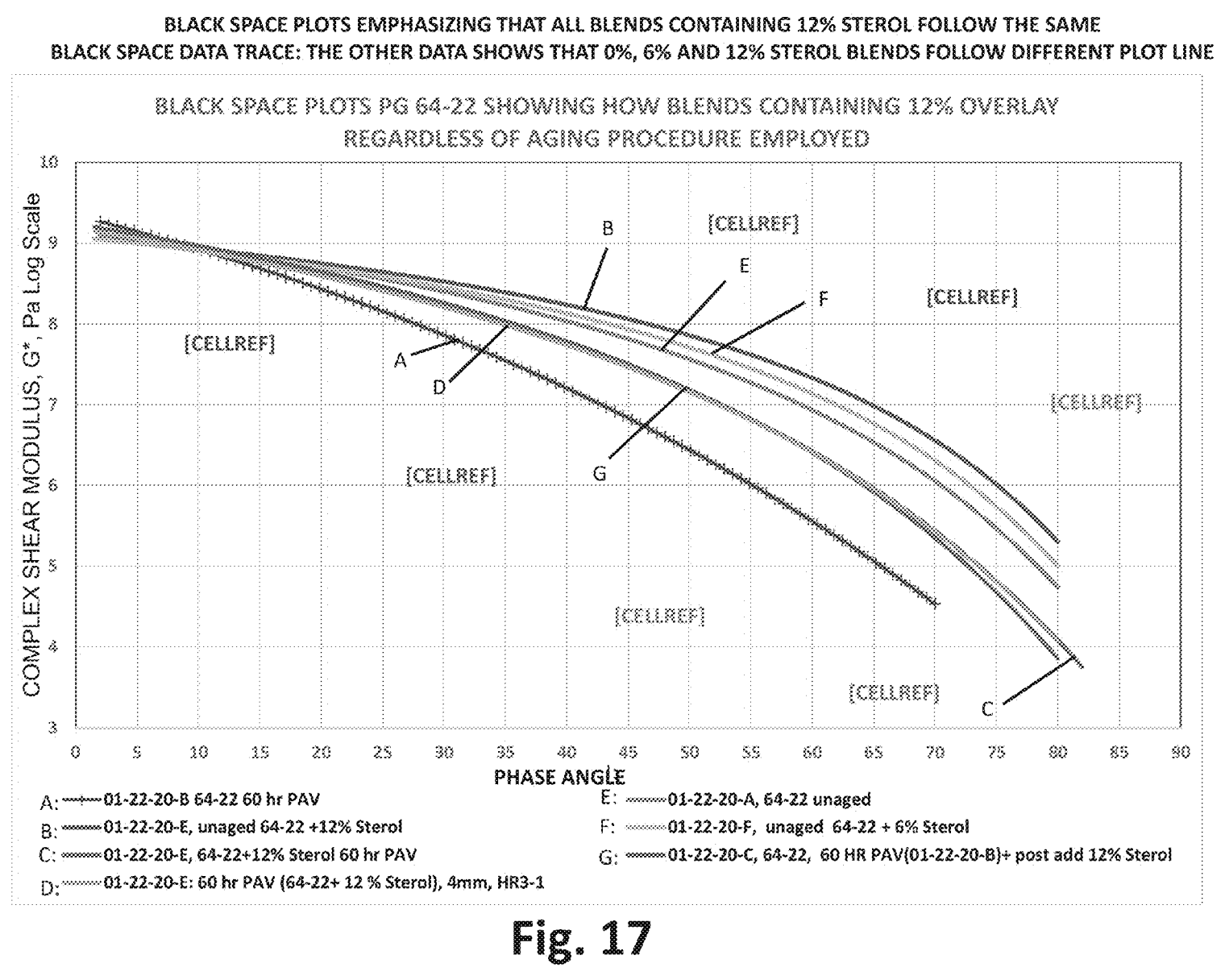

BLACK SPACE PLOTS EMPHASIZING THAT ALL BLENDS CONTAINING 12% STEROL FOLLOW THE SAME
BLACK SPACE DATA TRACE: THE OTHER DATA SHOWS THAT 0%, 6% AND 12% STEROL BLENDS FOLLOW DIFFERENT PLOT LINE

BLACK SPACE PLOTS PG 64-22 SHOWING HOW BLENDS CONTAINING 12% OVERLAY
REGARDLESS OF AGING PROCEDURE EMPLOYED

PHASE ANGLE

COMPLEX SHEAR MODULUS, G*, Pa Log Scale

A: ——— 01-22-20-B 64-22 60 hr PAV
B: ——— 01-22-20-E, unaged 64-22 +12% Sterol
C: ——— 01-22-20-E, 64-22+12% Sterol 60 hr PAV
D: ——— 01-22-20-E: 60 hr PAV (64-22+ 12 % Sterol), 4mm, HR3-1

E: ——— 01-22-20-A, 64-22 unaged
F: ——— 01-22-20-F, unaged 64-22 + 6% Sterol
G: ——— 01-22-20-C, 64-22, 60 HR PAV(01-22-20-B)+ post add 12% Sterol

Fig. 17

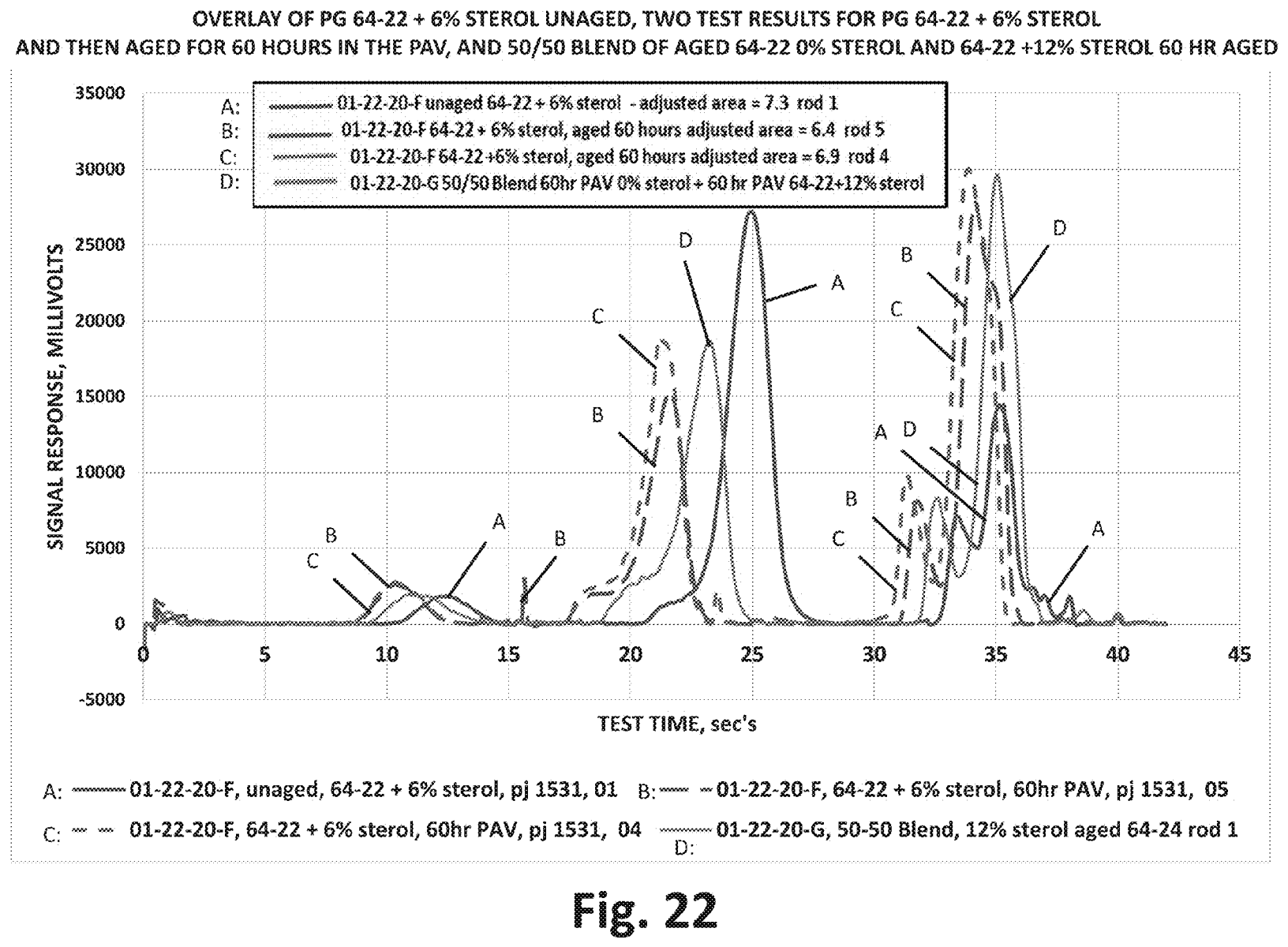

OVERLAY OF PG 64-22 + 6% STEROL UNAGED, TWO TEST RESULTS FOR PG 64-22 + 6% STEROL AND THEN AGED FOR 60 HOURS IN THE PAV, AND 50/50 BLEND OF AGED 64-22 0% STEROL AND 64-22 +12% STEROL 60 HR AGED

A:     01-22-20-F unaged 64-22 + 6% sterol - adjusted area = 7.3 rod 1
B:     01-22-20-F 64-22 + 6% sterol, aged 60 hours adjusted area = 6.4 rod 5
C:     01-22-20-F 64-22 +6% sterol, aged 60 hours adjusted area = 6.9 rod 4
D:     01-22-20-G 50/50 Blend 60hr PAV 0% sterol + 60 hr PAV 64-22+12% sterol TEST TIME, sec's

SIGNAL RESPONSE, MILLIVOLTS

A: ——— 01-22-20-F, unaged, 64-22 + 6% sterol, pj 1531, 01   B: ——— 01-22-20-F, 64-22 + 6% sterol, 60hr PAV, pj 1531, 05
C: — — 01-22-20-F, 64-22 + 6% sterol, 60hr PAV, pj 1531, 04   D: ——— 01-22-20-G, 50-50 Blend, 12% sterol aged 64-24 rod 1

Fig. 22

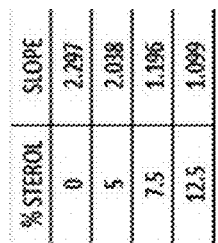
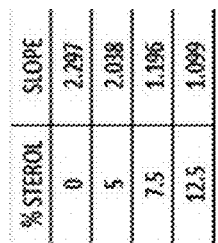
Fig. 35

| % Sterol | R² | Slope |
|---|---|---|
| 0 | 0.81 | 243 |
| 0.5 | 0.99 | 325 |
| 2.5 | 0.95 | 329 |
| 5 | 0.99 | 288 |
| 7.5 | 1.0 | 285 |
| 10 | 0.99 | 342 |
| 12.5 | 0.99 | 249 |

Experimental Details

- Specimens thermally deposited on 20mm AFM puck at 135°C. Annealed for 5 minutes.

- Imaging temperature started at 50°C and reduced to 20°C (Room Temperature) via heating stage with feedback in 5°C increments

- Agilent 5500 AFM

- Mikromasch NSC15 cantilever

- Acoustic AC Imaging yields topographic and phase images

Morphology at 50 °C

Topological Analysis

60 HR PAV Aged Asphalt Binder

Average Height: 15.3 nm
(Average of 20 line profiles)

Topological Analysis

60 HR PAV Aged Asphalt Binder with 12.5% Sterol

Average Height: 2.8 nm
(Averaged over 20 line profiles)

40 °C

Topological Analysis
60 HR PAV Aged Asphalt Binder
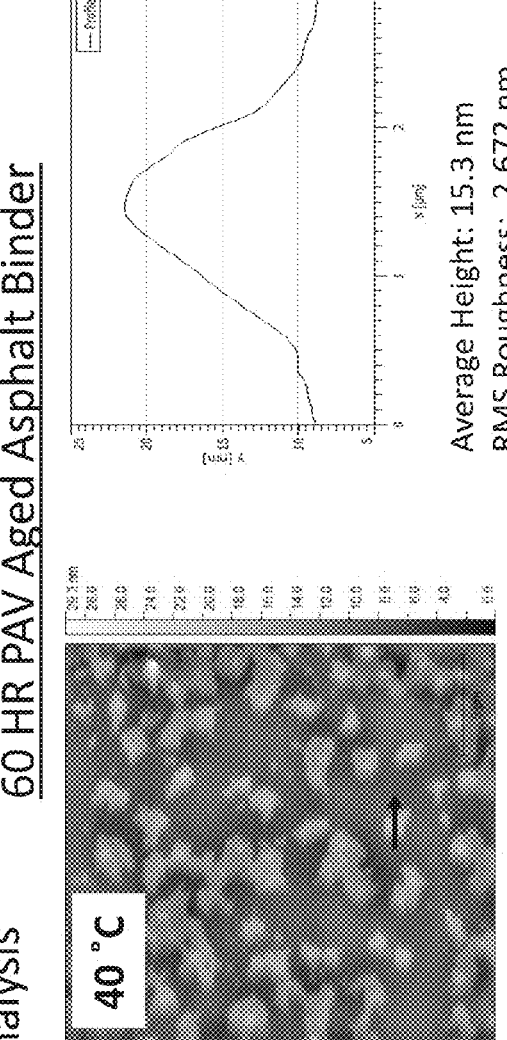
Average Height: 15.3 nm
RMS Roughness: 2.672 nm
60 HR PAV Aged Asphalt Binder with 12.5% Sterol
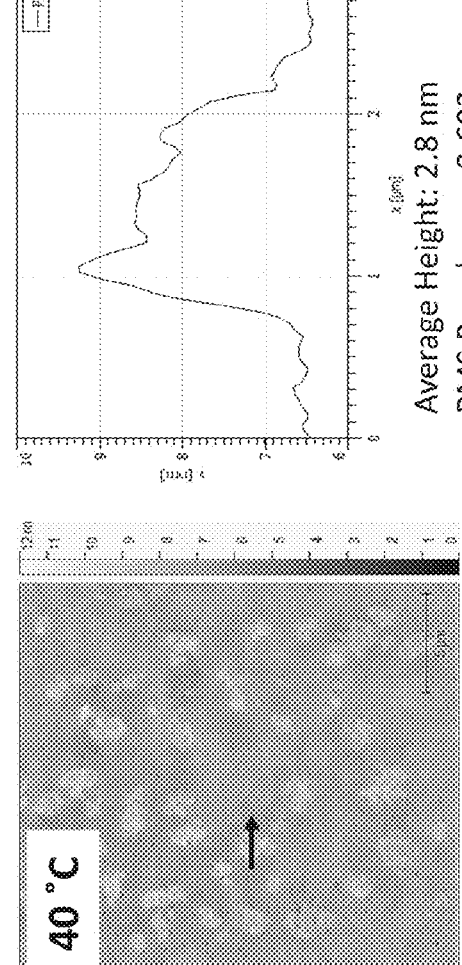
Average Height: 2.8 nm
RMS Roughness: 0.692 nm
Fig. 51

Topology – Phase Analysis

Topology – Phase Analysis
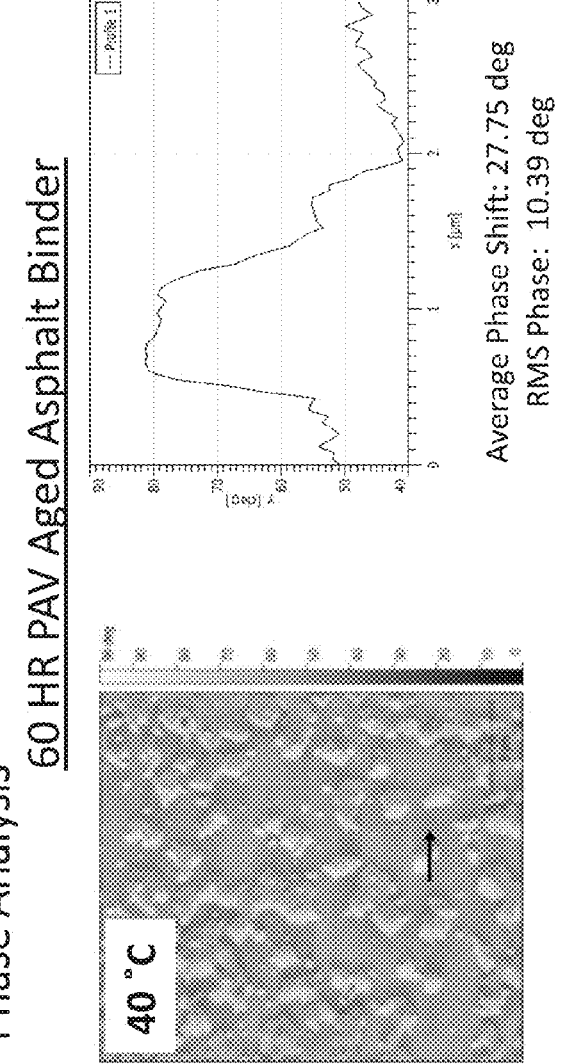
60 HR PAV Aged Asphalt Binder
Average Phase Shift: 27.75 deg
RMS Phase: 10.39 deg
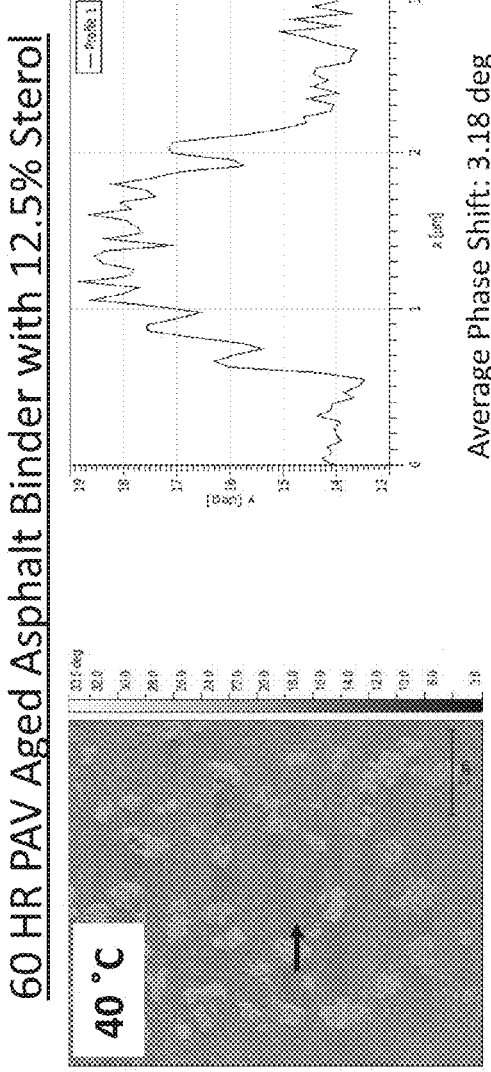
60 HR PAV Aged Asphalt Binder with 12.5% Sterol
Average Phase Shift: 3.18 deg
RMS Phase: 1.855 deg
Fig. 54

Morphology at Room Temperature

60 HR PAV Aged Asphalt Binder

Average Height: 15.8 nm (multiple levels)
RMS Roughness: 5.015 nm

20 °C

60 HR PAV Aged Asphalt Binder with 12.5% Sterol

Average Height: 3.6 nm
RMS Roughness: 1.58 nm

20 °C

Morphology at Room Temperature

60 HR PAV Aged Asphalt Binder with 12.5% Sterol

20 °C

Surface relaxes with "Bee" Structures.

Morphology at Room Temperature
60 HR PAV Aged Asphalt Binder with 12.5% Sterol
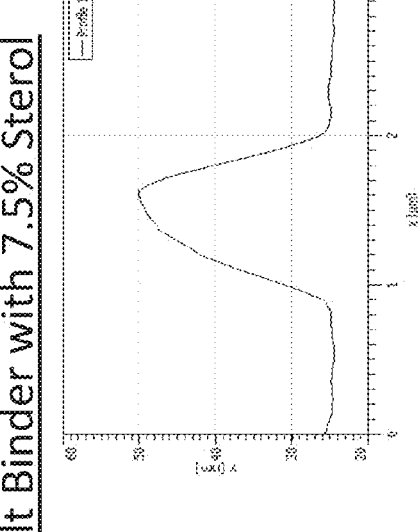
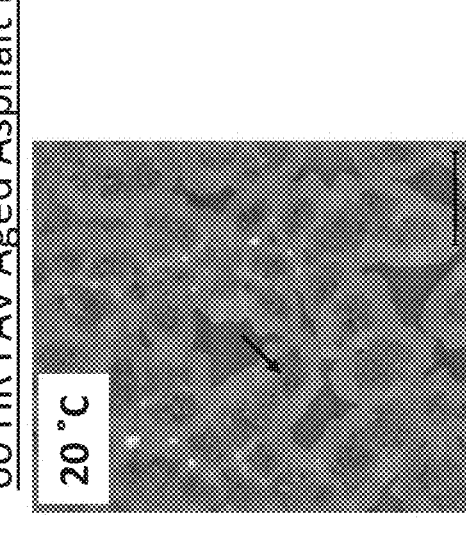
Average Height: 3.6 nm
RMS Roughness: 2.672 nm
60 HR PAV Aged Asphalt Binder with 7.5% Sterol
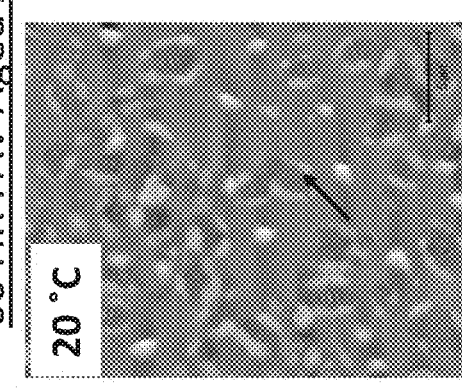
Average Height: 14.4 nm
RMS Roughness: 4.215 nm
Fig. 59

Morphology at Room Temperature
60 HR PAV Aged Asphalt Binder with 12.5% Sterol
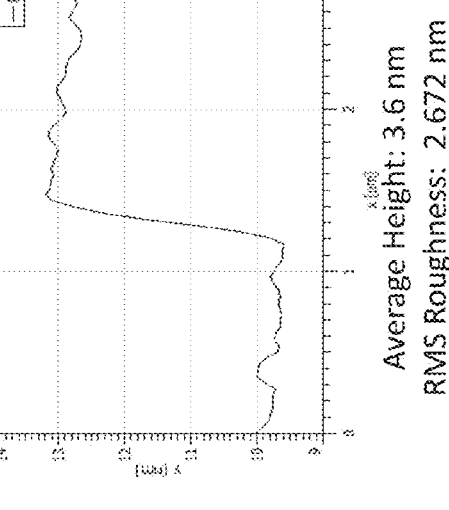
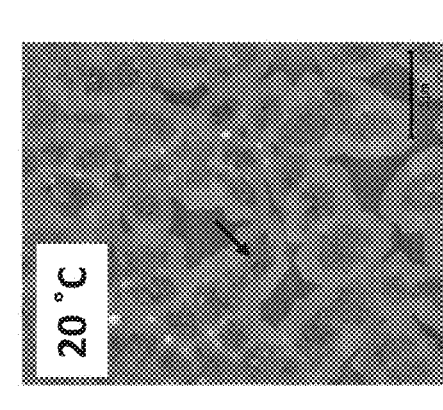
Average Height: 3.6 nm
RMS Roughness: 2.672 nm
60 HR PAV Aged Asphalt Binder with 7.5% Sterol
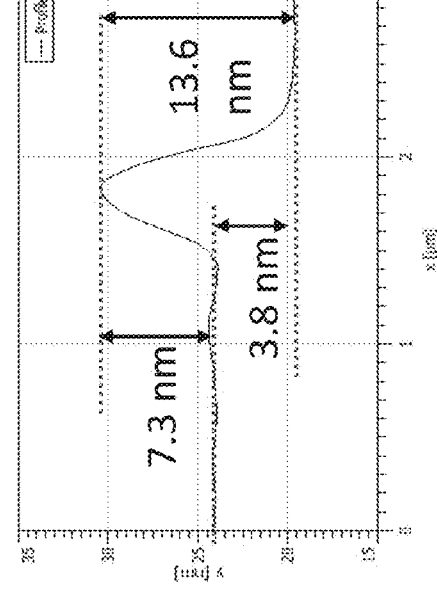
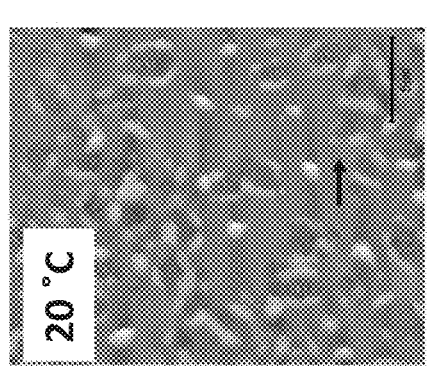
Fig. 60

COMPARATIVE ANALYSIS OF AGING ON THE ASPHALTENE CONTENT OF PEMEX PG 64-22 WITH 0% & 7.5% STEROL AND CANADIAN PG 64-22 WITH 0% AND 7.5% STEROL

Black Space Plots of Mayan PG 64-22 & Canadian PG 64-22 showing impact of Sterol to Transform Mayan based PG 64-22 @ 20 hours PAV aging to similar property of Canadian PG 64-22 at 60 hours of PAV aging Black Space Plots of 20 and 40 hour PAV Aged Citgo, Marathon-Ashland and Valero PG 58-28 Binders Olmsted County Minnesota CTH 112 Research

RECYCLING OF STEROL-CONTAINING ASPHALT BINDER

CROSS REFERENCE TO RELATED APPLICATIONS

This application claims the benefit of U.S. Provisional Patent Application Ser. Nos. 62/874,196, filed Jul. 15 2019; 62/887,811 filed Aug. 16, 2019; and 63/027,845 filed May 20, 2020; the disclosures of which are each incorporated in their entireties herein by reference.

BACKGROUND

Asphalt pavement is one of the most recycled materials in the world. The recycled pavement, commonly known as RAP (recycled asphalt pavement), finds use when recycled in shoulders of paved surfaces and bridge abutments, as a gravel substitute on unpaved roads, and as a replacement for virgin aggregate and binder in new asphalt pavement. Typically, a new pavement mixture may include up to approximately 20 percent by weight of recycled asphalt pavement. Such uses are limited in part because asphalt deteriorates with time, loses its flexibility, becomes oxidized and brittle, and tends to crack, particularly under stress or at low temperatures. These effects are primarily due to aging of the organic components of the asphalt, e.g., the bitumen-containing binder, particularly upon exposure to weather. The aged binder is also highly viscous. Consequently, reclaimed asphalt pavement has different properties than virgin asphalt binder and must be processed do that the properties of the aged binder do not impact long term performance.

To reduce, retard, or otherwise slow the rate of asphalt aging, sterol has been used. See for example the published applications, WO 2017/027096; WO 2017/213692; and WO 2017/213693. Several additional years of service will be needed before the aging properties of the resulting pavements can be fully evaluated.

SUMMARY

Disclosed are compositions and methods in which reclaimed sterol-containing asphalt products are recycled and combined with other asphalt binders such as virgin asphalt binder, aged asphalt binder containing less or no sterol, or combinations thereof to provide an upcycled asphalt binder. The upcycled asphalt binder is also referred to herein as re-recycled asphalt binder. Surprisingly, the sterols in the reclaimed sterol-containing asphalt appear to remain relatively intact and accessible after aging, and can be used to provide an upcycled asphalt binder having aging properties similar to those of a virgin asphalt binder to which fresh sterol has been added, but without requiring use of as much fresh sterol. This can provide significant savings by reducing expenditures for fresh sterols.

In one embodiment, the present disclosure provides an upcycled asphalt binder composition comprising asphalt binder and sterol, wherein the asphalt binder comprises aged asphalt binder and the sterol comprises a reclaimed sterol (viz., a sterol present in reclaimed sterol-modified asphalt).

In another embodiment, the present disclosure provides a method of forming an upcycled asphalt binder composition comprising adding a reclaimed sterol to an asphalt binder composition.

The reclaimed sterol described herein provides a cost-effective source of sterol that can be used to alter or modify chemical and rheological aspects of an asphalt binder. The reclaimed sterol reduces the amount of fresh sterol to be used as well as allows for more aged asphalt binder to be recycled. Further the sterol present in the aged asphalt binder functions the same as sterol that had never been present in an asphalt binder that had been aged or used.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 2 is a Fourier-transform infrared (FTIR) spectra of pure phytosterol.

FIG. 17 is a Black Space plot emphasizing that all blends containing 12% sterol follow the same Black Space data trace: the other data shows that 0%, 6% and 12% sterol blends follow different plot lines.

FIG. 22 is an overlay of PG 64-22+6% sterol unaged, two test results for PG 64-22+6% sterol and then aged for 60 hours in the PAV, and 50/50 blend of aged 64-22 0% sterol and 64-22+12% sterol 60 hour aged.

FIG. 35 shows Tm-critical=F(asphaltene content), for selected sterol contents blended with the aged base control.

FIG. 51 shows a topological analysis of 60-hour PAV aged asphalt binder and 60-hour PAV aged asphalt binder with 12.5% sterol, according to various embodiments.

FIG. 54 shows a topology phase analysis of 60-hour PAV aged asphalt binder and 60-hour PAV aged asphalt binder with 12.5% sterol, according to various embodiments.

FIG. 59 shows a morphology at room temperature for a 60-hour PAV aged asphalt binder with 12.5% sterol and a 60-hour PAV aged asphalt binder with 7.5% sterol, according to various embodiments.

FIG. 60 shows a morphology at room temperature for a 60-hour PAV aged asphalt binder with 12.5% sterol and a 60-hour PAV aged asphalt binder with 7.5% sterol, according to various embodiments.

5

Figure 69:
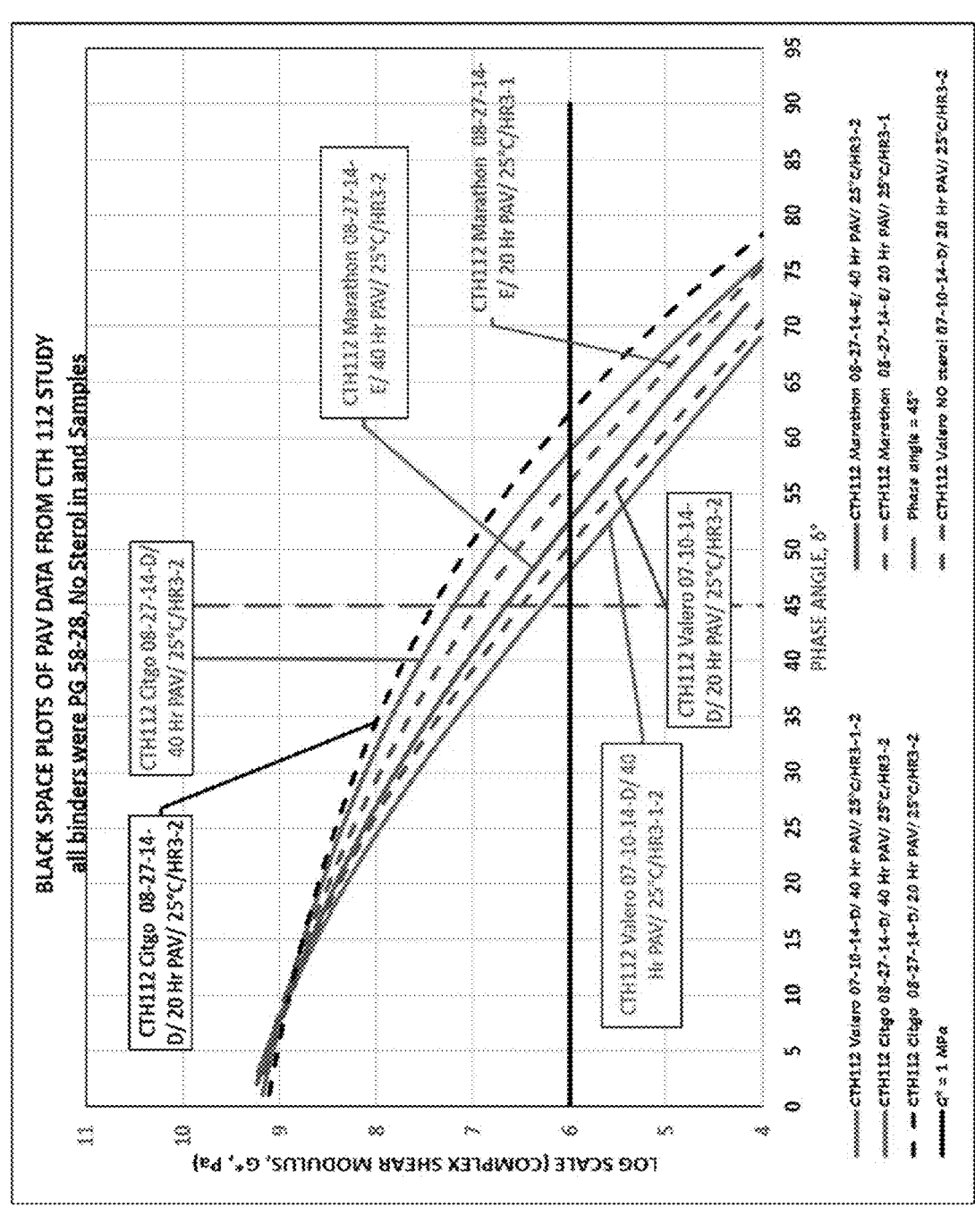

FIG. 69 is Black Space plot of 20 and 40 PAV aged binders.

Figure 70:
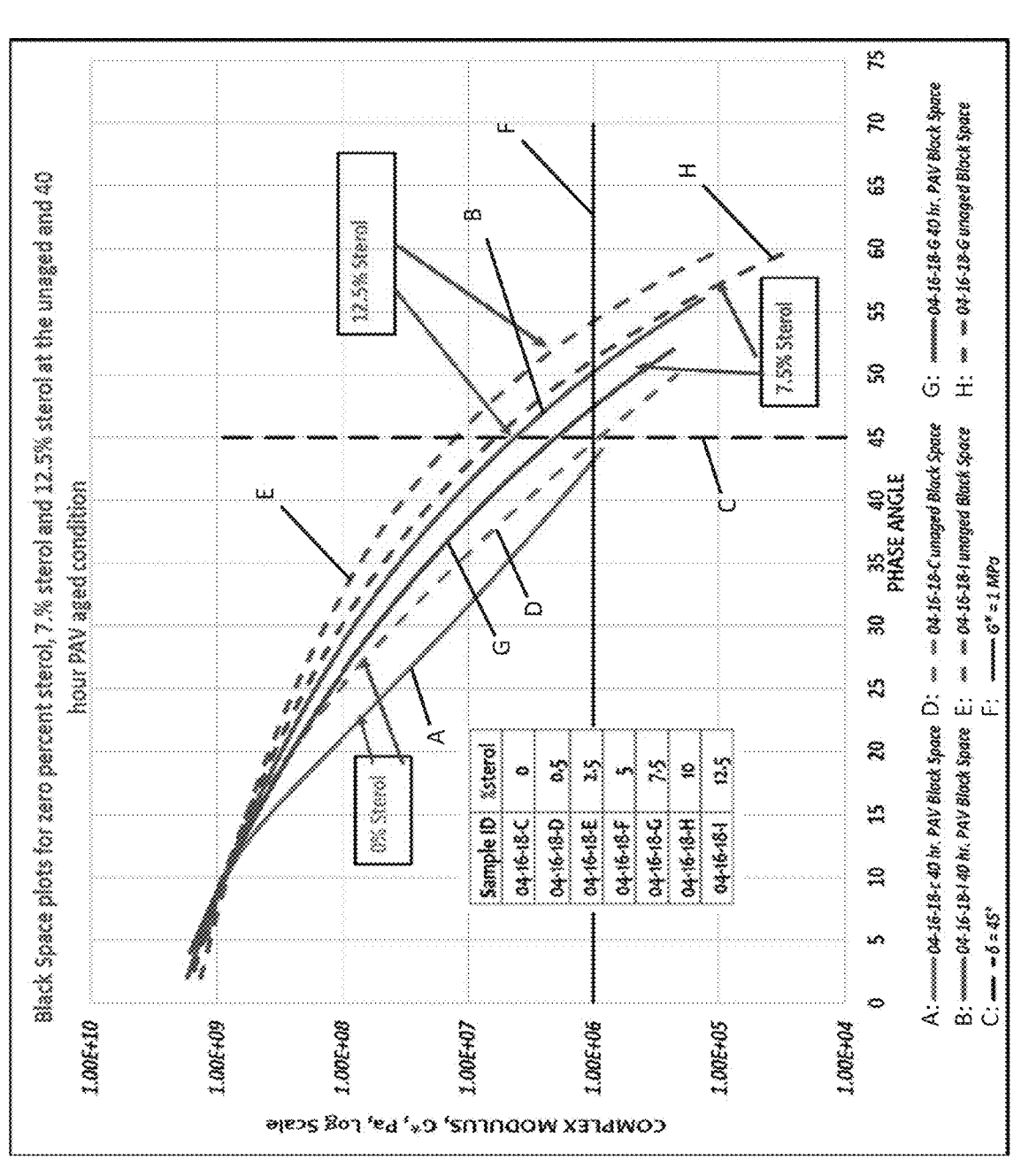
Figure 71:
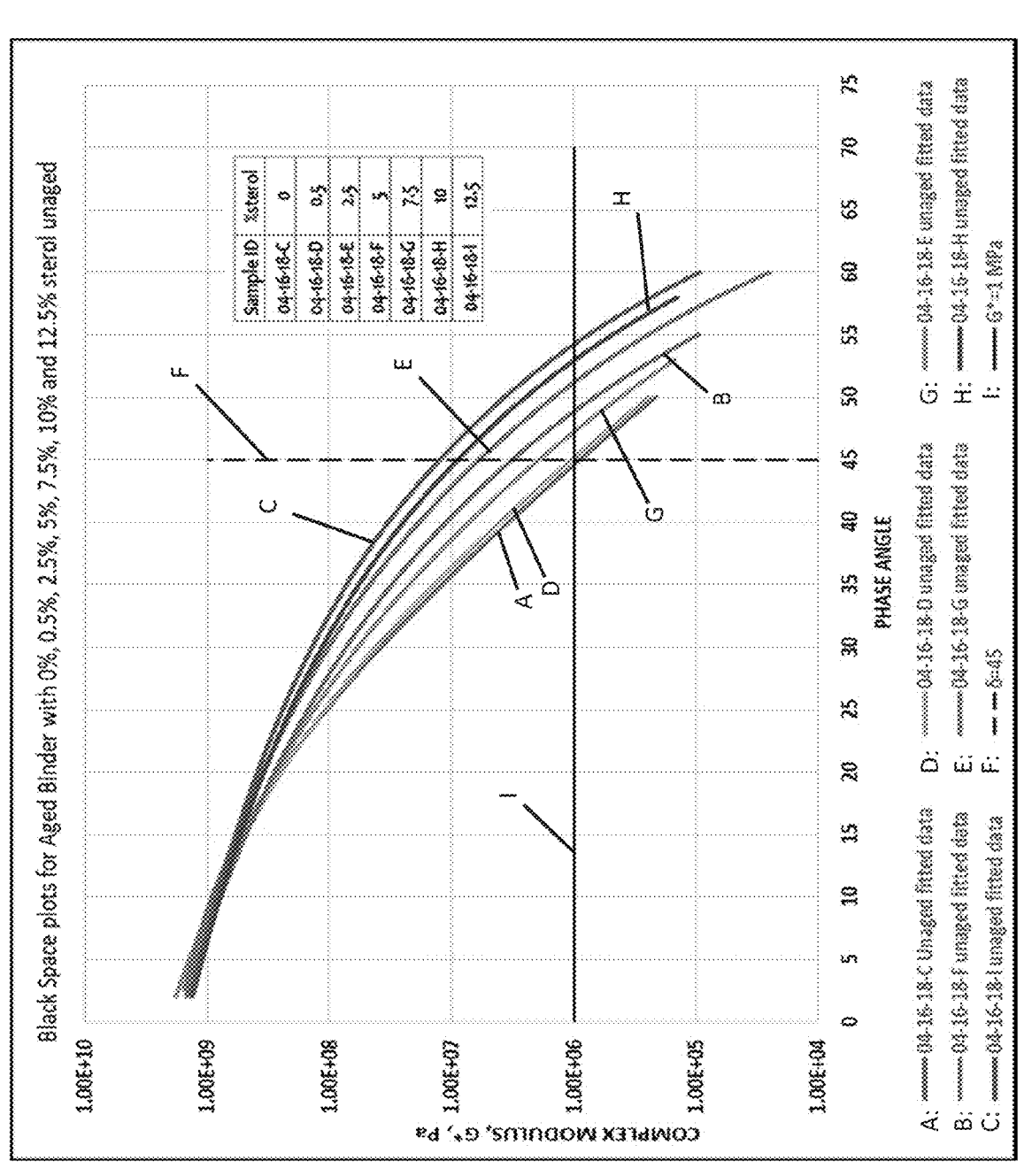
Figure 72:
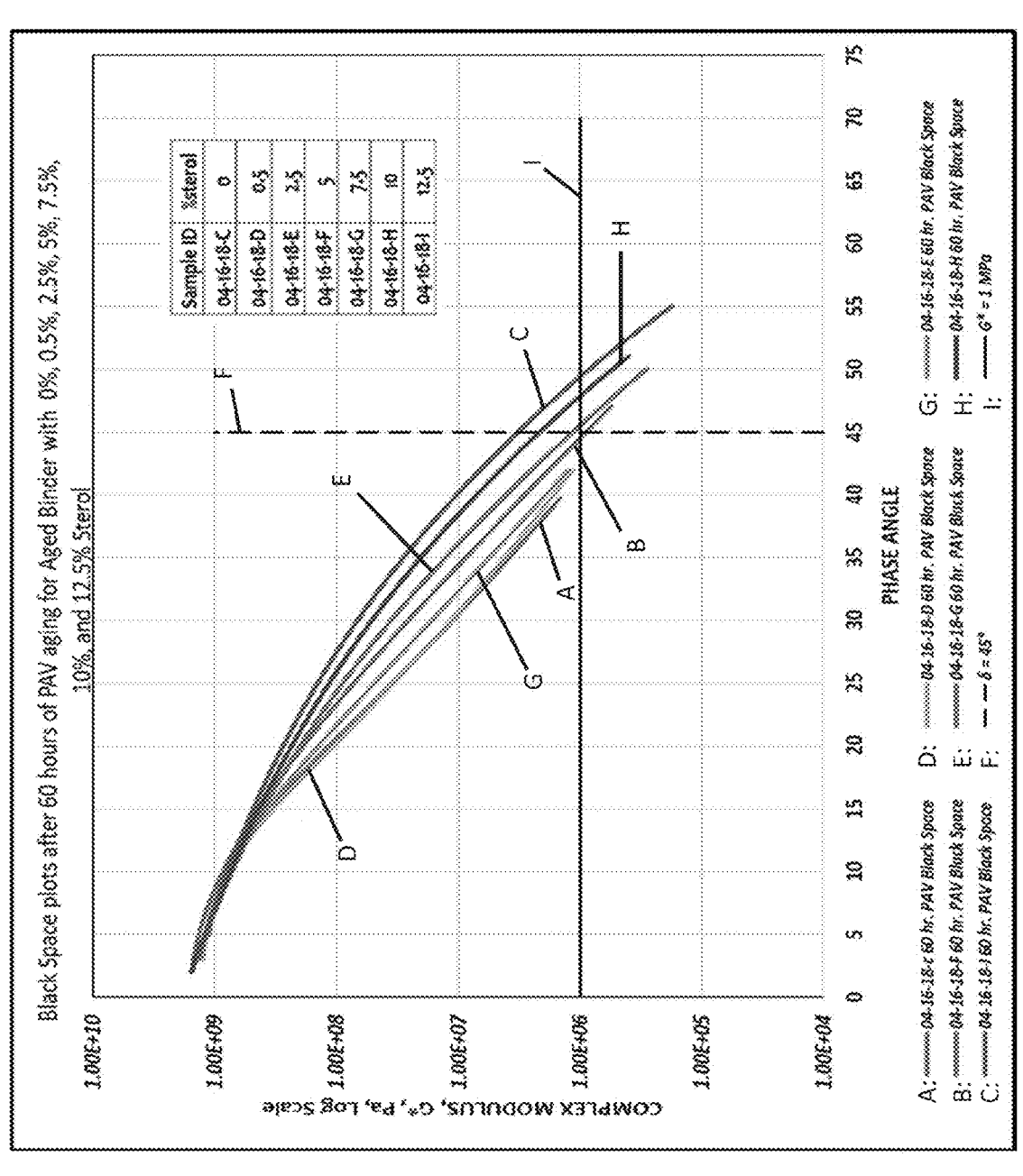

FIG. 70 shows Black Space plots for three of the materials discussed in FIGS. 71 and 72.

FIG. 71 shows Black Space plots for the unaged condition of an aged binder and sterol dosage levels of 0.5%, 2.5%, 5%, 7.5%, 10% and 12.5% into the aged binder.

FIG. 72 shows Black Space plots for the same samples as FIG. 60 after 60 hours of PAV.

DETAILED DESCRIPTION

Although the present disclosure provides references to various embodiments, persons skilled in the art will recognize that changes may be made in form and detail without departing from the spirit and scope of the invention. Various embodiments will be described in detail with reference to the Figures. Reference to various embodiments does not limit the scope of the claims attached hereto. Additionally, any examples set forth in this specification are not intended to be limiting and merely set forth some of the many possible embodiments for the appended claims.

Unless otherwise defined, all technical and scientific terms used herein have the same meaning as commonly understood by one of ordinary skill in the art. In case of conflict, the present document, including definitions, will control. Methods and materials are described below, although methods and materials similar or equivalent to those described herein can be used in practice or testing of the various embodiments of the present invention. All publications, patent applications, patents and other references mentioned herein are incorporated by reference in their entirety.

Headings are provided herein solely for ease of reading and should not be interpreted as limiting.

Aged asphalt binder" refers to asphalt or binder that is present in or is recovered from reclaimed asphalt. Aged binder has high viscosity compared with that of virgin asphalt or virgin binder (which depending on the jurisdiction, may as discussed below also be referred to as "virgin bitumen") as a result of aging and exposure to outdoor weather. The term "aged binder" also refers to virgin asphalt or virgin binder that has been aged using the laboratory aging test methods described herein (e.g. RTFO and PAV). "Aged binder" may also refer to hard, poor-quality, or out-of-specification virgin binders that could benefit from addition of the disclosed additive particularly virgin binders having a ring-and-ball softening point greater than 65° C. by EN 1427 and a penetration value at 25° C. by EN 1426 less than or equal to 12 dmm.

"Aggregate" and "construction aggregate" refer to particulate mineral material such as limestone, granite, trap rock, gravel, crushed gravel sand, crushed stone, crushed rock and slag useful in paving and pavement applications.

"Asphalt binder" refers to a binder material including asphalt and optionally other components that is suitable for mixing with aggregate to make a paving mix. Depending on local usage, the term "bitumen" may be used interchangeably with or in place of the term "asphalt" or "binder".

"Asphalt pavement" refers to a compacted mixture of asphalt and aggregate.

"Asphalt paving mixture", "asphalt mix" and "mix" refer to an uncompacted mixture of asphalt and aggregate. Depending on local usage, the terms "bitumen mix" or "bituminous mixture" may be used interchangeably with or in place of the terms "asphalt paving mixture", "asphalt mix" or "mix".

Bitumen" refers to a class of black or dark-colored (solid, semisolid, or viscous) cementitious substances, natural or manufactured, composed principally of high molecular weight hydrocarbons, of which asphalts, tars, pitches, and asphaltenes are typical.

"Crude" when used with respect to a material containing a sterol or mixture of sterols means sterol that has not been fully refined and can contain components in addition to sterol.

"Fresh sterol" refers to sterol not previously used in or recycled from asphalt pavement or asphalt shingles.

"Neat" or "Virgin" binders are binders not previously used in or recycled from asphalt pavement or asphalt shingles, and can include Performance Grade binders.

"PAV" refers to a Pressurized Aging Vessel test. The PAV test simulates accelerated aging of asphalt using a pressurized aging vessel as described in ASTM D6521-13, Standard Practice for Accelerated Aging of Asphalt Binder Using a Pressurized Aging Vessel (PAV).

"Pure" when used with respect to a sterol or mixture of sterols means having at least a technical grade of purity or at least a reagent grade of purity.

"Reclaimed asphalt" and "recycled asphalt" refer to RAP, RAS, and reclaimed asphalt from old pavements, shingle manufacturing scrap, roofing felt, and other asphalt-containing products or applications.

"Reclaimed asphalt pavement" and "RAP" refer to asphalt that has been removed or excavated from a previously used road, pavement, parking lot or other similar structure, and processed for reuse by any of a variety of well-known methods, including milling, ripping, breaking, crushing, or pulverizing.

"Reclaimed asphalt shingles" and "RAS" refer to shingles from sources including roof tear-off, manufacture's waste asphalt shingles and post-consumer waste.

Reclaimed sterol" refers to sterol contained in aged asphalt binder or binder that was previously present in an existing, used asphalt pavement or an existing used or unused asphalt shingle.

"RTFO" refers to a Rolling Thin Film Oven Test. This is a test used for simulating the short-term aging of asphalt binders as described in ASTM D2872-12e1, Standard Test Method for Effect of Heat and Air on a Moving Film of Asphalt (Rolling Thin-Film Oven Test).

"Softening agent" refers to additives that ease (or facilitate) the mixing and incorporation of a recycled asphalt into fresh bitumen or into an asphalt mix, during an asphalt mix production process.

"Sterol" refers to an additive of pure sterols, crude sterols, reclaimed sterols or a combination thereof that can be combined with virgin binder, aged binder (e.g. recycled or reclaimed asphalt) or a combination thereof to retard the rate of aging of asphalt binder, or to restore or renew the aged binder to provide some or all of the original properties of virgin asphalt or virgin binder or otherwise improve the rheological or chemical properties of the asphalt binder.

"ΔTc" refers to the difference between the stiffness critical temperature and the creep critical temperature. The stiffness critical temperature is the temperature at which a binder tested according to ASTM D6648 has a flexural creep stiffness value of 300 MPa and the creep critical temperature is the temperature at which the slope of the flexural creep stiffness versus creep time according to ASTM D6648 has an absolute value of 0.300. Alternatively the stiffness and creep critical temperatures can be determined from a 4 mm dynamic shear rheometer (DSR) test and analysis procedures described by Sui, C., Farrar, M., Tuminello, W., Turner, T., *A New Technique for Measuring low-temperature Properties of Asphalt Binders with Small Amounts of Material, Transportation Research Record*: No 1681, TRB 2010. See also Sui, C., Farrar, M. J., Harnsberger, P. M., Tuminello, W. H., Turner, T. F., *New Low Temperature Performance Grading Method Using 4 mm Parallel Plates on a Dynamic Shear Rheometer*. TRB Preprint CD, 2011, where the stiffness critical temperature is the temperature where the relaxation modulus equals 143 MPa and the creep critical temperature is where the absolute value of the slope of the relaxation modulus master curve versus relaxation time equals 0.275.

"Upcycled asphalt binder" refers to an asphalt binder composition that includes already used asphalt binder containing a reclaimed sterol. The term "upcycled" may be used interchangeably with "re-recycled" in reference to asphalt binder containing reclaimed sterol.

All parts and percentages are based on weight unless otherwise specified.

As reported in previous applications (WO 2017/027096; WO 2017/213692; and WO 2017/213693), sterol has been shown to provide anti-aging properties or characteristics (viz., reducing, retarding the aging or rate of aging) when added to asphalt binders. The sterols help in the preservation, recycling and reuse of asphalt compositions. The present application provides an additional sterol source—an aged asphalt binder in which the binders already contain sterol—that may be used in asphalt pavement. In other words, the sterol that can be used is sterol that was present in an existing, aged asphalt pavement. These "reclaimed sterols" have been found to provide anti-aging properties similar to a fresh sterol, namely sterol that has not previously been used in an asphalt pavement. The reclaimed sterol is provided in the form of an aged asphalt binder that contains the sterol.

Such compositions and methods save on raw materials achieving economic and environmental protections with the benefits like those observed with fresh sterol addition. The resultant benefits include improved physical and rheological characteristics such as stiffness, effective temperature range, and low temperature properties.

The disclosed compositions have particular value for the renewal of reclaimed asphalt; especially asphalt containing softening agents such as waste engine oils or bio oils.

We have found that the sterol that may be present in reclaimed sterol-modified bitumen is not significantly consumed or reacted with the bitumen by aging. This provides a new sterol source, in that the reclaimed sterol present in an aged asphalt can be combined with virgin materials or other aged bitumen (e.g., RAP or RAS) and the age retarding benefits of that reclaimed sterol can be used to help reduce the aging or rate of aging of a new blend and do so while using less (or even no) fresh sterol. For example, a RAP/virgin binder mix that contains 10% sterol and which might undergo field aging for 10 to 12 years can, based on data generated, be approximated by subjecting the RAP/virgin binder/sterol mix to 60 hours of PAV aging. If this PAV-aged mix is used to replace 50% of the binder in a new RAP/virgin binder/reclaimed sterol mix, the final mix will contain 5% reclaimed sterol. This new blend will age similarly to a comparison RAP/virgin binder mix containing 5% freshly added sterol. Additional 5% fresh sterol could be added to the new RAP/virgin binder/reclaimed sterol mix to bring the final sterol level to 10%. In other words, aged asphalt containing reclaimed sterol can be supplemented with additional fresh sterol as needed to attain an overall sterol amount or level appropriate to provide desired anti-aging properties.

Current bituminous paving practices involve the use of high percentages of recycled asphalt binders. The recycled asphalt binders are derived from RAP and/or RAS as components in the bituminous mixtures being paved. Typically RAP concentrations can be as high as 50% and RAS concentrations can be as high as 6% by weight of the paving mixture. The typical bitumen content of RAP is in the range of 5-6% by weight and the typical bitumen content of RAS is in the range of 20-25% by weight. Consequently, a bituminous mixture containing 50% by weight of RAP will contain 2.5% to 3% RAP bitumen contributed to the final bituminous mixture and a bituminous mixture containing 6% RAS by weight will contain 1.2% to 1.5% RAS bitumen contributed to the final bituminous mixture. In many instances both RAP and RAS are combined in bituminous mixtures; for example 20% to 30% RAP and 5% to 6% RAS can be incorporated into a bituminous mixture. In some embodiments, the asphalt binder contents of RAP and/or RAS asphalt binders contain 100 wt % RAP binder, 100 wt % RAS binder or combinations thereof. In other embodiments the RAP, RAS or a combinations thereof are from 1-99 wt %; 20-99 wt %; or 20-75 wt % RAP or RAS binder. Since a typical bituminous paving mixture will contain about 5.5% total bitumen there may be about 36% to as much as 60% of the total bitumen in the bituminous mixture from these recycled sources.

In some embodiments, the asphalt binders in the disclosed mixes may be entirely aged asphalt binders. In some embodiments the aged asphalt binders are recycled binders already containing sterol. The recycled binders with reclaimed sterol are derived from RAP or RAS. It should be understood that any form of asphalt binders can be provided in the asphalt composition so long as at least an asphalt binder containing reclaimed sterol is present. In some embodiments, the asphalt binder is an aged asphalt binder containing only reclaimed sterol, and in other embodiments, the asphalt binder is an aged asphalt binder containing both reclaimed sterol and fresh sterol.

Characteristics of bitumen in these reclaimed sources relative to virgin binders used in bituminous mixtures are shown in Table 1. To determine the ΔTc parameter, a 4 mm dynamic shear rheometer (DSR) test procedure and data analysis methodology from the Western Research Institute was employed (see Sui, C., Farrar, M., Tuminello, W., Turner, T., *A New Technique for Measuring low-temperature Properties of Asphalt Binders with Small Amounts of Material, Transportation Research Record*: No 1681, TRB 2010. See also Sui, C., Farrar, M. J., Harnsberger, P. M., Tuminello, W. H., Turner, T. F., *New Low Temperature Performance Grading Method Using 4 mm Parallel Plates on a Dynamic Shear Rheometer*. TRB Preprint CD, 2011.

TABLE 1

| Bitumen type & source | High temperature stiffness grade, ° C. | Critical Low temperature grade based on 4 mm DSR Stiffness, ° C., 20 hr. PAV | Critical Low temperature grade based on 4 mm DSR Creep, ° C. 20 hr. PAV | Critical low temperature stiffness grade subtracted from creep grade, ΔTc ° C., 20 hr. PAV | Critical Low temperature grade based on 4 mm DSR Stiffness, ° C., 40 hr. PAV | Critical Low temperature grade based on 4 mm DSR Creep, ° C. 40 hr. PAV | Critical low temperature stiffness grade subtracted from creep grade, ΔTc ° C., 40 hr. PAV |
|---|---|---|---|---|---|---|---|
| PG 58-28 | 60.3 | −31.4 | −30.9 | −0.5 | −30.7 | −27.8 | −2.9 |
| PG 64-22 | 67.1 | −27.1 | −26.2 | −.9 | −25.8 | −23.2 | −2.6 |

| Binder recovered from RAP | | Critical Low stiffness temperature grade based on 4 mm DSR | Critical Low creep grade temperature based on 4 mm DSR | Critical low temperature stiffness grade subtracted from creep grade, ΔTc° C. |
|---|---|---|---|---|
| RAP 03-16-15-D | 85.0 | −25.5 | −22.3 | −3.2 |
| RAP 02-23-15-B | 89.5 | −25.3 | −21.3 | −4.0 |
| RAP 03-24-15-D | 98.8 | −22.4 | −17.1 | −5.3 |
| RAP 02-09-15-B | 87.5 | −27.8 | −26.2 | −1.6 |
| RAS 04-03-15-D | 158.2 | −27.5 | −0.3 | −27.2 |
| RAS 02-09-15-C | 137.7 | −25.7 | +9.7 | −35.4 |

Table 2 shows the high and low temperature properties of blends produced with virgin binders and bitumen recovered from post-consumer waste shingles after different periods of aging. Also shown in Table 2 are high and low temperature properties of mixtures containing RAP and/or RAS. Some of these mixtures have undergone extended laboratory aging and some are from field cores.

TABLE 2

| Binder recovered from RAP or RAS containing mixtures either lab or field aged | High temperature grade | Critical Low temperature stiffness grade based on 4 mm DSR | Critical Low temperature creep grade based on 4 mm DSR | Critical low temperature stiffness grade subtracted from creep grade, Δ Tc° C. |
|---|---|---|---|---|
| Field mix 09-27-13-F PG 58-28 + 5% RAS, unaged | 83.1 | −32.3 | −30.6 | −1.7 |
| Field mix 09-27-13-E PG 58-28 + 5% RAS, 5 day aged @ 85° C. | 102.8 | −28.5 | −23.9 | −4.6 |
| US Hwy 14 PG 58-28 + 6% RAS & 11% RAP, 10 day aged @ 85° C. | 85.4 | −30.9 | −24.1 | −6.8 |
| US Hwy 14 PG 52-34 + 6% RAS & 11% RAP, 10 day aged @ 85° C. | 80.8 | −35.6 | −29.9 | −5.7 |
| US Hwy 14 PG 58-28 + 31% RAP, 10 day aged @ 85° C. | 79.5 | −29.6 | −26.7 | −2.9 |
| Core from field paved 2011, cored 2013, binder from top ½ inch of core (mix contained PG 58-28 + 5%, RAS or 22% shingle binder replacement) | 87.6 | −25.9 | −21.7 | −4.2 |
| Core from field paved 2011, cored 2013, binder from second ½ inch of core (mix contained PG 58-28 + 5%, RAS or 22% shingle binder replacement) | 86.0 | −25.6 | −21.9 | −3.8 |
| Core from field paved 2011, cored 2013, binder from layer 2 inches below surface (mix contained PG 58-28 + 5%, RAS or 22% shingle binder replacement) | 80.7 | −26.0 | −24.2 | −1.8 |

Tables 1 and 2 show the impact of incorporating high binder replacement levels of recycled materials, especially those derived from post-consumer waste shingles. The data demonstrate the desirability of incorporating additives into bitumen and bituminous mixtures to mitigate the impact of the bitumen from these recycled components and retard further oxidative aging of the total bitumen in the final mixture. The last three rows of Table 2 show that the further away from the air-mixture interface, the lower the impact on ΔTc parameter. This parameter may be used to assess the impact of aging on binder properties and more specifically the impact of aging on the relaxation properties of the binder; the relaxation property is characterized by the property referred to as "low temperature creep grade".

Research published in 2011 showed, based on recovered binder data from field cores, that when ΔTc falls below −3° C. there is a danger of non-load related mixture cracking. Specifically a difference of −4° C. was construed as a warning limit and a difference of −5° C. was construed as a potential failure point.

Reports at two Federal Highway Administration Expert Task Group meetings have shown a correlation between ΔTc values of binders recovered from field test projects and severity of pavement distress related to fatigue cracking. Additionally, it has been shown that when binders used to construct these field test projects were subjected to 40 hours of PAV aging, the ΔTc values showed a correlation to pavement distress related to fatigue cracking, especially top down fatigue cracking which is generally considered to result from loss of binder relaxation at the bituminous mixture surface.

It is therefore desirable to obtain bituminous mixtures with bitumen materials that have a reduced susceptibility to the development of excessively negative ΔTc values.

The data in Table 1 show typical virgin binders produced at refineries can maintain a ΔTc of greater than −3° C. after 40 hours of PAV aging. Further, the data in Table 1 show that binder recovered from RAP can have ΔTc values of less than −4° C., and that the impact of high RAP levels in new bituminous mixtures should be evaluated. Further, the extremely negative values of ΔTc for RAS recovered binders require additional scrutiny as to the overall impact of RAS incorporation into bituminous mixtures.

Table 2 shows that it is possible to age bituminous mixtures under laboratory aging followed by recovery of the binder from the mixtures and determination of the recovered binder ΔTc. The long term aging protocol for bituminous mixtures in AASHTO R30 specifies compacted mix aging for five days at 85° C. Some research studies have extended the aging time to ten days to investigate the impact of more severe aging. Recently, aging loose bituminous mixes at 135° C. for 12 and 24 hours and in some instances for even greater time periods have been presented as alternatives to compacted mix aging. The goal of these aging protocols is to produce rapid binder aging similar to field aging representative of more than five years in service and more desirably eight to 10 years in service. For example, it has been shown for mixtures in service for around eight years that the ΔTc of the reclaimed or recycled asphalt from the top ½ inch of pavement was more severe than 12 hours aging at 135° C. but less severe than 24 hours aging at 135° C.

The data in the first two rows of Table 2 show why long-term aging of mixtures containing recycled products is important. The binder recovered from the unaged mix (row 1) exhibited a ΔTc of −1.7° C., whereas the binder recovered from the 5 day aged mix exhibited a ΔTc of −4.6° C.

The disclosed sterols (e.g. reclaimed sterol) can reduce or retard an asphalt binder aging rate, or can restore or renew an aged or recycled binder to provide some or all of the properties of a virgin asphalt binder. For example, the sterols (e.g. reclaimed sterol) can alter or improve physical and rheological characteristics such as stiffness, effective temperature range, and low temperature properties of the asphalt binder.

In some embodiments, the sterol belongs to the class of triterpenoids, and in particular to sterols or stanols. The disclosed blends (e.g. triterpenoids) can effectively work with asphaltenes. Asphaltenes include extensive condensed ring systems with some level of unsaturation. The asphaltene content of typical binders can range from less than 10% to more than 20%. Asphaltenes are typically described as materials that are insoluble in n-heptane. An exact structure is unknown and based on the performance behavior of different binders it is unlikely that the asphaltene structure in any two binders is the same, especially those from different crude sources. Asphaltenes give a binder its color and stiffness and they increase in content as the binder ages. Consequently, the addition of RAP and/or RAS causes the asphaltene content to increase. Increasing asphaltene content along with other products of oxidation such as carbonyls and sulfoxides are responsible for the stiffening of bituminous mixtures and their ultimate failure. By their very chemical nature asphaltenes are not readily soluble in aliphatic chemicals. Aromatic hydrocarbons will readily dissolve asphaltenes and aromatic process oils have been used in recycled mixtures. However these oils may contain polynuclear aromatic compounds including listed potential carcinogens and therefore are not desirable additives. Most plant based oils are straight or branched chain hydrocarbons with some level of unsaturation and therefore are not as effective at retarding aging as they are at softening the overall binders in a mixture.

Triterpenoids are a major group of plant natural products that include sterols, triterpene saponins, and related structures. Triterpenoids can be of natural or synthetic origin. Typically they are obtained by extraction from plant material. Extraction processes for the isolation of triterpenoids are described e.g. in the international applications WO 01/72315 A1 and WO 2004/016336 A1, the disclosures of which are each incorporated herein by reference in their entirety.

The triterpenoids include plant sterols and plant stanols. The disclosed triterpenoids refer to the non-esterified forms of any of the plant sterols mentioned herein.

Exemplary pure plant sterols include campesterol, stigasterol, stigmasterol, β-sitosterol, Δ5-avenosterol, Δ7-stigasterol, Δ7-avenosterol, brassicasterol, cycloartenol, 24-methylene cycloartanol, citrostadienol or mixtures thereof. In some embodiments, the sterol contains β-sitosterol as the pure sterol. In other embodiments, the sterol contains a mixture of pure sterols. Commercially available pure sterols and mixtures of pure sterols include those available from MP Biomedicals (Catalog No. 02102886) referred to as beta-Sitosterol (beta-Sitosterol ~40-60%; campesterol ~20-40%; Stigmasterol~5%). In some embodiments, a pure sterol can have at least 70 wt. % sterols, and in some embodiments can have at least 80 wt %, at least 85 wt % or at least 95 wt % sterols.

Exemplary crude plant sterols include modified or unmodified natural products containing significant quantities of sterols, including such diverse plant sources as corn oil, wheat germ oil, sarsaparilla root, soybean pitch and corn oil pitch. For example, tall oil pitch is obtained during the process of preparing paper from wood, particularly pine wood. Tall oil pitch is an extremely complex material that can contain rosins, fatty acids, oxidation products and esterified materials, an appreciable fraction of which are sterol esters. Plant sources of crude sterols are inexpensive in that they are the foots or tailings left from various manufacturing processes. In some embodiments, the crude sterols may for example include 20% or more sterol content. In some embodiments the crude sterols are 20-70 wt % sterols; for example 25-65 wt %, 30-70 wt %, 20-50, 20-30 wt % or 35-70 wt % sterols.

In some embodiments, the crude sterol sources include stigmasterol, β-sitosterol, campesterol, ergosterol, brassicasterol, cycloartenol, 24-methylene cycloartenol, citrostadieno cholesterol and lanosterol or mixtures thereof. In some embodiments, the crude sterol sources include soy bean oil, corn oil, rice bran oil, peanut oil, sunflower seed oil, safflower oil, cottonseed oil, rapeseed oil, coffee seed oil, wheat germ oil, tall oil, and wool grease. In some embodiments the crude sterol includes a bio-derived source or partially distilled residue of the bio-derived source. In some embodiments, the crude sterol source includes tall oil pitch, soybean oil or corn oil.

Any of the oil tailings or pitches from the disclosed plant sources are suitable crude sterol sources. U.S. Pat. No. 2,715,638, Aug. 16, 1955, to Albrecht, discloses a process for recovering sterols from tall oil pitch whereby the fatty acid impurities are removed by a neutralization process. Following this, the sterol esters are saponified; the free sterols are then recovered and washed with isopropanol and dried. If sufficiently purified, the recovered free sterols may be used as pure sterols rather than as crude sterols in the disclosed pure sterol:crude sterol mixtures.

In some embodiments, the crude sterols are obtained from plant sources. The crude sterol can include components in addition to the desired sterol or sterols. Exemplary plant sources for crude sterols include tall oil pitch, crude tall oil, sugar cane oil, hot well skimmings, cottonseed pitch, soybean pitch, corn oil pitch, wheat germ oil or rye germ oil. In some embodiments, tall oil pitch is a source of the crude sterol. Tall oil pitch can include about 30 to 40% unsaponifiable molecules. Unsaponifiables are molecules that do not react with alkali hydroxides. Fatty and rosin acids remaining in the tall oil pitch readily react with potassium or sodium hydroxides and thus the unsaponifiables can be readily separated. It has been shown that 45% of the unsaponifiable fraction can include sitosterols. Therefore, a tall oil pitch sample can contain approximately 13.5% to 18% sterol molecules by weight. In some embodiments the crude sterol can have less than a food grade of purity (e.g., less than 85 wt. % sterols) or containing more than 85 wt. % sterols but also containing impurities or contaminants that render the material unsuitable for use in foods.

In the disclosed embodiments, the sterol also includes reclaimed sterol. In some embodiments, the reclaimed sterol is a sterol-containing asphalt binder. It should be understood that different sterol types can be added in an asphalt composition to provide the sterol in an amount appropriate to provide the anti-aging properties of sterol. In other words, a 10 wt % sterol present in an aged asphalt binder containing reclaimed sterol can be used as the sterol in an asphalt composition to provide the anti-aging properties. On the other hand the same 10 wt % sterol present in an aged asphalt binder containing reclaimed sterol can be used as the sterol along with fresh sterol to provide an amount appropriate to provide anti-aging properties to an asphalt composition.

The sterols, in some embodiments include a 5:95 to 95:5 ratio of reclaimed sterol to fresh sterol. The sterols, in some embodiments include at least a 10:90 to 90:10 20:80, 30:70 or 40:60 ratio of reclaimed sterol to fresh sterol, and in some embodiments can include less than an 80:20, 70:30 or 60:40 ratio of reclaimed sterol to fresh sterol. The fresh sterols can in some embodiments include a 5:95 to 95:5 ratio of pure sterol to crude sterol. The fresh sterols can in some embodiments include at least a 10:90 to 90:10 20:80, 30:70 or 40:60 ratio of pure sterol to crude sterol, and in some embodiments can include less than an 80:20, 70:30 or 60:40 ratio of pure sterol to crude sterol.

The sterol added to the asphalt composition may for example range from about 0.5 to about 35 wt. %, 0.5 to about 25 wt. %, 0.5 to about 20 wt %; 15 to about 35 wt. %, about 1 to about 12 wt. %, about 2-10; or about 1 to about 3 wt. % of the total asphalt composition.

In some embodiments, sterol can alter, reduce or retard the degradation of rheological properties in binders containing recycled bituminous materials that include softening agents such as RAS, RAP, REOB, virgin paraffin or naphthenic base oils, untreated or non-refined waste drain oils or waste engine oil materials, vacuum tower asphalt extenders, paraffinic or naphthenic processing oils or lubricating base oils. In some embodiments, the sterol (e.g. as in an upcycled asphalt binder) when used in an asphalt or asphalt pavement maintains a ΔTc value greater than or equal to −5° C. as the asphalt or asphalt pavement is aged.

In some embodiments, the sterols (e.g. reclaimed sterols) can provide an asphalt binder composition with a ΔTc of greater than or equal to −5.0° C. In some embodiments, the sterols can provide an asphalt binder with a ΔTc of greater than or equal to −5.0° C. after 40 hours of PAV aging. In still other embodiments, the disclosed sterol can provide an asphalt binder with a less negative ΔTc value and a decreased R-Value following aging, when compared to a similarly-aged asphalt binder without the sterol.

Softening agents that may be used in binders include waste engine oil and waste engine oil that may be further processed to provide REOB. Other softening agents used in binders include bio-derived oils or petroleum-derived oils. For example, some bio derived softening additives are supplied by CARGILL, ARIZONA CHEMICAL (KRATON), GEORGIA PACIFIC, POET AND HYDROGREEN. REOB is a low-cost softening additive and asphalt extender obtained from the residual material remaining after the distillation of waste engine oil either under vacuum or at atmospheric pressure conditions. The distilled fraction from the rerefining process is reprocessed into new lubricating oil for vehicles, but the bottoms do not have an available market due to the presence of metals and other particulates from internal combustion engines. Also, these bottoms contain paraffinic hydrocarbons and additives incorporated into the original lubricating oil. For many years REOB were used by some companies as an asphalt extender, but the usage was localized.

Greater amounts of waste engine oils are being produced and sold as REOB into the asphalt binder market. The use of REOB may provide mixtures, which when aged, have ΔTc values of −4° C. or lower with consequent poor performance in pavements. When REOB are added to some asphalts at levels as low as 5% by weight, the resulting ΔTc after 40 hr. PAV aging can be −5° C. or lower (viz., more negative). Recovered binders from field mixes shown to contain REOB by means of metals testing have shown greater distress than field mixtures of the same age and the same aggregate and paved at the same time but not containing REOB.

The disclosed sterols can mitigate the impact of waste engine oils (e.g. REOB) on $\Delta$Tc (as evaluated, for example, using 40 hr. PAV) and renew or retard the aging rate of the recycled asphalt.

The disclosed sterols can also be used to mitigate the impact of other softening agents. These other softening agents include synthetic or virgin lubricating oils (such as MOBIL™ 1 synthetic oil from EXXON MOBIL CORP. and HAVOLINE™ 10W40 oil from CHEVRON USA INC.), virgin paraffin or naphthenic base oils, untreated or non-rerefined waste drain oils or waste engine oil materials, vacuum tower asphalt extenders (the non-distillable fraction from re-refining used engine oil) and paraffinic or naphthenic process oils The asphalt composition may contain other components in addition to the disclosed sterols. Such other components can include elastomers, non-bituminous binders, adhesion promoters, softening agents, rejuvenating agents and other suitable components.

Useful elastomers include, for example, ethylene-vinyl acetate copolymers, polybutadienes, ethylene-propylene copolymers, ethylene-propylene-diene terpolymers, reactive ethylene terpolymers (e.g. ELVALOY™), butadiene-styrene block copolymers, styrene-butadiene-styrene (SBS) block terpolymers, isoprene-styrene block copolymers and styrene-isoprene-styrene (SIS) block terpolymers, chloroprene polymers (e.g., neoprenes) and the like. Cured elastomer additives may include ground tire rubber materials.

Conventional rejuvenating agents are classified into types such as RA-1, RA-5, RA-25, and RA-75 as defined by ASTM D4552. Rejuvenating agents for use in the disclosed asphalt compositions may for example resemble the maltene fraction of asphalt such as an RA-1 rejuvenating agent, an RA-5 rejuvenating agent, or mixtures thereof. Exemplary rejuvenating agents are available from HOLLY FRONTIER under their HYDROLENE™ brand asphalt oils, from AMERICAN REFINING GROUP, INC. under their KEN-DEX™ brand or from TRICOR REFINING, LLC under their GOLDEN BEAR Preservation Products RECLAM-ITE™ brand. Asphalt oils meeting ASTM standard D4552, and classified as RA-1 are suitable for harder asphalts, such as PG 64. RA-5, RA-25 and RA-75 oils may also be used with lower viscosity asphalts, such as PG 52. The rejuvenation agents can also include recycling agents that are rich in aromatics and resins, with small amounts of saturates.

The asphalt binder composition may for example be prepared by mixing or blending recycled asphalt containing the reclaimed sterols with virgin binder to form a bituminous mixture or blend. The bituminous mixture or blend can be added to recycled asphalt (e.g. RAS and/or RAP) and aggregate. One of skill in the art will recognize that other sequences of adding and mixing components are possible.

Asphalt compositions can be prepared by applying mechanical or thermal convection. In one aspect, a method of preparing an asphalt composition involves mixing or blending recycled asphalt containing the reclaimed sterols with virgin asphalt at a temperature of from about 100° C. to about 250° C. In some embodiments, the temperature is from about 125° C. to about 175° C., or 180° C. to 205° C. In some embodiments, the asphalt composition includes asphalt, sterol and softening agent. In still other embodiments, the asphalt composition includes asphalt, RAS or RAP, sterol and aggregate.

The disclosed asphalt compositions can be characterized according to many standard tests such as those recited in applicable ASTM specifications and test methods. For example, the disclosed compositions can be characterized using rheological tests (viz., dynamic shear rheometer, rotational viscosity, and bending beam).

At low temperatures (e.g., −10° C.), road surfaces need cracking resistance. Under ambient conditions, stiffness and fatigue properties are important. At elevated temperatures, roads need to resist rutting when the asphalt becomes too soft. Criteria have been established by the asphalt industry to identify rheological properties of a binder that correlate with likely paved road surface performance over the three common sets of temperature conditions.

To determine the $\Delta$Tc parameter, a 4 mm DSR test procedure and data analysis methodology from the WESTERN RESEARCH INSTITUTE was employed as noted above. The DSR test procedure and methodology are also disclosed in published applications: US 2016/0362338; WO 2017/027096; WO 2017/213692; and WO 2017/213693, each of which is incorporated herein by reference in its entirety.

The $\Delta$Tc parameter can also be determined using a Bending Beam Rheometer (BBR) test procedure based on AASHTO T313 or ASTM D6648. It is important that when the BBR test procedure is used that the test is conducted at a sufficient number of temperatures such that results for the Stiffness failure criteria of 300 MPa and Creep or m-value failure criteria of 0.300 are obtained with one result being below the failure criteria and one result being above the failure criteria. In some instances for binders with $\Delta$Tc values less than −5° C. this can require performing the BBR test at three or more test temperatures. $\Delta$Tc values calculated from data when the BBR criteria requirements referred to above are not met may not be accurate.

Pavement surface characteristics and changes in them can be revealed in an asphalt composition. These surface characteristics can be determined using atomic force microscopy (AFM). AFM is described for example in R. M. Overney, E. Meyer, J. Frommer, D. Brodbeck, R. Lüthi, L. Howald, H.-J. Güntherodt, M. Fujihira, H. Takano, and Y. Gotoh, "Friction Measurements on Phase-Separated Thin Films with a Modified Atomic Force Microscope", Nature, 1992, 359, 133-135; E. zer Muhlen and H. Niehus, "Introduction to Atomic Force Microscopy and its Application to the Study of Lipid Nanoparticles", Chapter 7 in Particle and Surface Characterization Methods, R. H. Muller and W. Mehnert Eds, Medpharm Scientific Pub, Stuttgart, 1997; and in H. Takano, J. R. Kenseth, S.-S. Wong, J. C. O'Brien, M. D. Porter, "Chemical and Biochemical Analysis Using Scanning Force Microscopy", Chemical Reviews 1999, 99, 2845-2890.

AFM is a type of scanning microscopy that provides high resolution, three-dimensional imaging at the atomic and molecular level. AFM can be used for both topographical imaging and force measurements. Topographical imaging involves scanning the cantilever/tip across the sample surface. A laser beam is reflected off the back of the cantilever, and small changes in cantilever deflection are detected with a position-sensitive photodiode detector. This deflection is processed by the system electronics to determine topological height changes on the sample surface.

The surface defects may be measured as the surface roughness, expressed as average roughness over an image surface, based on the average height of the roughness extending out of the surface of the sample expressed in $\mu$m, and with the defect area (i.e. the non-smooth plane of the sample) expressed in $\mu$m$^2$ and as a percent of the image area (e.g., as a percent of a 400 $\mu$m$^2$ image area). AFM can be used to determine the effects of the sterols on an asphalt composition, and was used to determine the effects of pure sterols on asphalt compositions in the following publications: US 2016/0362338; WO 2017/027096; WO 2017/213692; and WO 2017/213693.

In some embodiments, a method for identifying aging in an asphalt composition and slowing the aging or restoring the aged asphalt includes analyzing an asphalt composition for the presence or absence of surface defects, wherein the asphalt is determined as aging if minimal surface defects are detected; and adding a pure sterol:crude sterol and virgin binder to the aged asphalt binder composition to reduce or slow the aging. In some embodiments, the aged asphalt compositions include recycled asphalts, softening agents, and rejuvenating agents. For example, some asphalt compositions include RAS, RAP, REOB, virgin paraffinic or naphthenic base oils, untreated or non-rerefined waste drain oils or waste engine oil materials, vacuum tower asphalt extenders, paraffinic or naphthenic processing oils and lubricating base oils. In some embodiments, the average roughness of an asphalt composition with sterol is 1.5 to 350 μm from 3.6 to 232 μm, or from 10 to 230 μm.

Other physical and chemical compositional properties that are indicative of binder aging are the Rheological Index, referred to as the R-Value; and increase in asphaltene content in binder as it ages. Asphaltenes are defined as a fraction of asphalt that is insoluble in normal heptane. They exhibit a molecular weight (1000 Daltons or higher), are comprised of condensed ring structures and are aromatic in character. As binders age the asphaltenes increase while cyclics (polar aromatic compounds) decrease, resins increase and saturates tend to change very little. The Colloidal Index (CI) captures the overall change in asphalt chemical compositional change due to aging. The CI is calculated as follows:

$$\frac{\text{resins} + \text{cyclics}}{\text{asphaltenes} + \text{saturates}}$$

The R-Value of a binder increases as binder ages. This is because R-Value is calculated as the difference between the Log of the complex shear modulus (G*) when the phase angle is equal to 45° and Log of the complex shear modulus (G*) at what is referred to as the glassy or limiting brittle modulus, which is typically set equal to 1 E9 Pascals. As binder ages G* increases and the binder becomes more brittle therefore G* must decrease before it can achieve a phase angle of 45° relative to a binder with less aging. Because the log of the glassy modulus does not change or changes only slightly the difference between Log of the glassy modulus and log of modulus at a phase angle of 45° becomes larger and the result is a R-Value that increases as binders age.

R-Value is determined based on the rheological properties of the binder and asphaltene content is obtained by performing a chemical separation of the main component fractions that comprise the asphalt binder. Both properties are impacted by binder aging but because their properties are not determined from the same type of test the result of asphaltene content and R-Value are independently determined; the result of one test cannot influence the other. This is important when showing the benefit of sterol in retarding the aging of binders. See for example, references related to R-Value development in the following: *SHRP-A*-369 *"Binder Characterization and Evaluation*, Volume 3: *Physical Characterization"* pp: 25-26 *Published by Strategic Highway Research Program, National Research Council*, Washing, DC 1994 *National Academy of Sciences* 2101

Constitution Ave, N. W. Washington, D.C. 20418; *"Interpretation of Dynamic Mechanical Test Data for Paving Grade Asphalt Cements"* Donald W. Christensen, Jr. and David A. Anderson *Proceedings of the Association of Asphalt Paving Technologists*, Vol 61, 1991, pp: 77-80 *"Physical Properties of Asphalt Cement and the Development of Performance-Related Specifications"* David A. Anderson, Donald W. Christensen, and Hussain Bahia *Association of Asphalt Paving Technologists*, Vol. 60, 1990, pp: 437-475.

When additives of any sort are added to asphalt binders the properties of that binder are altered. Some additives improve binder performance, some soften an aged binder, some improve elastic properties to help prevent rutting of pavements, some enable aged binders present in RAP or RAS to be used reused or in new construction, some are claimed (not necessarily correctly) to rejuvenate aged binders or even to reverse binder aging. Regardless of the additive added to asphalt binders the goal is to beneficially alter the physical properties of the binder at least in the short term and possibly in the long term.

Additions of additives to asphalt binders can also be examined by plots referred to as "Black Space" plots, by examining asphaltene changes due to the addition of sterol and by examining the impact of sterol on the development of asphaltenes in the binder as the binder is aged in the laboratory. Comparative analysis is performed using a control binder with no sterol additive as well as some other additives commonly marketed as asphalt binder rejuvenators when added to the same control binder followed by further aging. Rheological Index also known as R-Value can also be explored to further show beneficial changes imparted by sterol compared to the changes imparted by some other materials.

Figure 61:
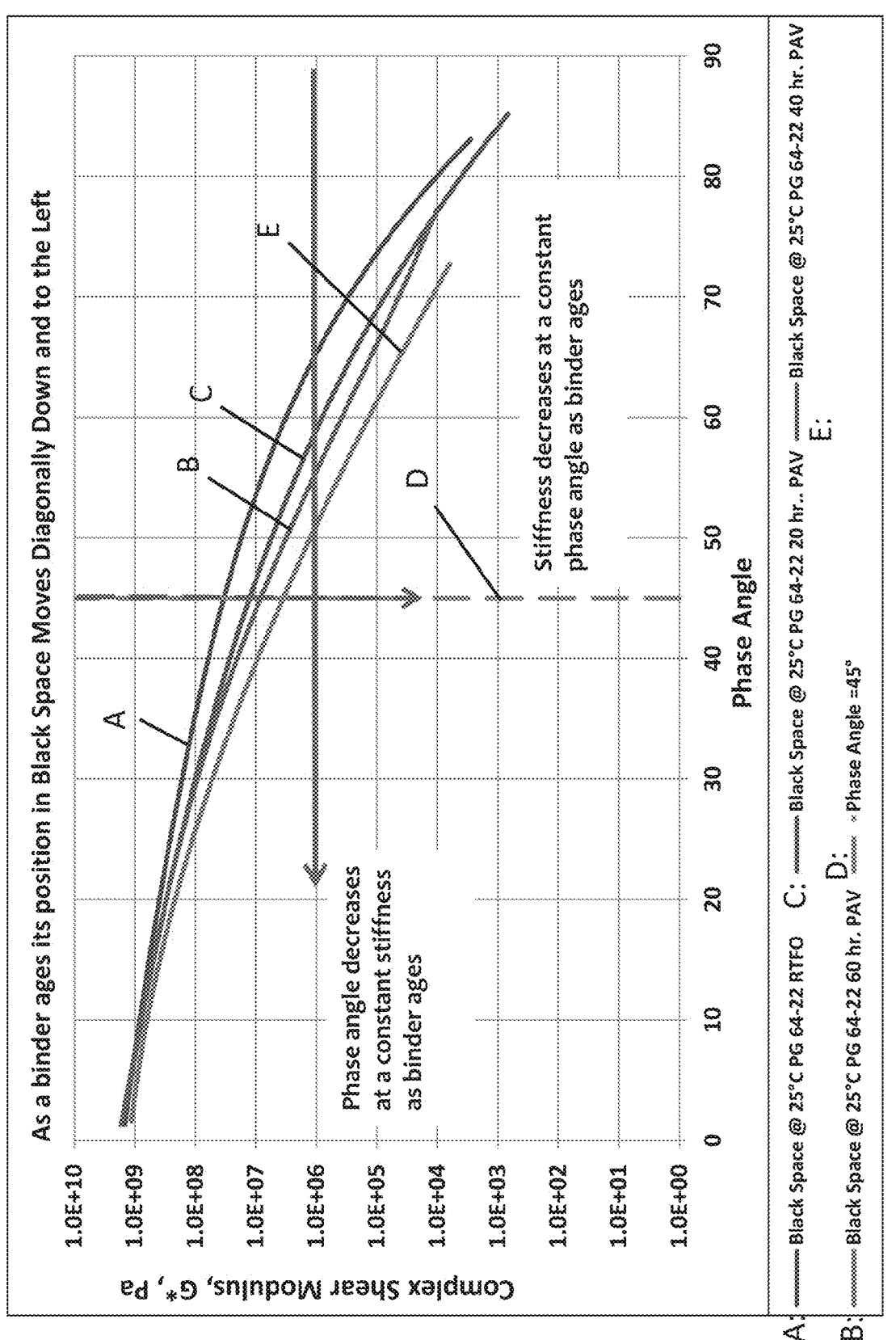
FIG. 61 shows Black Space plots for a PG 64-22 binder at different aging conditions.

A Black Space plot as defined in the study of asphalt binder rheological testing is a plot of Log complex shear modulus, G*, plotted as a function of the phase angle. The data is obtained using a dynamic shear rheometer to determine elastic and viscous moduli and from those two parameters the complex shear modulus can be calculated. As asphalt binders age their G* property increases, and their phase angle decreases. From a physical property perspective this means that the binder becomes stiffer (higher G*) and more brittle (more Hookean) (lower phase angles). The net result is that for a typical asphalt binder that is subjected to rolling thin film aging and Pressure Aging Vessel (PAV) aging a unique set of curves is generated in Black Space describing what is happening to the binder as it ages. FIG. 61 shows Black Space plots for a PG 64-22 binder at different aging conditions. The RTFO aged sample has a phase angle at 1 MPa of about 65°, the 20 hour PAV sample a phase angle at 1 MPa of about 58°, the 40 hour PAV sample a phase angle at 1 MPa of about 54°, and the 60 hour PAV sample a phase angle at 1 MPa of about 50°. With each successive aging step the phase angle at an isostiffness of 1 MPa becomes more brittle and increased brittleness leads to fatigue cracking failure. A binder additive that can beneficially alter the position of a binder in Black Space would be desirable.

The present application is further illustrated in the following non-limiting examples, in which all parts and percentages are by weight unless otherwise indicated.

EXAMPLES

Materials and Methods

For these experiments, a PG 58-28 aged in thin films at 135° C. for an average of 70-72 hours to yield a source of aged asphalt binder. To samples of the aged asphalt binder are added varying sterol amounts simulate an aged asphalt binder. To the aged asphalt binders are added varying sterol amounts. The sterol is available from MP BIOMEDICALS, Solon, OH, Catalog No. 02102886-(beta-Sitosterol ~40- 60%; campesterol ~20-40%; Stigmasterol~5%) and referred herein as the sterol), or no additive to serve as a control. All samples were tested as blended with no further aging or further aged in Pressure Aging Vessel (PAV) according to established aging conditions used in the paving industry (see, for example, ASTM D6521). At the unaged condition (viz., no further PAV aging) and after each aging cycle the high temperature PG grade results were determined using ASTM 7175 "Standard Test Method for Determining the Rheological Properties of Asphalt Binder Using a Dynamic Shear Rheometer," TS-Critical, Tm-Critical, and ΔTc values were obtained from 4 mm Dynamic Shear Rheometer data following test procedures developed by Sui, et al. (Chang-ping Sui et al., "New Technique for Measuring Low-Tem-perature Properties of Asphalt Binders with Small Amounts of Material" Transportation Research Record, Transporta-tion Research Board, Washington, DC, U.S., Vol. 2179, 1 Dec. 2010, pages 23-28).

Asphaltenes were determined as n-heptane insolubles according to ASTM D3279. The high temperature stiffness properties of all samples at all aging conditions was deter-mined using ASTM D7175 and low temperature properties were determined using 4 mm Dynamic Shear Rheometer (DSR) procedure according to (Sui C. 2010), (Sui C. F., 2011), (Farrar, 2012). Data analysis was performed using RHEA software (ABATECH, 2018) Using 4 mm DSR geometry is it possible to determine the low temperature limiting stiffness (S-value) grade and low temperature lim-iting relaxation (m-value) grade of the bitumen after each aging step. These parameters will be referred to TS-Critical and Tm-Critical respectively. Based on these data the param-eter Delta Tc (ΔTc) is calculated as (TS-Critical–Tm-Criti-cal) which is an industry adopted modification of work reported by Anderson et al (Anderson, 2011). IATROSCAN analysis and Fourier-transform infrared spectroscopy FTIR data was collected for all samples at all aging conditions.

IATROSCAN analysis is done using an IATROSCAN TH-10 Hydrocarbon Analyzer and the procedure used is described in J-F. Masson, T. Price, and P. Collins, "Dynam-ics of Bitumen Fractions by Thin-Layer Chromatography/ Flame Ionization Detection", *Energy & Fuels* 2001, 15, 955-960, and Baumgardner, G. L., Masson, J. F., Hardee, J. R., Menapace, A. M. and Williams, A. G., 2005. Polyphos-phoric acid modified asphalt: proposed mechanisms. *Jour-nal of the Association of Asphalt Paving Technologists,* 74, pp. 283-305. And Baumgardner, G. L., 2015. *Characteriza-tion and implementation of ground tire rubber as post-consumer polymers for asphalt concrete.* Mississippi State University. Briefly, Asphalt binders are deasphaltened according to ASTM Method D-3279 "Standard Test Method for n-heptane Insolubles" to yield asphaltenes (A) the n-hep-tane insoluble portion and maltenes (Resins (R), Cyclics (C), and Saturates (S)) which is the n-heptane soluble portion.

The maltenes are further evaluated on an IATROSCAN TH-10 Hydrocarbon Analyzer to yield the composition in saturates (S), cyclics (C) and resins (R). Fractionation of these components is accomplished by thin-layer chromatog-raphy (TLC) using silica gel support on glass rods (a component of the IATROSCAN TH-10 Hydrocarbon Ana-lyzer). This is accomplished by injection of a spot of concentrated maltene (residue from the n-heptane soluble portion obtained in the asphaltene extraction process) ad eluting the saturates (S) and cyclics on the silica gel surface layer of the rods. N-pentane is used to elute the saturates (S), and a 90/10 toluene/chloroform solution is used to elute the cyclics (C). The resins (R) are not eluted and remaine at the origin.

Resins (R), Cyclics (C), and Saturates (S) are quantified by burning the hydrocarbon compositions from the silica gel coated rods using a hydrogen flame and counting carbon and hydrogen content of the related fractions using a flame ionized detector (FID).

Example 1

This example shows that sterol slows or retards the aging rate of asphalt binder. This example also shows that a sterol-containing asphalt binder can be re-used or re-cycled to serve as the age-retarding sterol.

Figure 1:
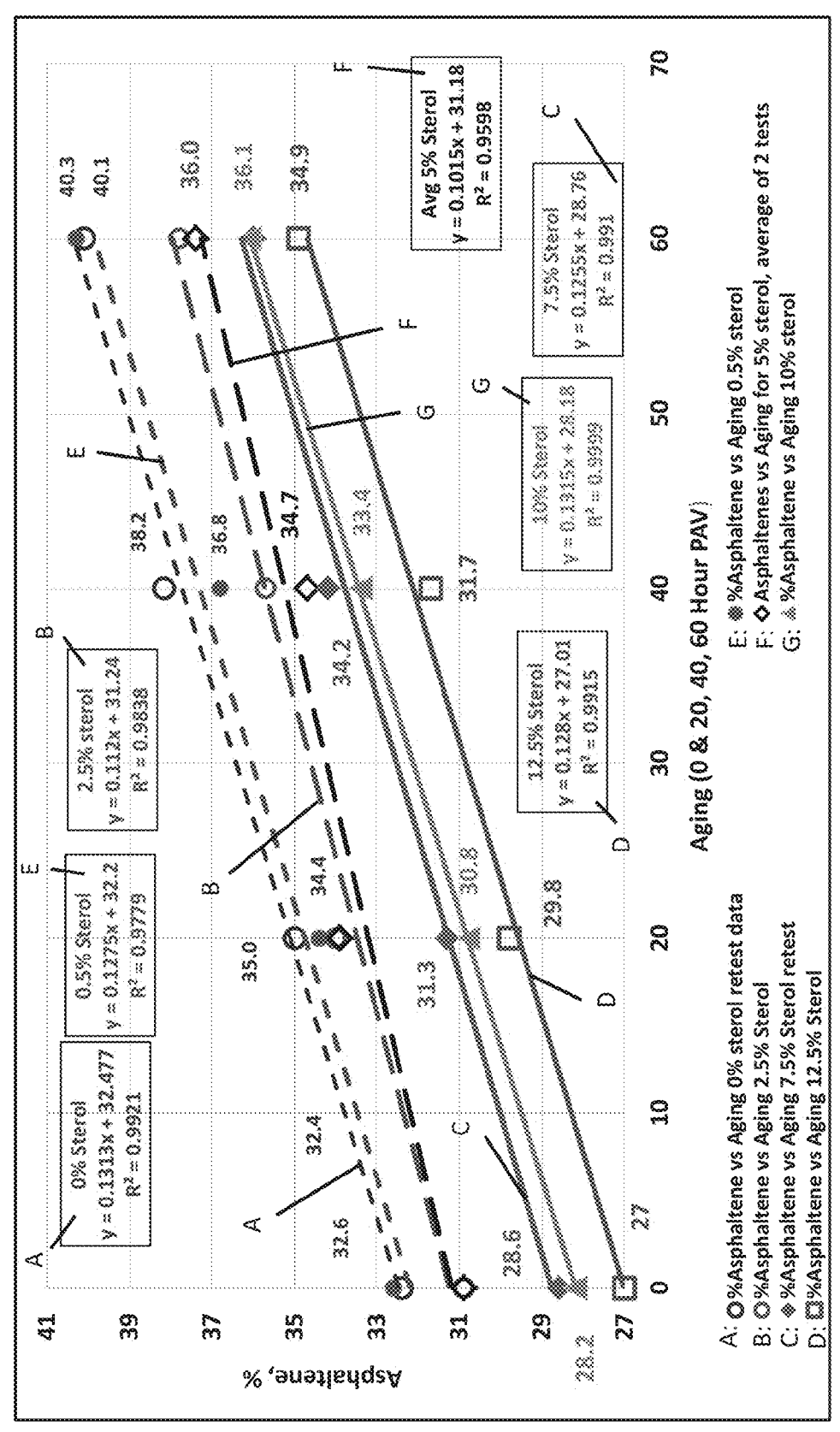
FIG. 1 is a plot of asphaltene concentration as a function of binder aging for aged base binder with various sterol loadings.

To laboratory aged binder was added with varying dosage levels of 0, 0.5%, 2.5%, 5%, 7.5%, 10%, and 12.5% sterol and each sample was aged for an additional 20, 40 and 60 hours in the Pressure Aging Vessel (PAV) following ASTM D6521. FIG. 1 shows that the 12.5% sterol blend after 60 hours of aging has an asphaltene content of 34.9% which is comparable to the asphaltene content of the 0% and 0.5% blends after 20 hours of aging. That amounts to three times more aging for the 12.5% bitumen compared to the untreated sample. The 5% sterol sample has an asphaltene level of 34.7% asphaltenes after 40 hours of aging which is compa-rable to the unaged sample after 20 hours of aging.

Figure 3:
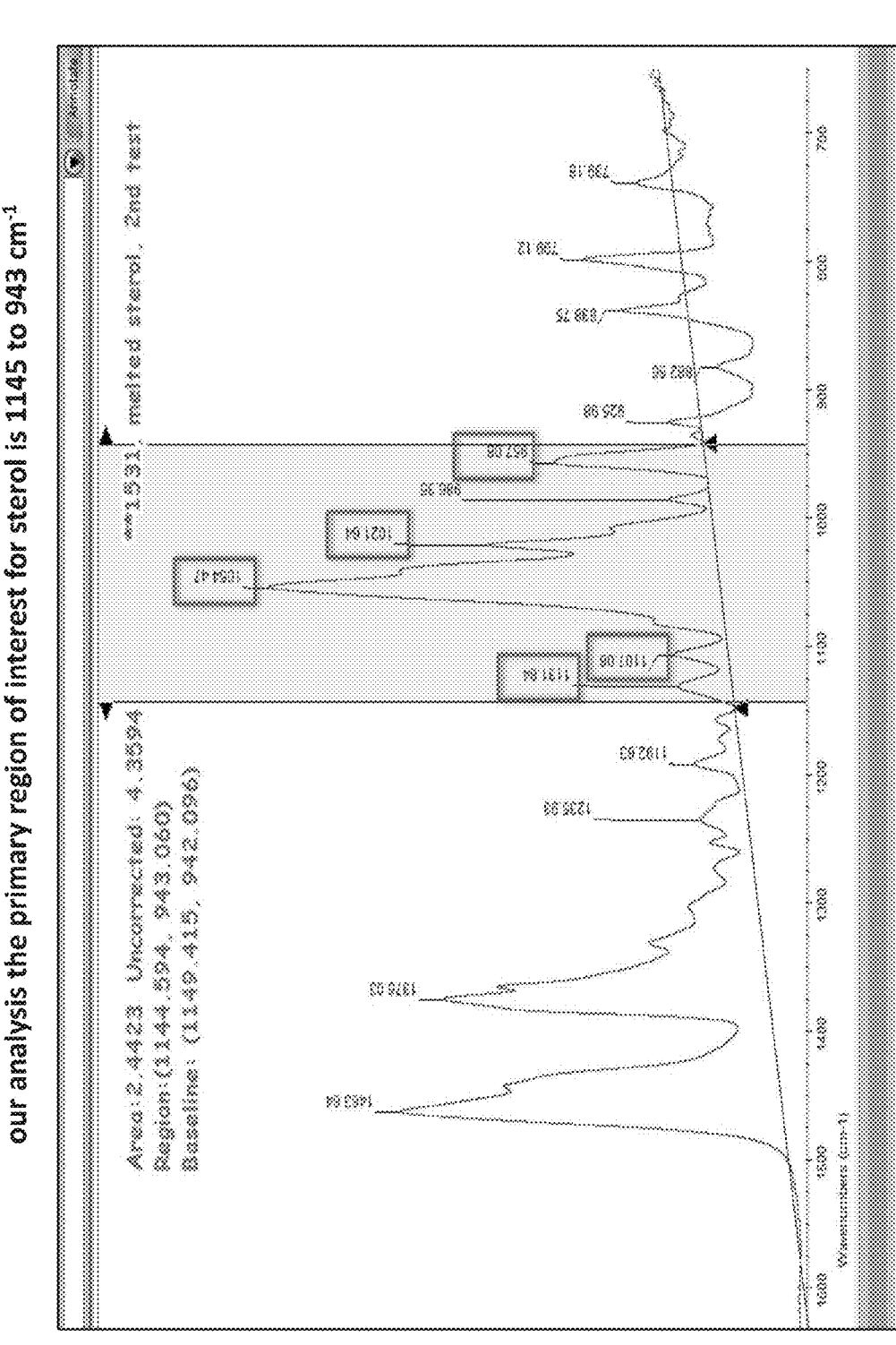
FIG. 3 is an enlarged plot of the wavenumber region of interest for sterols
Figure 4:
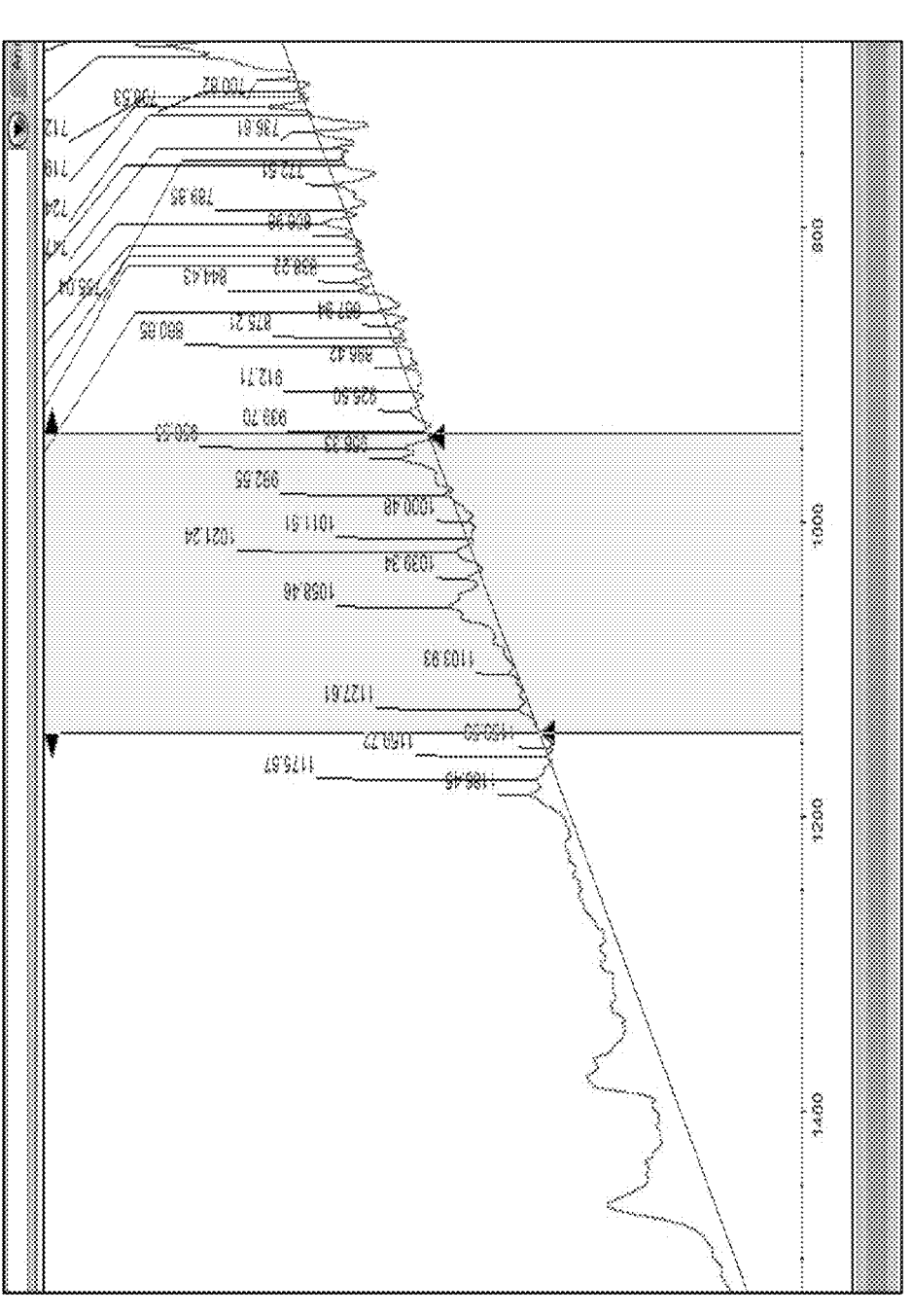
FIG. 4 is an enlarged plot of the FTIR subtraction result for 60 hour Pressure Aged Vessel (PAV) asphalt binder with 5% sterol minus the FTIR of 60 hour PAV with no sterol.
Figure 5:
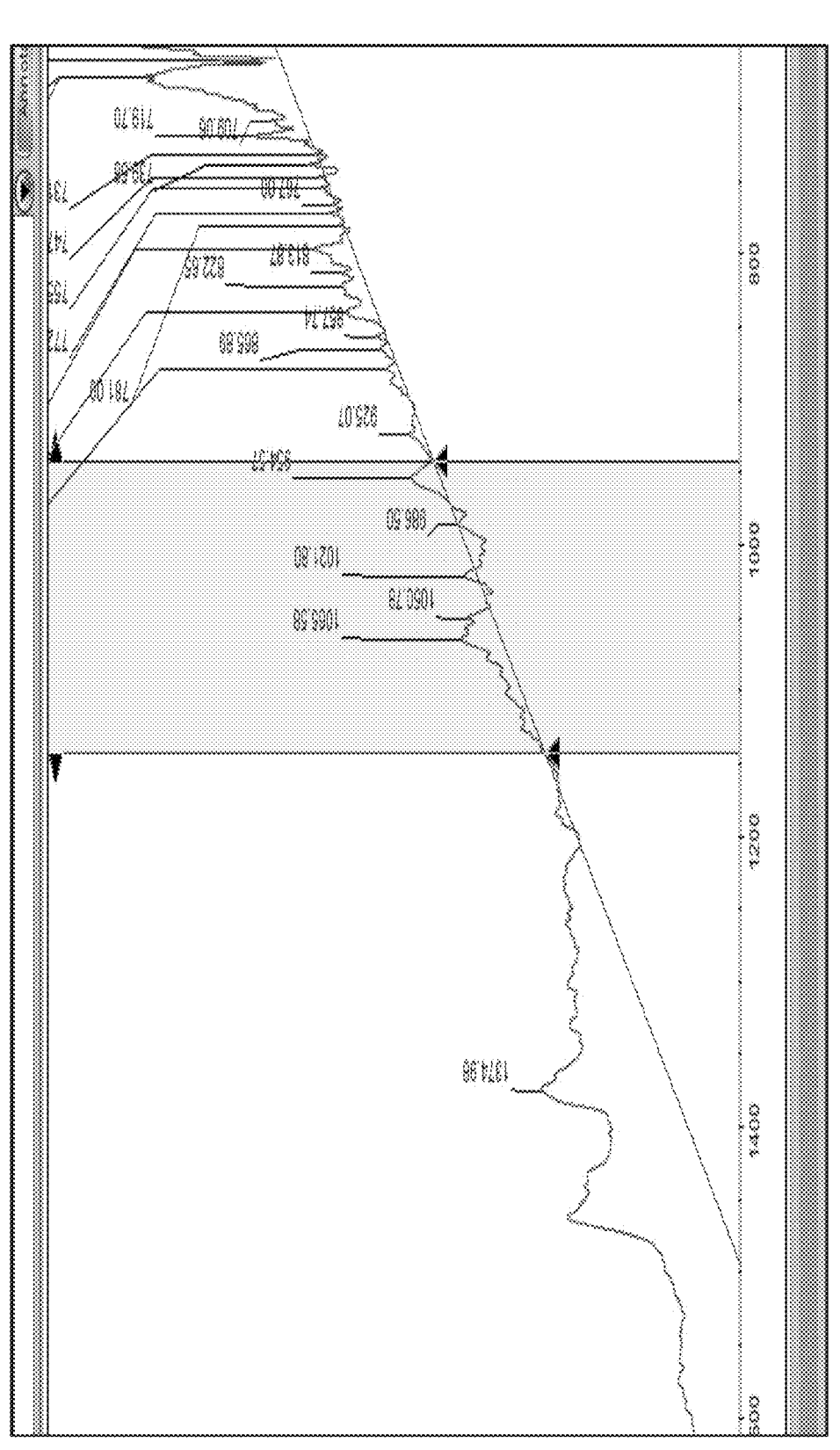
FIG. 5 is an enlarged plot of the subtraction result for FTIR of 60 hour PAV of 50/50 blend of 0% sterol and 10% sterol minus FTIR of 60 hour PAV with no sterol.
Figure 6:
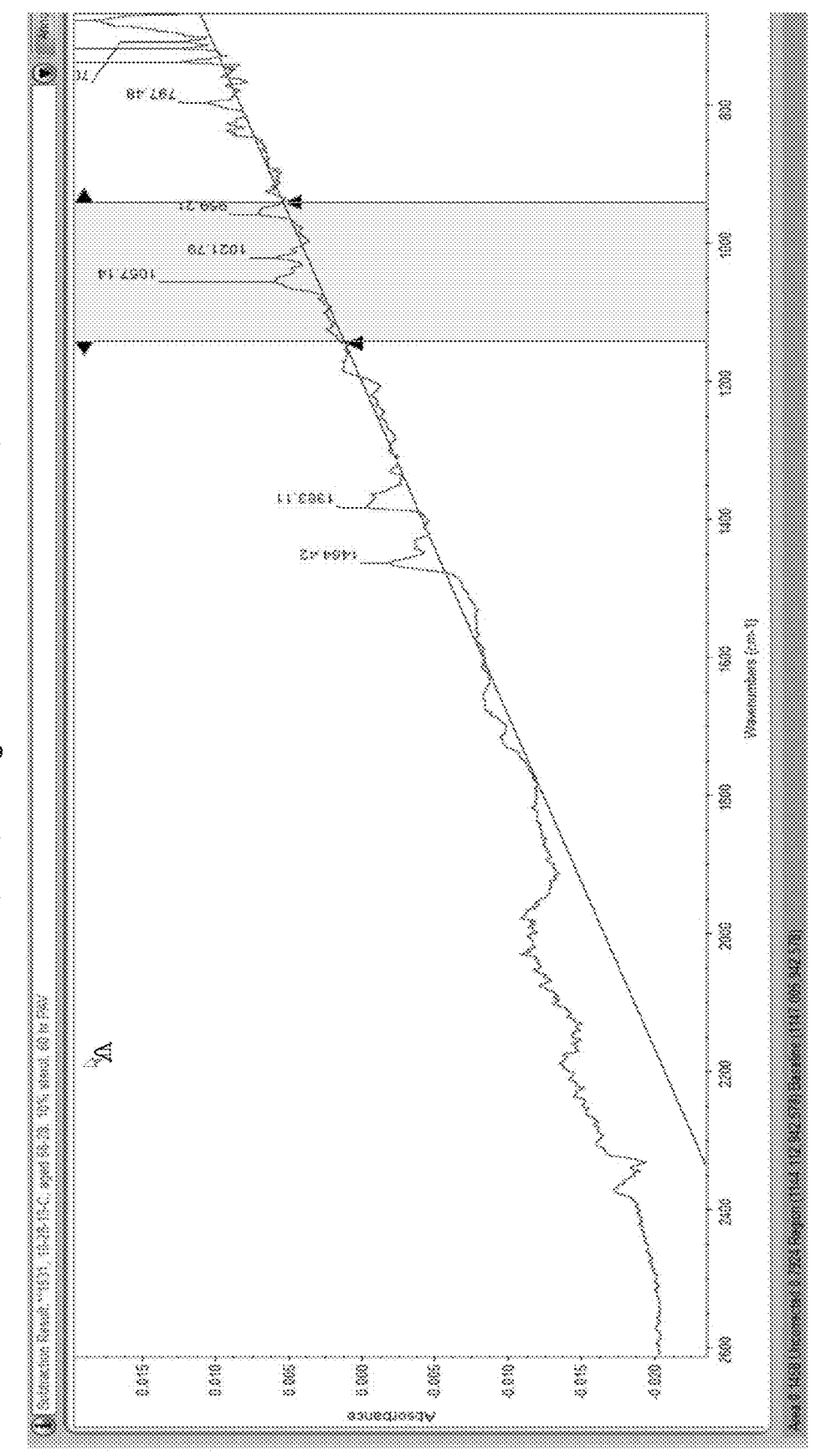
FIG. 6 is a plot of the FTIR subtraction result for 60 hour PAV with 10% sterol minus the FTIR of 60 hour PAV with no sterol.

These samples were also evaluated by FTIR plots of aged binder with different levels of sterol at aging times ranging from 0 to 60 hours in the PAV. FIGS. 2 and 3 are FTIR spectra of pure phytosterol showing the wavenumber regions relevant to the sterol OFF' functionality FIG. 2 and FIG. 3 shows the spectral region used to quantify the sterol functionality after blending with binder followed by aging. FIG. 4 shows the FTIR results for the spectra of the 60 hour PAV of the control binder subtracted from the FTIR spectra of the 60 hour 5% sterol blend and FIG. 5 shows the FTIR results for the 60 hour PAV of the control binder subtracted from the FTIR spectra of the 50/50 blend of the 60 hour PAV with no sterol and the 60 hour PAV of a 10% sterol blend in the same starting binder. Comparing the FTIR spectra in FIGS. 4 and 5 shows that the sterol region covering wav-enumbers 1145 $cm^{-1}$ to 943 $cm^{-1}$ are similar in appearance and quantification. The results in FIG. 4 are for a sample with 5% sterol that was aged for 60 hours while the results in FIG. 5 are for data of two 60-hour aged samples combined in equal amounts, one with no sterol and one with 10% sterol. The FIG. 4 data shows for the 5% sterol sample that sterol is still present after 60 hours of aging and the FIG. 5 data shows that when the 10% sterol sample was blended with an equal amount of bitumen with no sterol the results match the 5% sterol sample in FIG. 4. This result suggests that the 10% sterol was not consumed or reacted during the aging of the 10% sterol binder. FIG. 6 is the subtraction spectra result for the 60-hour aged 10% sterol blend used to produce FIG. 5. Based on the quantification data in FIG. 6 the sterol area is slightly more than double that of the same spectral regions in FIGS. 4 and 5. This suggests that the full 10% sterol is present in the sample prior to blending with the 0% sterol sample.

Example 2

Figure 7:
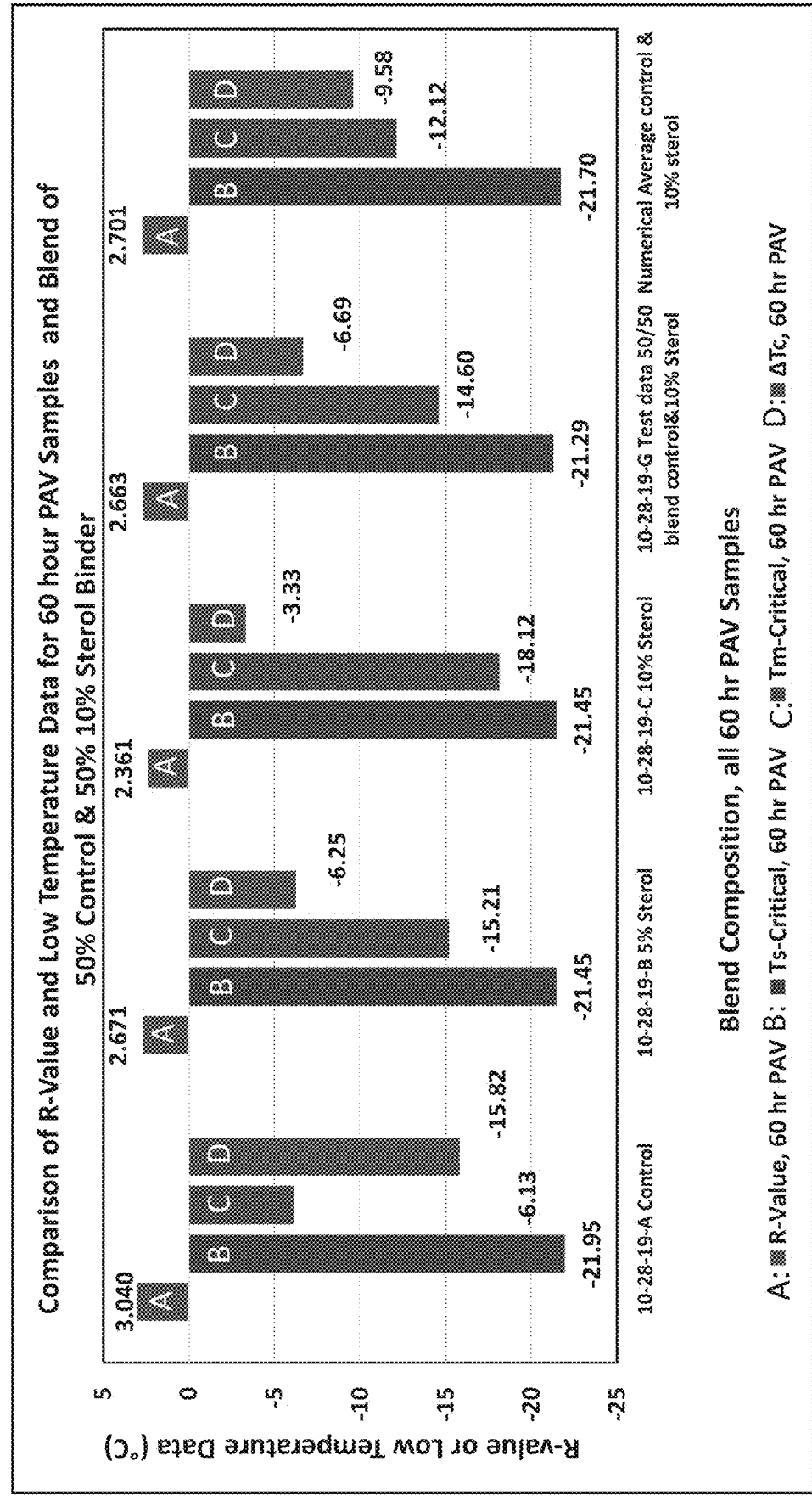
FIG. 7 is a comparison of R-value and low temperature property data for 50% aged binder with 10% sterol blended with aged binder containing no sterol for 60-hour PAV samples.
Figure 8:
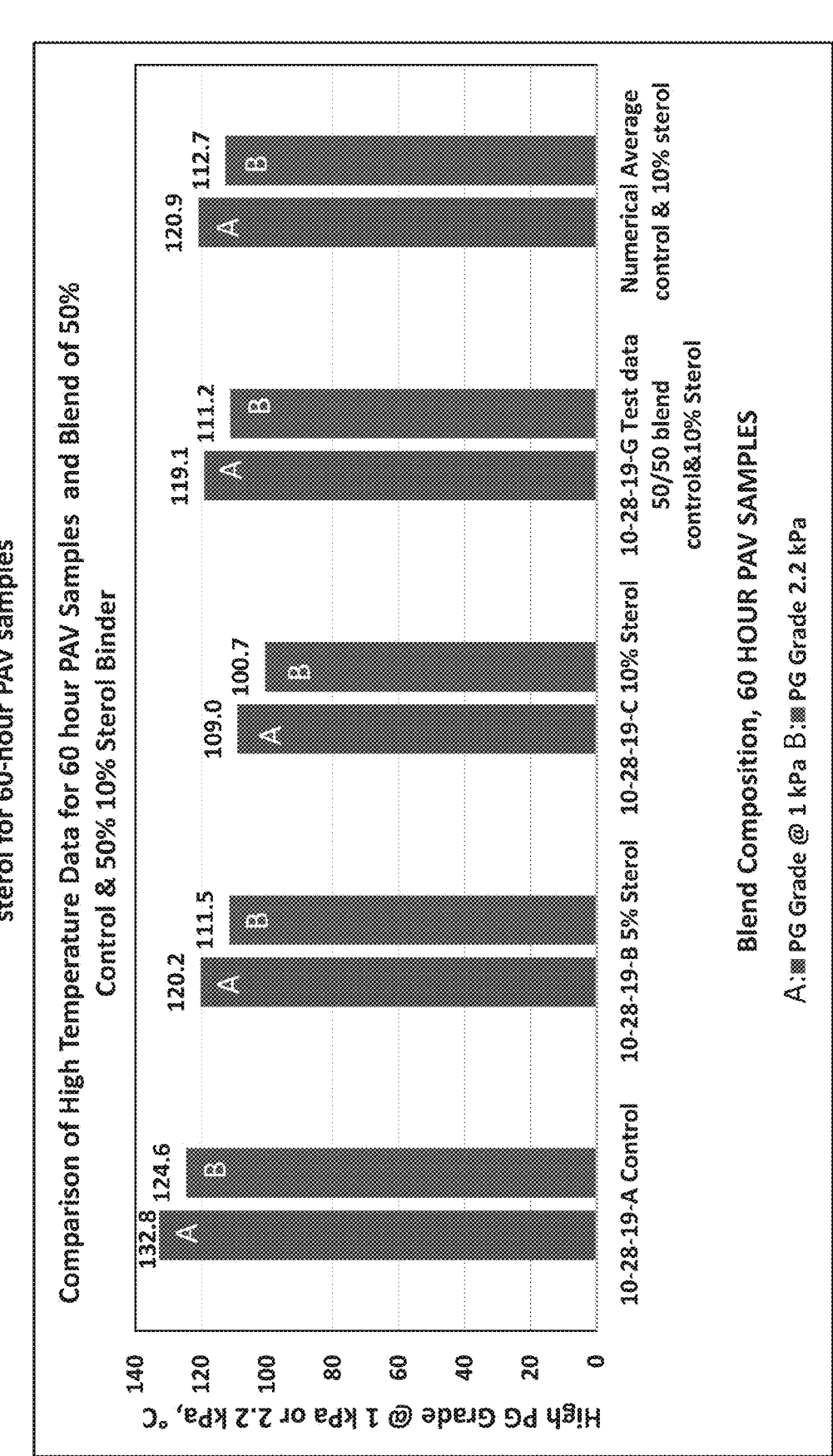
FIG. 8 is a high temperature PG grade comparison for 50% aged binder with 10% sterol blended with aged binder containing no sterol for 60-hour PAV samples.

The sterol already present in an aged asphalt binder was tested to determine if it can serve as a source of an age-retarding sterol additive. 20 grams of the 60 hour PAV sample with 10% sterol was blended with 20 grams of the 60 hour PAV sample of control binder with no sterol. This would mean that the final blend contained a theoretical amount of 5% sterol if none of the sterol has been consumed by the PAV aging. If the assumption of no sterol loss is valid the high temperature and low temperature properties should be similar to the data for the 60-hour 5% sterol blend. FIG. 7 shows R-Value and low temperature data for 60-hour PAV aged samples of the aged base binder control, 5% and 10% sterol, and a 50/50 blend of 10% sterol and the control. Also shown for comparison is the numerical average of data for the 10% sterol and control samples. The data in FIG. 7 shows that numerical average and data for the 50/50 physical blend are somewhat similar but not identical. The R-Values for the 5% sterol sample and the 50/50 numerically averaged blend are very close whereas the numerical average is higher. This numerical average result means that the more substantial aging of the control skews the R-Value data of the 50/50 physical blend towards the R-Value of the control binder. The same is true of the Tm-Critical data and the ΔTc data. The numerical average for Tm-Critical is 2.5° C. warmer than the 50/50 physical blend data. Because the Ts-Critical data is similar for all samples the resulting ΔTc data shows the numerical average is nearly 3° C. more negative than ΔTc for the 50/50 blend. The high temperature data shown in FIG. 8 shows the numerical average values are skewed towards the high temperature values of the control while the results for the 50/50 physical blend are within 1° C. of the original 5% sterol sample.

Figure 9:
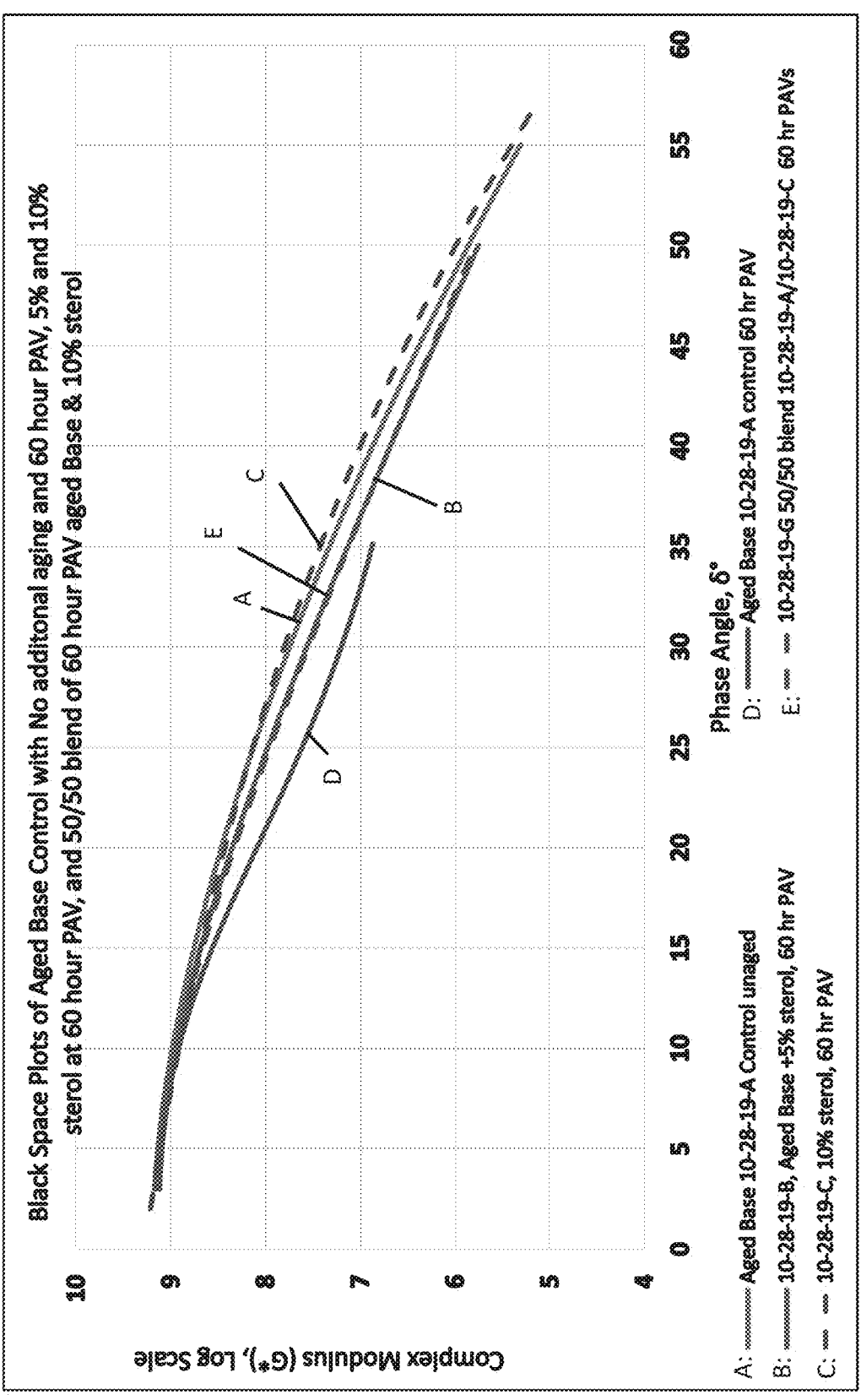
FIG. 9 is a Black Space plot of aged base control with no additional aging and 60 hour PAV, 5% and 10% sterol at 60 hour PAV, and a 50/50 blend of 60 hour PAV aged base & 10% sterol.

FIG. 9 shows the Black Space plots for several of the blends discussed above. A Black's plot is a plot of complex modulus (G*) in log scale as a function of phase angle in linear scale. This graphical arrangement is referred to as "Black Space". FIG. 9 shows Black's plots for the aged base control prior to any additional PAV aging and also the aged base control after 60 hours of PAV aging. The data shows at 1E7 Pascals of stiffness the phase angle has shifted from 38.7° for the unaged sample to 33.2° for the 60-hour PAV sample. The 10% sterol sample aged for 60 hours has a slightly higher phase angle (approximately 40.3°) than the unaged control; this is another indication of the age retarding benefits of sterol. Also shown are the data for the 5% sterol sample at 60 hours of aging and the 50/50 physical blend of the 10% sterol sample and the control sample both aged for 60 hours. The Black Space plots lie on the same line which means they are functionally the same material based on their physical properties. The FIG. 9 data also suggests that the 10% sterol was present and viable in the 60-hour aged sample such that when blended with the 60-hour aged control the phase angle was shifted to a higher value consistent with the 5% sterol sample.

Example 3

Additional experiments were conducted to show that sterol is not consumed nor chemically altered as the bitumen ages. In this experiment a PG 64-22 binder was used as the base material. Blends of 6% and 12% sterol in PG 64-22 were produced. All three binders were tested in the unaged condition and after aging for 60 hours in the PAV.

One aging period of 60 hours in the PAV was chosen because previous testing had shown a good linear relationship between PAV aging time and the resulting test properties and furthermore the purpose of this investigation is to show that after extended aging time the sterol is present in the aged binder and still viable as an age retarding additive.

Additional blends produced were
 a. PG 64-22 aged 60 hours+6% sterol post added as a comparison to PG 64-22+6% sterol aged for 60 hours
 b. PG 64-22 aged 60 hours+12% sterol post added as a comparison to PG 64-22+12% sterol aged for 60 hours
 c. 50% PG 64-22 (0% Sterol) aged 60 hours+50% PG 64-22+12% sterol aged for 60 hours. This blend to be compared to PG 64-22+6% sterol aged for 60 hours If 60 hours of PAV does not consume the sterol then blends of binder plus sterol that undergo 60 hours of aging should have properties similar to PAV aged binder+fresh sterol post added. Further the 50/50 blend of aged materials to produce a 6% sterol blend should have properties comparable to the 60 hour aged PG 64-22 with 6% sterol post added.

Rheological properties of all blends were tested to determine high temperature and low temperature properties, Rheological Indices (R-Value) were calculated. Asphaltenes were determined using ASTM D1759 and the resulting maltene fraction was characterized using the IATROSCAN test procedure to determine saturates, cyclics and resins followed by calculation of colloidal index.

As a component of the IATROSCAN test procedure it was determined that sterol becomes part of the resin fraction as do most bio derived recycling and softening additives. However, unlike the bio derived additives, sterol shows up as a separate peak within the resin elution area. The peak is present in unaged as well as in aged binders and is quantifiable by integrating the sterol region separately from the remaining resin area.

Black Space plots were generated comparing log G* as a function of phase angle for the various blends described above. The Black Space plots show that a 64-22+12% sterol blend aged for 60 hours follows the same data trace as PG 64-22 aged for 60 hours+12% sterol post added. Further the Black Space plots of blends pre-aged or aged binder plus post added 64-22 or a 50/50 blend of aged binder and aged binder plus 12% sterol to yield a 6% blend all follow the same Black Space data plot. The test properties of blends described above are shown in the Figures discussed below.

Figure 10:
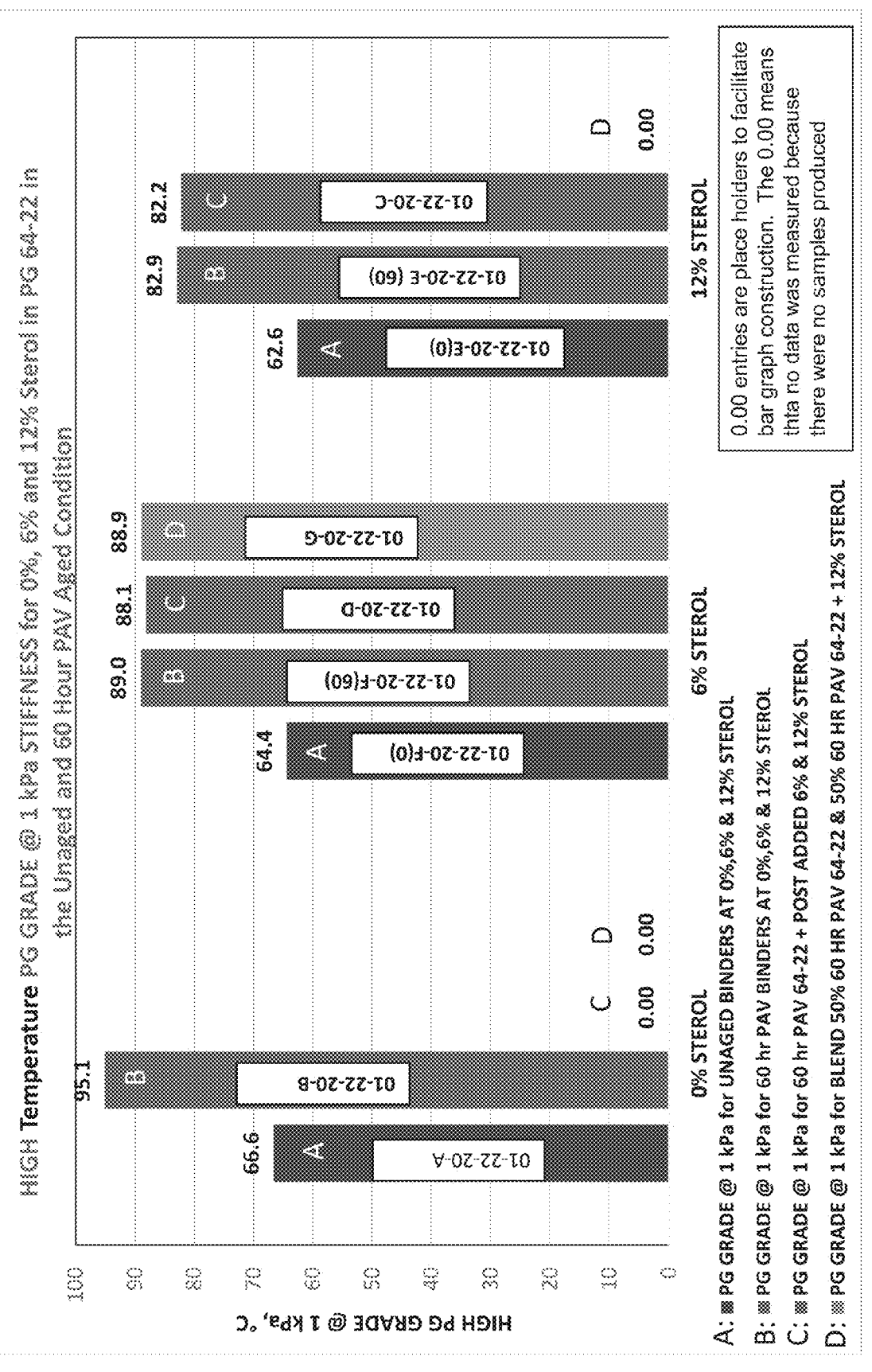
FIG. 10 is a high temperature PG grade at 1 kiloPascal of stiffness.
Figure 11:
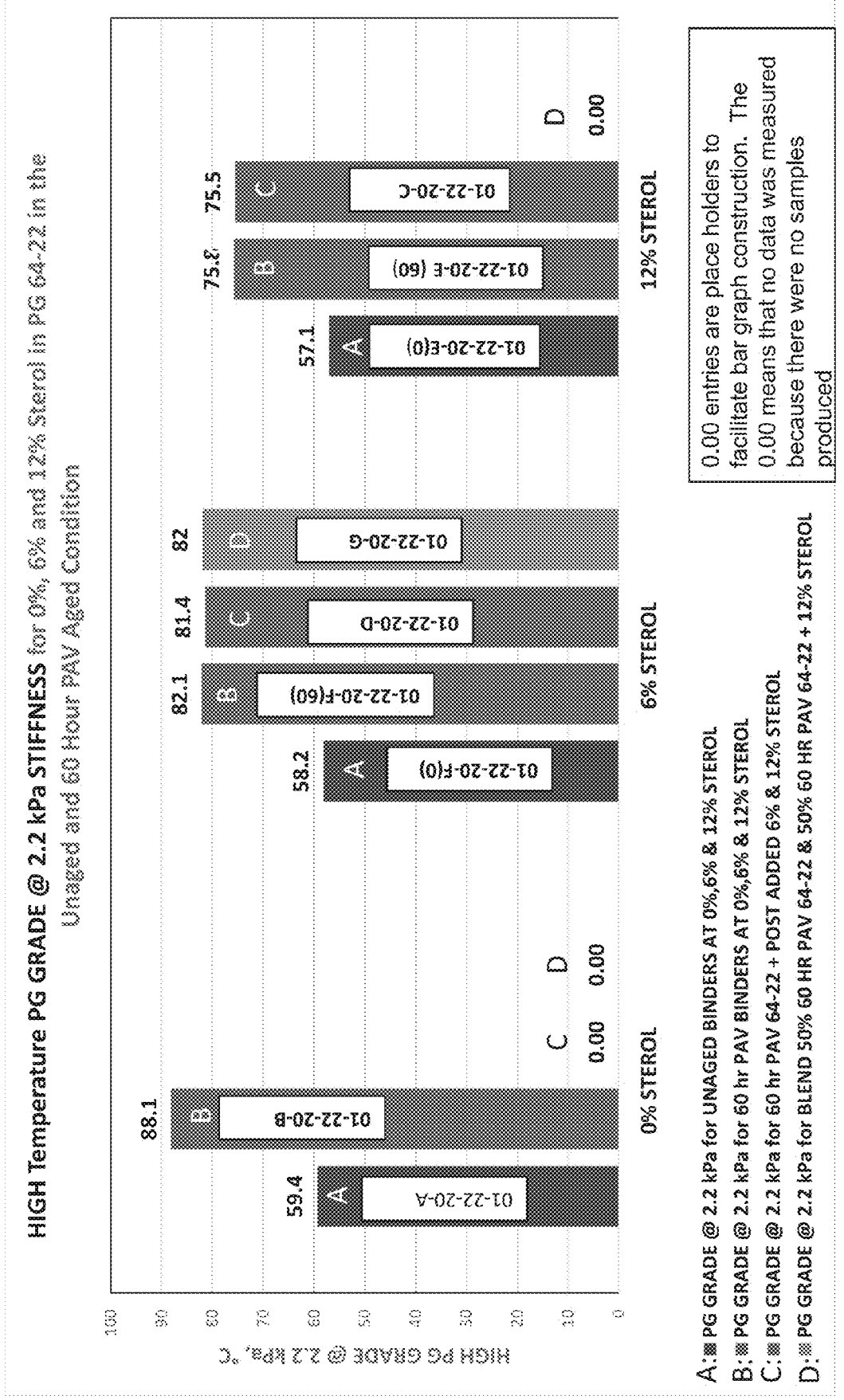
FIG. 11 is a high temperature PG grade at 2.2 kiloPascals of stiffness.

FIG. 10 and FIG. 11 show the high temperature PG grade of the binders at 1 kiloPascal of stiffness FIG. 10 and the high temperature grade at 2.2 kioPascals of stiffness FIG. 11 for PG 64-22+0% sterol, PG 64-22+6% sterol and PG 64-22+12% sterol. Also shown in these two figures is the high temperature PG grade after 60 hours of PAV aging and for the blends described in above.

Figure 12:
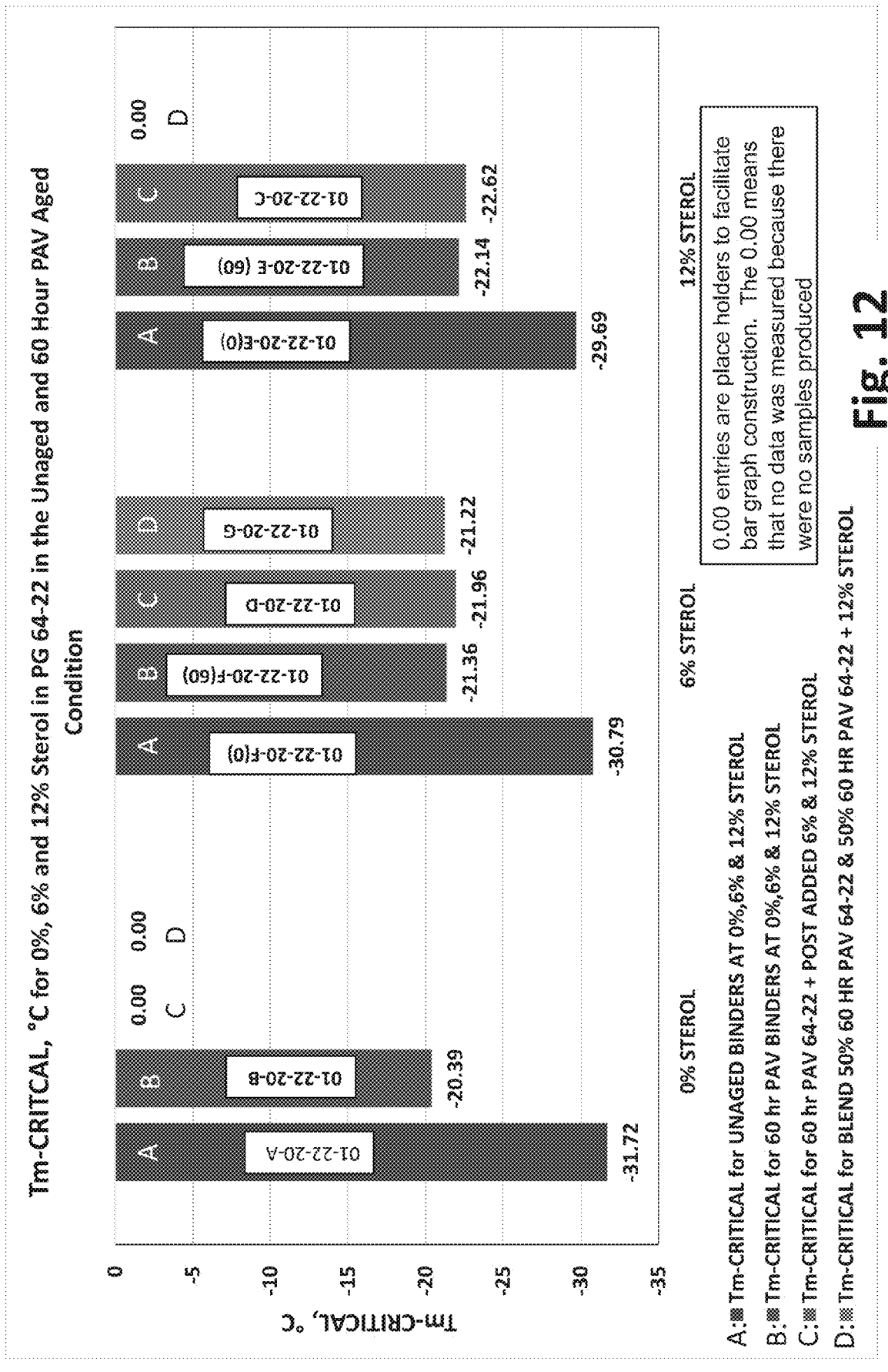
FIG. 12 is a plot of tm-critical for 0%, 6% and 12% sterol in PG 64-22 unaged and 60 hour PAV aged.

FIG. 12 shows the low temperature creep critical properties (Tm-Critical) of the same blends described. The low temperature stiffness properties (TS-Critical) show similarity in properties, but because other than for the unaged binder samples Tm-Critical controls the low temperature PG grade of the binder and therefore it is the property of importance.

Figure 13:
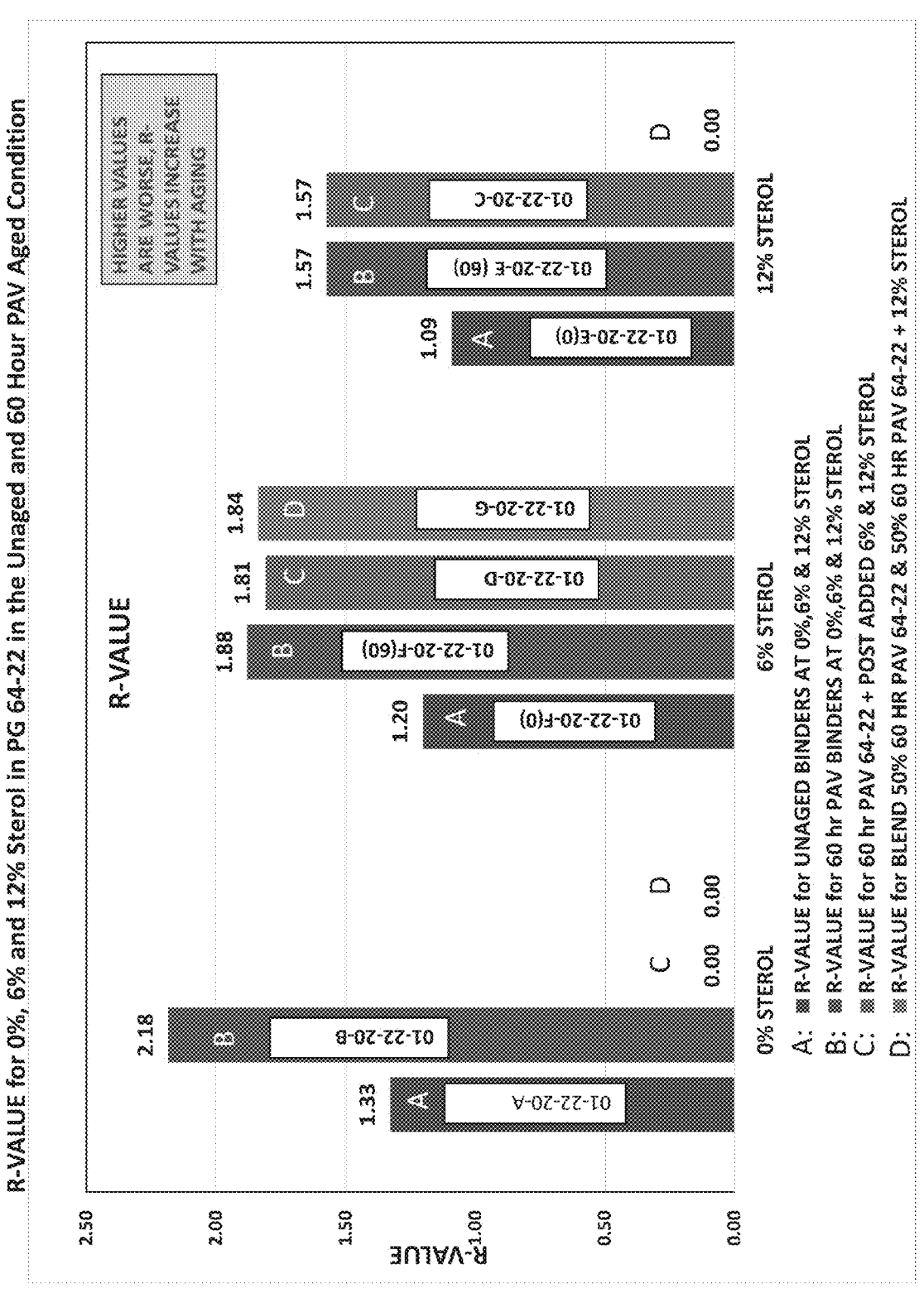
FIG. 13 is a plot of R-value for 0%, 6% and 12% sterol in PG 64-22 unaged and 60 hour PAV aged.

FIG. 13 shows the plot of R-value data for the unaged and aged blends with and without sterol. As binders age the R-value increases indicating reduced flexibility in the binder. A comparative examination of the Tm-Critical plots in FIG. 12 shows the samples with the lowest critical temperatures (viz. the best ability to relax low temperature thermal stress) are the samples with the lowest R-values in FIG. 13. FIG. 13 also shows that as sterol increases from 0% to 6% to 12% the R-values decrease both for the unaged and aged condition. Also, the blends that result in 6% sterol content have R-values within a value of 0.1 units regardless of whether the sterol was post added to an aged binder or preadded and then aged or whether two aged binders were blended to yield a final sterol concentration of 6%. The two 12% samples both post added and pre-added and aged have identical R-values.

Figure 14:
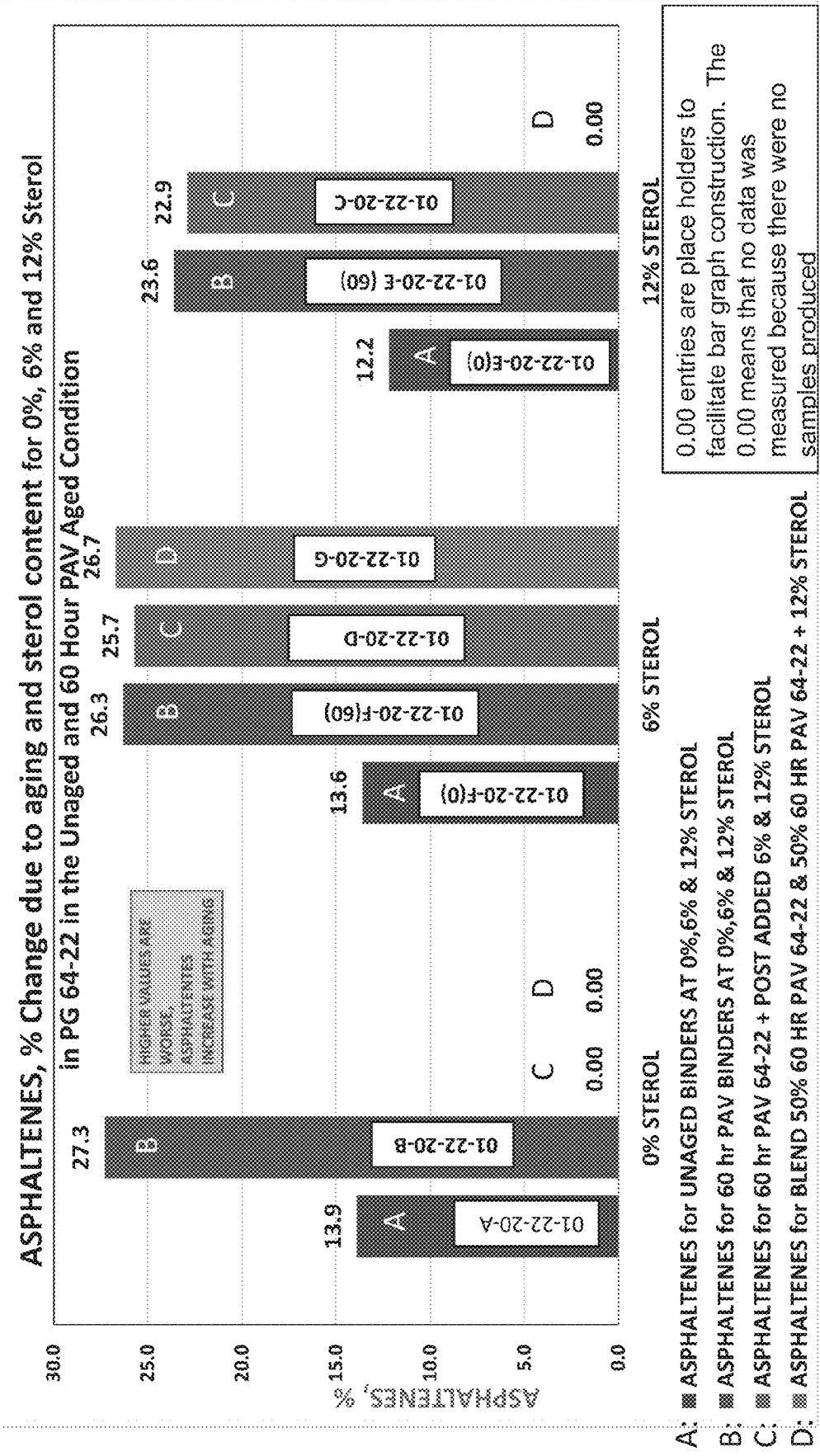
FIG. 14 is a plot of asphaltene % change due to aging and sterol content.

FIG. 14 shows the asphaltene content of the different binders with aging. The unaged binders show only small change in asphaltenes due to sterol addition. Even at 12% sterol the asphaltene decrease is 1.7%. After aging the difference is more pronounced. The 6% sterol addition only decreases the accumulation of asphaltenes by 1% to 1.6% for the pre-added and post added respective samples and the 12% addition decreases the accumulation of asphaltenes by 3.7% to 4.4% for pre-added and post added respective samples. Both the blends with sterol post added to 60-hour PAV aged PG 64-22 are lower in asphaltenes than the blends with pre-added sterol followed by aging. This indicates that post added sterol is slightly more effective in disrupting binder aging compared to preadded and aging. However, the 50/50 physical blend of aged 64-22 with no sterol and aged 64-22+12% sterol yielded a result very close to the 6% preblended and aged sample. These data are all similar and reflect that a similar amount of active sterol is present in the samples.

Figure 15:
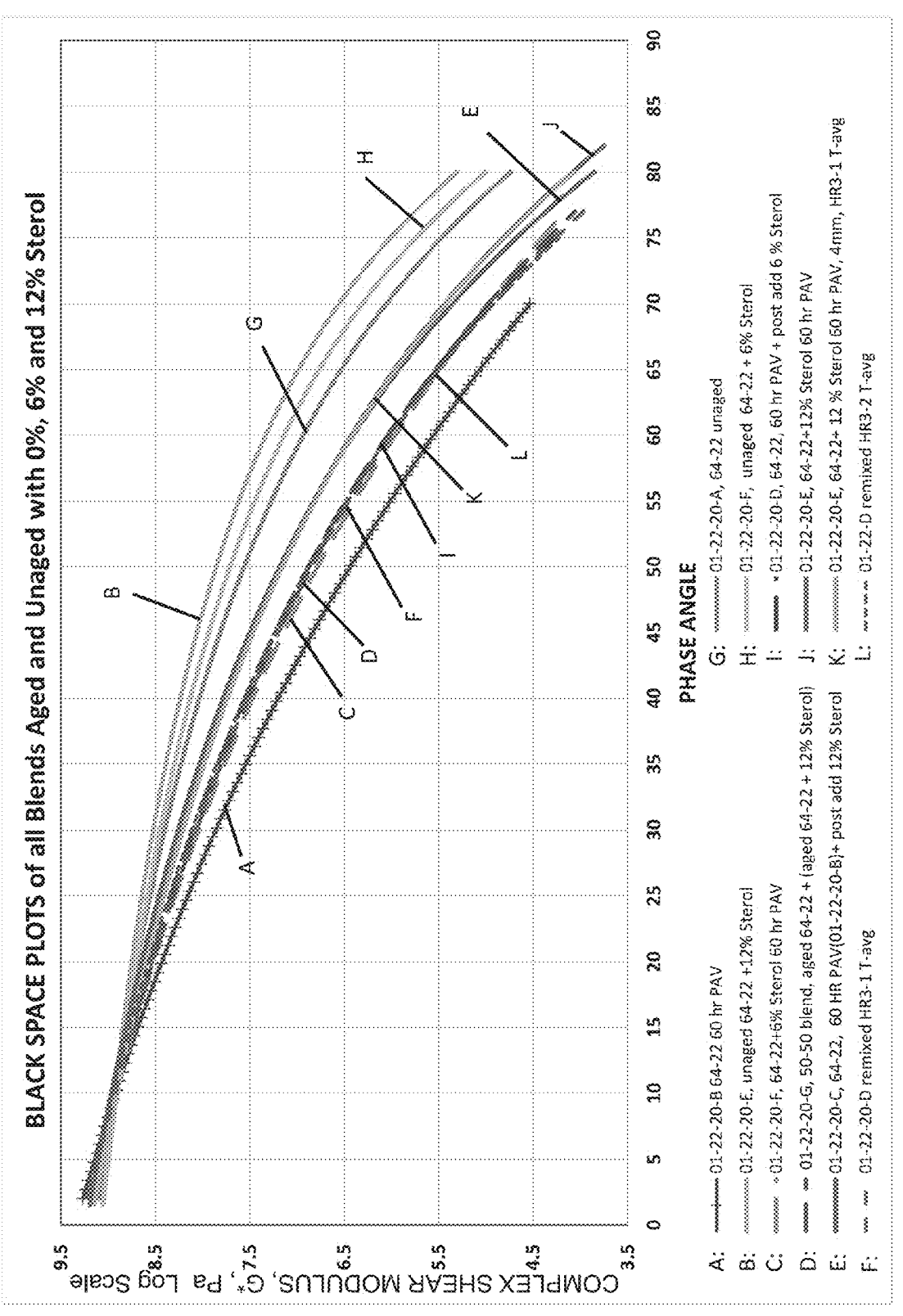
FIG. 15 is a Black Space plot of all blends aged and unaged with 0%, 6% and 12% sterol.
Figure 16:
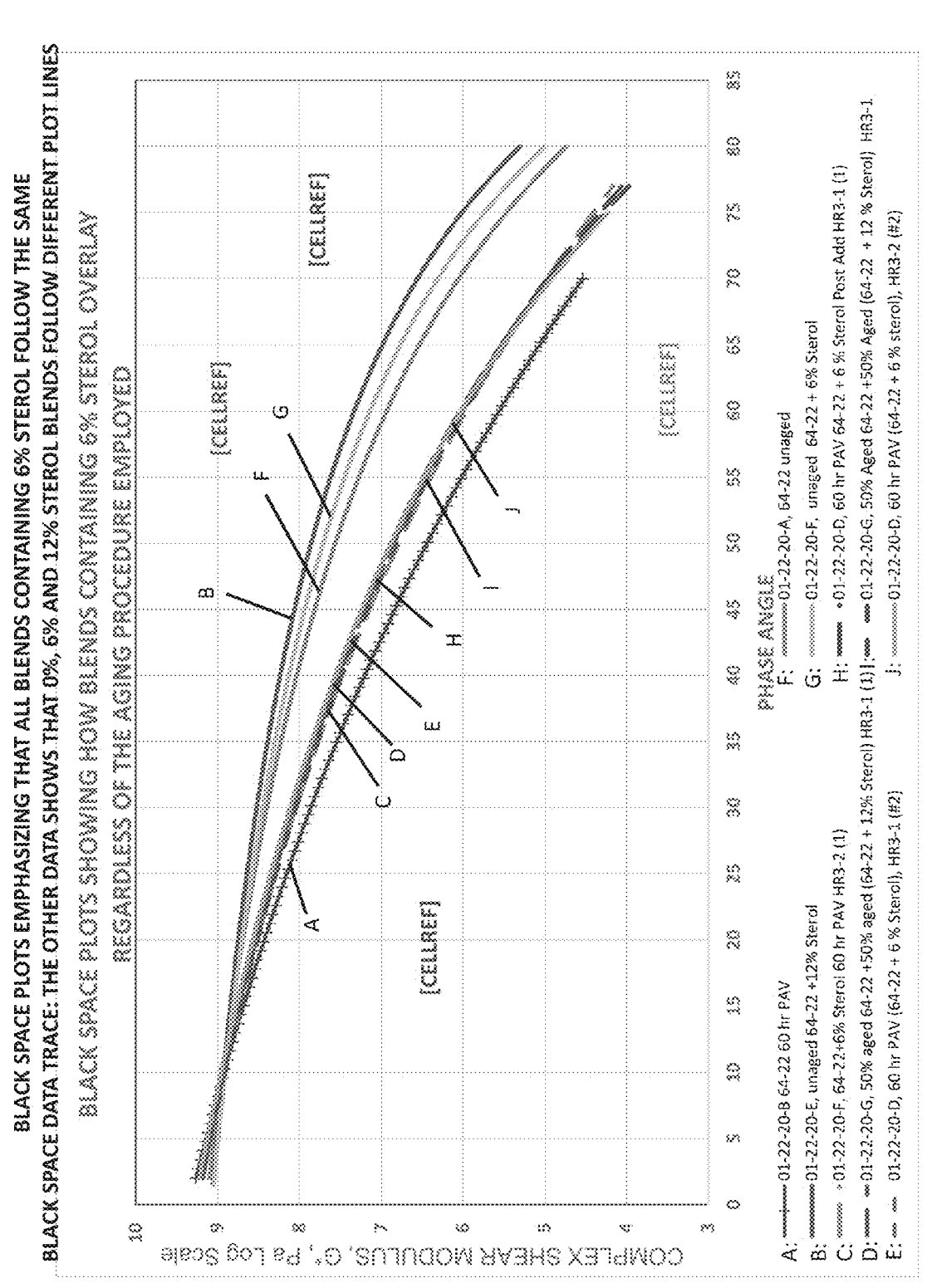
FIG. 16 is a Black Space plot emphasizing that all blends containing 6% sterol follow the same Black Space data trace: the other data shows that 0%, 6% and 12% sterol blends follow different plot lines.

FIG. 15 through FIG. 17 show Black Space plots for the results generated for the samples. FIG. 15 is a plot of all blends of PG 64-22 with 0%, 6% and 12% sterol unaged and aged plus the various blends described. The main points are that the 60 hour PAV of 64-22+12% plots the highest on the graph indicating that sample has the highest phase angle for any given complex shear modulus value. The higher the phase angle for a given modulus the more flexible is the binder. PG 64-22+6% sterol ranks second and the 0% sterol blend ranks third. PG 64-22+0% sterol aged for 60 hours has the lowest ranking. There are three plots of 12% sterol aged for 60 hours for the two samples. One sample was tested twice and results of both tests are plotted. The 60 hour PAV aged sample of pre-added 12% sterol and the 60 hour PAV of plain PG 64-22 with 12% sterol post added plot on the same Black Space line supporting the conclusion that there is no reduction in sterol properties due to aging. The Black Space plots of blends containing 6% sterol support this same conclusion. Multiple tests were performed on the 6% blends for both the pre-added and then reclaimed sterol blend, the blend with 6% sterol post added to PG 64-22 plain aged for 60 hours and the 50/50 blend of 60 hour aged PG 64-22 plain and 64-22+12% sterol aged for 60 hours. All these data plot on the same Black Space line.

FIG. 16 is a plot of only the aged 6% sterol samples overlaid and FIG. 17 is a plot of only the aged 12% sterol samples to make it easier to observe the data.

Iatroscan Data Analysis Of PG 64-22 With 0%, 6% And 12% Sterol Plus Aging

Figure 18:
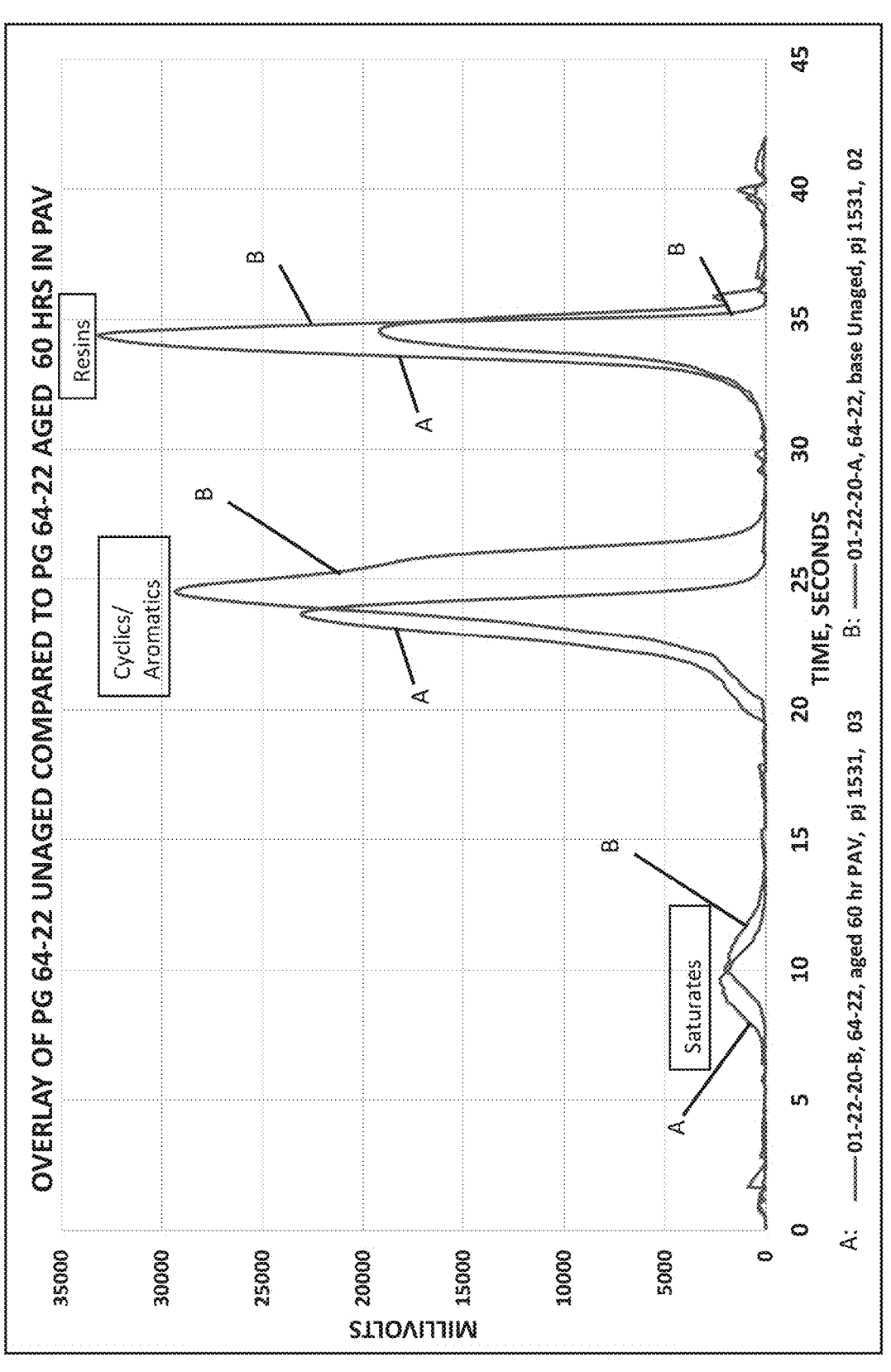
FIG. 18 is an overlay plot of PG 64-22 unaged and PG 64-22 aged 60 hours in PAV.

When asphalt binder is aged the asphaltenes increase as has already been demonstrated by the data plot in FIG. 14. The material remaining after asphaltene removal is referred to as the maltene fraction and is comprised of three generic fractions which are characterized by their relative solubility and which can be separated chromatographically. These fractions are saturates or paraffinic compounds which are soluble in n-pentane, cyclics or aromatics which are soluble in a blend of toluene and chloroform and resins which have little solubility in the blend of toluene and chloroform. With aging the saturates change very little in concentration, cyclics decrease in concentration and the resins increase in concentration. FIG. 18 graphically shows the cyclics have decreased in volume and the resins have increased in volume and the saturates volume has remained relatively similar. At the same time the inset label in the plot identifies that asphaltenes have doubled.

Figure 19:
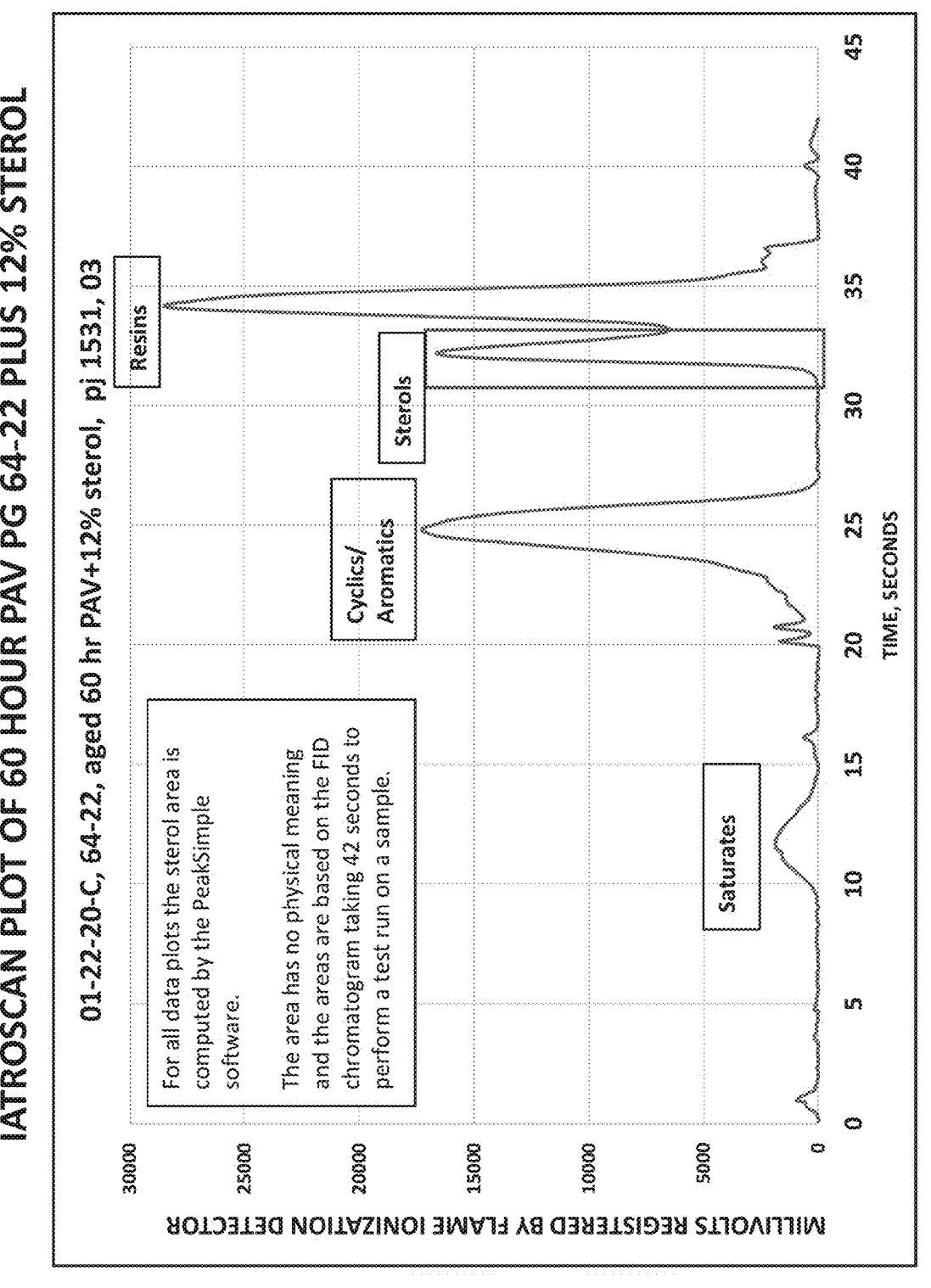
FIG. 19 is an IATROSCAN™ plot of 60 hour PAV PG 64-22 plus 12% sterol.
Figure 20:
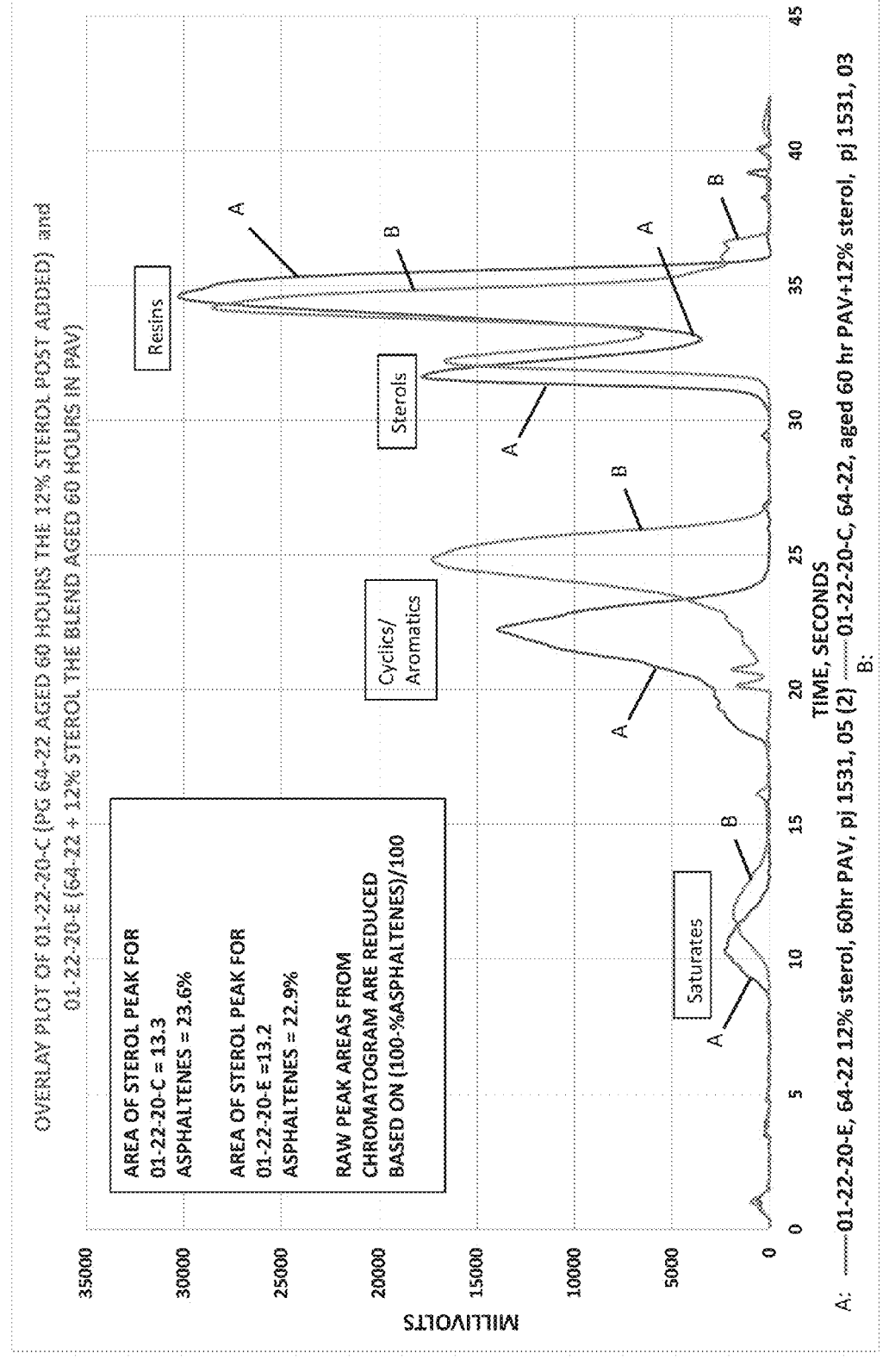
FIG. 20 is an overlay plot of 60 hour PAV aged 64-22+ 12% sterol post added and PG 64-22+12% sterol followed by 60 hour PAV aging.

When sterol is added to an asphalt binder, in this case PG 64-22, the sterol elutes in the resin fraction. The other bio derived additives we have investigated elute as resins even though they are not molecularly the same as asphalt resins. These bio-based materials are not soluble in n-pentane or toluene and only slightly soluble in chloroform. FIG. 19 shows a typical IATROSCAN data plot of 12% sterol post added to PG 64-22 aged for 60 hours in the PAV. Although the sterol was post added it still shows up as separate peak in the resin fraction. FIG. 20 shows that it makes no difference whether the sterol is pre-added or post added the chromatogram is the same with the exception that elution times are slightly different. These peak areas are not quantitative in that they will yield in the case of FIG. 20 values of 12.0. Each sample is spotted on 5 silica treated rods and 5 GC-FID scans are collected. There are differences in the amount of elution and as the data plots show the sterol area is adjoined to the main resin peak and therefore some variability in the amount of sterol will result from test to test. In FIG. 20 similar areas are shown but neither is 12.0%; it is the similarity of the areas that is important in showing that sterol either post added after the base binder was aged or pre-added prior to aging is present at equivalent levels in the two samples.

Figure 21:
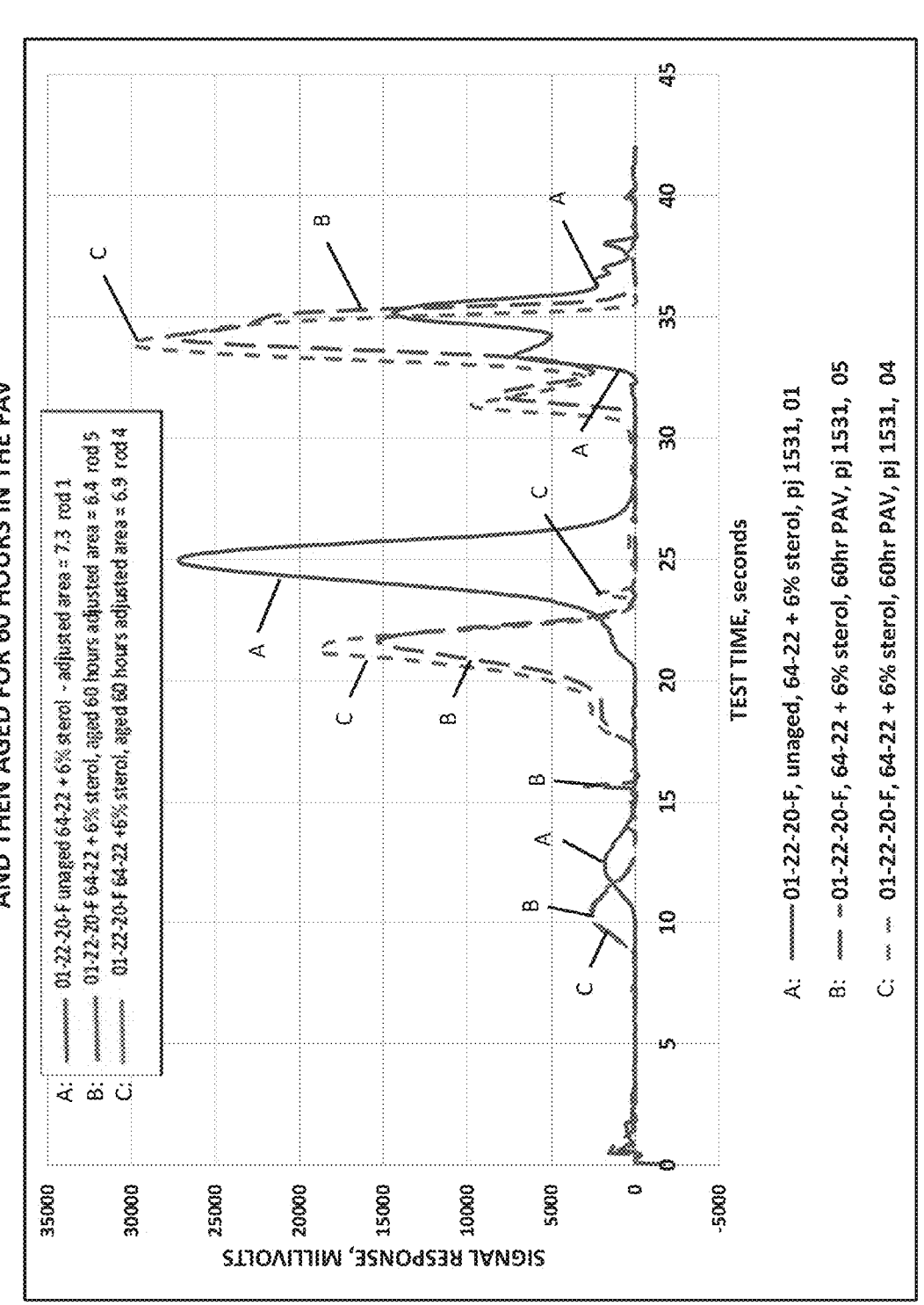
FIG. 21 is an overlay of PG 64-22+6% sterol unaged, and two test results for PG 64-22+6% sterol and then aged for 60 hours in the PAV.

FIG. 21 shows data plots for 64-22 with 6% sterol. One sample is for PG 64-22+6% sterol with no aging and two data plots are for PG 64-22+6% sterol followed by 60 hour PAV aging. The areas adjusted (normalized) for asphaltene content for the samples are shown to 7.3, 6.4 and 6.9. Once again these are not precisely 6% nor are they expected to be as explained above. A close examination of FIG. 21 shows the sterol peak of the unaged sample to be smaller than the sterol peaks for the aged samples. Because the unaged sample is unaged the resin area is reduced compared to the resin area of aged samples and the areas for each respective peak is normalized for a total area 100%; hence the smaller sterol peak in the unaged sample represents a relative value of 7.3 when adjusted against the other fractions and adjusted for the sterol content of the unaged binder.

FIG. 22 shows a further data plot added for the blend of 50% PG 64-22 with no sterol aged for 60 hours and 50% of PG 64-22+12% sterol aged for 60 hours. This blend averages to 6% and the area for this sample computes to 6.3 when normalized for asphaltene content.

Example 4

A base 64-22 binder will be used in which the binder is blended with 0, 5% and 10% sterol in the unaged condition and after aging for 60 hours in the PAV. These samples will be compared with a 60 hour PAV sample which already includes 10% sterol, and will be blended with virgin binder with no sterol. The various parameters, such as the R-values, Tm critical, Ts critical and Tc data will be determined. The samples will also be evaluated in Black Space plots as discussed above.

Example 5

In this example, aged binder was produced to serve as a surrogate RAP. PG 58-28 was aged in thin films in six large pans in three batches using approximately 195 grams per pan which was calculated to be equivalent to 17 grams of binder added to a standard six inch diameter PAV pan. The PG 58-28 was aged for an average of 72 hours in three batches; the resultant binder was comingled, mixed and aliquoted into 200 gram lots to be used for future testing. Rheological properties of the aged binder is shown as Table 3 and the binder compositional properties as determined by the IATROSCAN procedure are shown in Table 4:

TABLE 3

| Rheological Properties of Aged Binder | | | | | |
| PG Grade @ 1 kPa, 10 rad/sec, °C. | PG Grade @ 2.2 kPa, 10 rad/sec, °C. | R-Value @ 25° C. | Ts-critical, °C. | Tm-critical, °C. | Δ Tc, °C. |
| --- | --- | --- | --- | --- | --- |
| 124.8 | 116.9 | 2.683 | — | — | — |
| | | | 24.14 | 18.36 | 5.78 |

TABLE 4

| COMPOSITIONAL PROPERTIES OF AGED BINDER | | | | |
| Asphaltenes, % | Resins, % | Cyclics, % | Saturates, % | Colloidal Index |
| --- | --- | --- | --- | --- |
| 32.4 | 25.7 | 36.4 | 5.5 | 1.639 |

Blends produced at 0%, 0.5%, 2.5%, 5%, 7.5%, 10% and 12.5% sterol by weight of total blend using the aged binder described in Table 1.

All Binder blends (including 0%) aged for zero time, 20, 40 and 60 hours in PAV. Comparative blends produced with bio oil additives and (bio oil+sterol) using same aged binder (limited sterol levels). All blends tested for high temperature properties, low temperature properties using 4 mm DSR. IATROSCAN analysis performed on all samples and FTIR analysis performed on all samples for carbonyl & sulfoxide.

The data showed that $T_{m-Critical}$ was most affected by sterol dosage. Tm-Critical=F(Aging) $T_{m-Crititcal}$ follows an exponential decrease as sterol content increases and approaches an asymptote. Tm-critical=F(sterol %). ΔTc follows similar patterns with respect to aging time and Tm-critical ΔTc vs. sterol %. Asphaltenes decreased with increased sterol dosage at a given aging time and increased with increased aging time for a given sterol dosage.

Figure 23A:
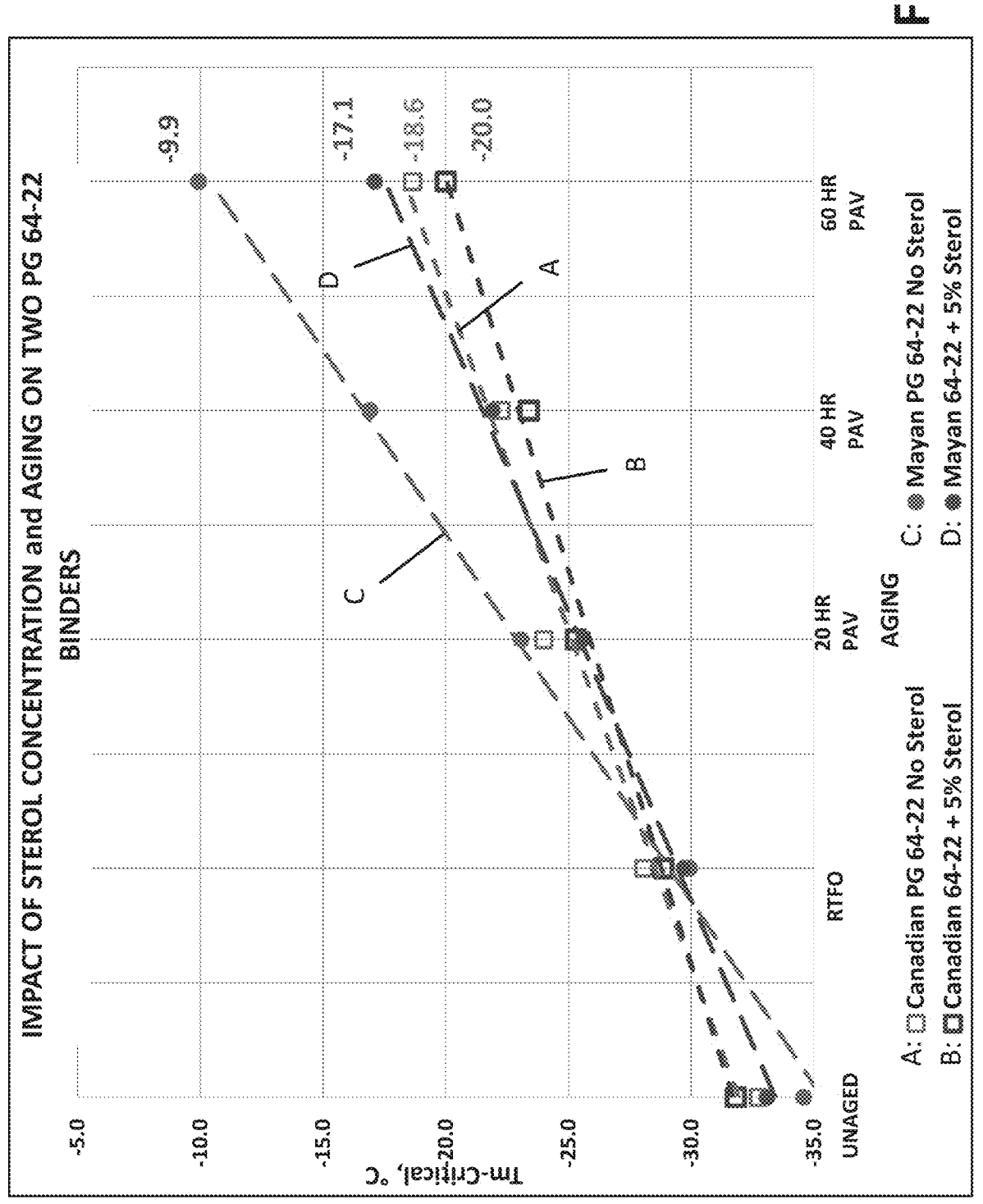
FIG. 23A is a graphical representation of asphalt aging two PG64-22 binders with varying sterol concentrations.
Figure 23B:
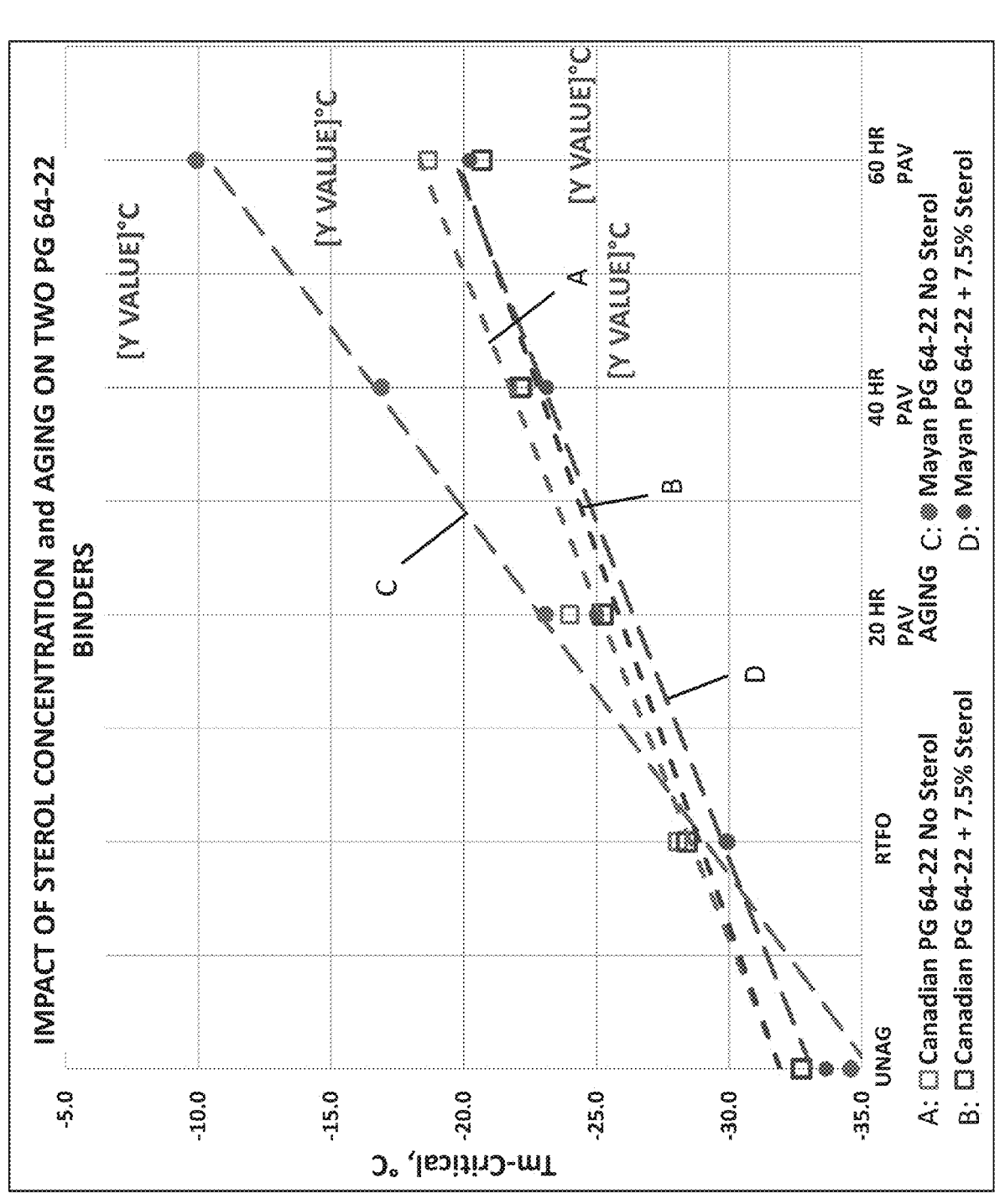
FIG. 23B is a graphical representation of asphalt aging two PG64-22 binders with varying sterol concentrations.

FIGS. 23A and 23B show the impact of sterol concentration and aging on two PG 64-22 binders. Canadian crude binders generally age well. Mayan crude binders age poorly and have been related to fatigue cracking issues. With no sterol added to the Mayan binder Tm-Critical increases (becomes warmer) rapidly due to aging of the Mayan binder. After 5% sterol addition to each binder the increase in Tm-critical for both binders has improved. However the 5% sterol treated Mayan binder after 60 hours of PAV aging has a Tm-Critical value 7.2° C. colder than the zero sterol sample and the 5% sterol treated Canadian binder has Tm-Critical that is 1.4° C. colder. After treating each binder with 7.5% sterol the Mayan binder has Tm-Critical that is 10.3° C. colder than the untreated binder while the 7.5% sterol treated Canadian binder has Tm-Critical that is 2.1° C. colder than the untreated sample. As a general trend, binders which age more rapidly are impacted more significantly by sterol than binders which age less rapidly.

Figure 24:
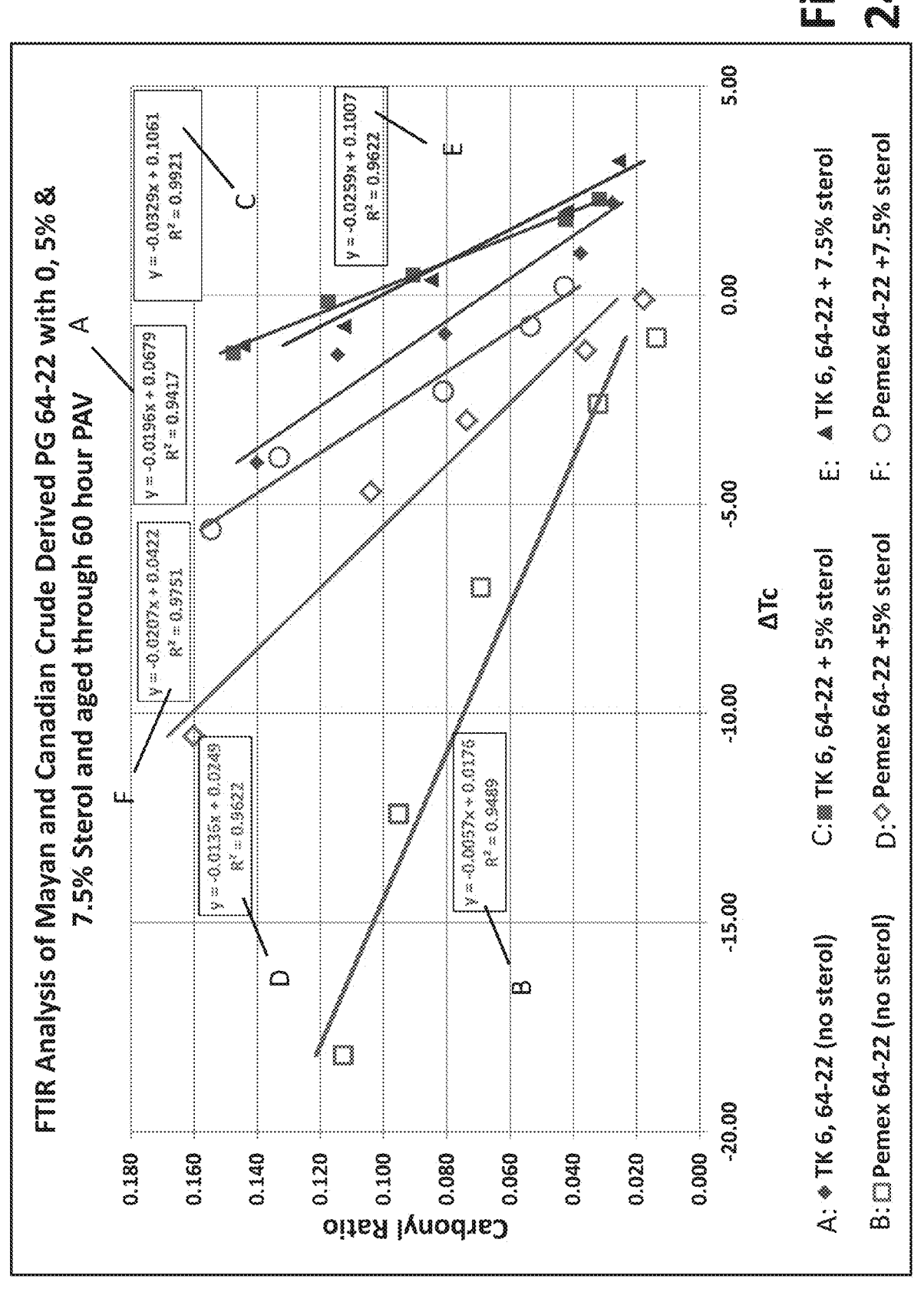
FIG. 24 shows an FTIR analysis of Mayan (Pemex) and Canadian (Tank 6) crude derived PG 64-22 with 0%, 5%, and 7.5% sterol and aged through 60-hour PAV, according to various embodiments.

FIG. 24 shows the carbonyl ratios from an FTIR analysis of MAYAN (PEMEX) and Canadian crude derived PG 64-22 with 0%, 5%, and 7.5% sterol and aged through 60-hour PAV, according to various embodiments. A plot of Carbonyl Ratio versus ΔTc for all sterol loadings and aging times for Mayan and Canadian 64-22 is shown. For Mayan 64-22 with no sterol ΔTc decreases significantly with aging (fatigue problems should be a likely result). With addition of sterol the ΔTc rate of decrease is reduced even though there is an increase in carbonyl content. After 7.5% sterol is added to the PEMEX refining Mayan crude Carbonyl Ratio increases from 0.04 to nearly 0.16, but ΔTc changes from CYC to approximately −5.5° C. While carbonyl increase is an indication of oxidative aging of binders, more negative values of ΔTc have been correlated to increased top-down fatigue cracking in pavements. On balance preventing ΔTc from becoming negative is desirable to reduce the fatigue cracking of pavements produced with a given binder. Carbonyl levels for Canadian 64-22 are similar at each aging step regardless of sterol level and little impact on ΔTc is observed. For similar levels of carbonyl, the ΔTc values improve with increased amounts of sterol. However as the data in FIG. 3 shows the level of improvement in the Canadian (Tank 6) binder is less than in the MAYAN (PEMEX) binder.

Figure 25:
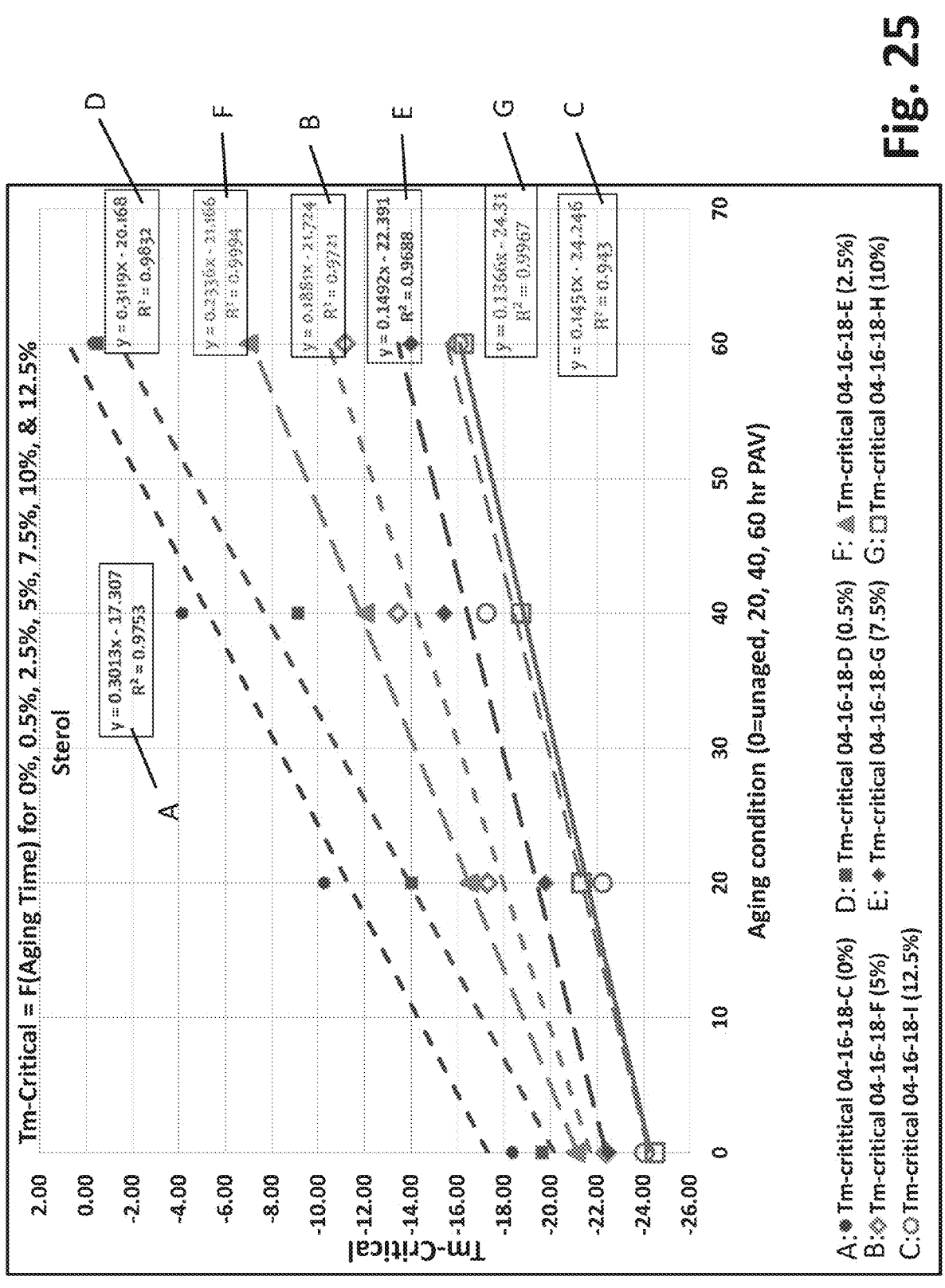
FIG. 25 shows the change in Tm-critical temperature as function of PAV aging condition for varying sterol levels.

FIG. 25 shows the change in Tm-Critical temperature as a function of PAV aging condition for seven dosage levels of sterol. A generally linear increase in Tm-Critical was observed for all sterol loadings. An increase in Tm-Critical means the failure temperature is getting warmer, and this is less desirable. However for each increase in sterol the Tm-critical temperature decreases (gets colder), and this is more desirable. The data shows there is a sterol level where significant improvement in properties occurs. This level is not the same for all binders and depends on the aging characteristics of the base binder. For this sample substantial improvements occur at 2.5% sterol to 7.5% sterol. At higher levels of sterol (10% and 12.5%) very little improvement occurs.

Figure 26:
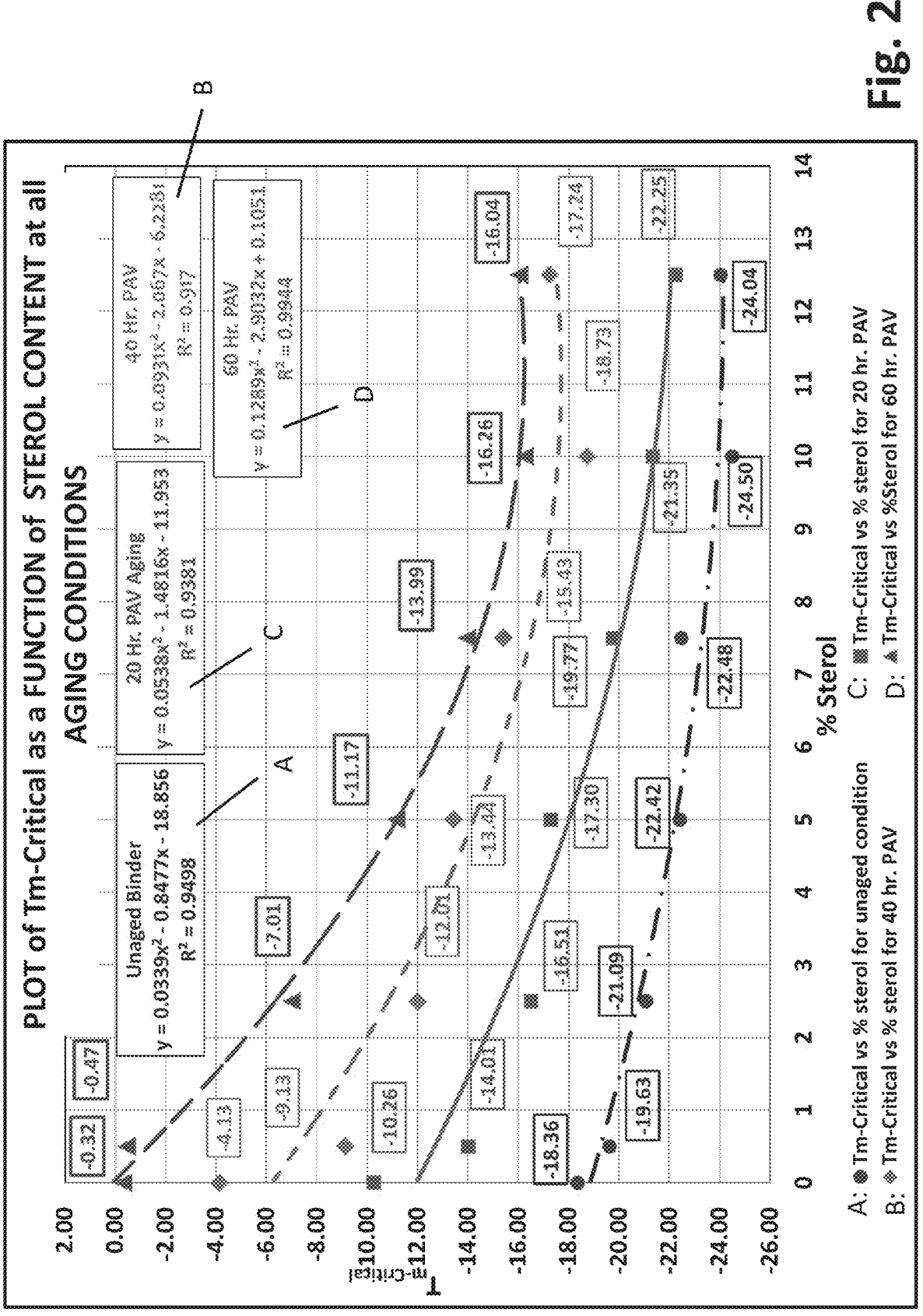
FIG. 26 is a plot of Tm-critical as a function of sterol content at different aging conditions.

FIG. 26 is a plot of Tm-critical as a function of sterol content at all aging conditions, according to various embodiments. Tm-Critical shows an exponential decrease in Tm-Critical with increased sterol dosage (this is an improvement in properties) at each aging level. At sterol contents greater than 7.5% the effect of additional sterol decreases, and the improvement in Tm-Critical asymptotes. Because each binder is unique the concentration at which minor improvements occur will change with binder source. In general however, as sterol concentration increases the Tm-Critical range decreases for all aging times.

Figure 27:
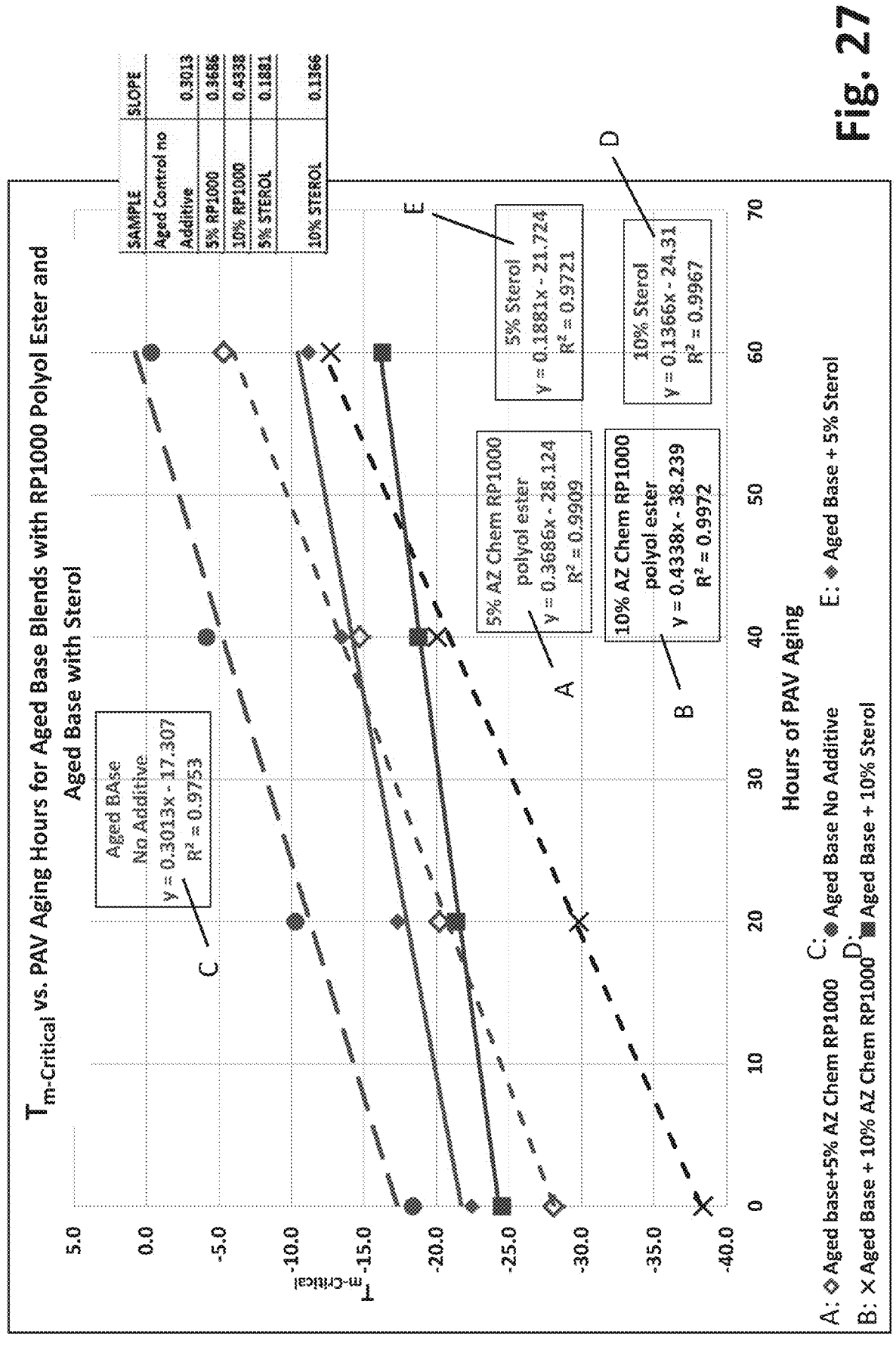
FIG. 27 shows Tm-critical versus hours of PAV aging for 5% and 10% Arizona Chemical RP1000 polyol ester or sterol.

FIG. 27 shows Tm-critical versus hours of PAV aging for 5% and 10% Arizona Chemical RP1000 polyol ester or sterol, according to various embodiments. FIG. 6 shows the comparative rate of change of Tm-Critical for 5% and 10% sterol dosage and for 5% and 10% dosage of RP1000. Results are compared to the aged base binder used for all the blends. The Tm-Critical rate of increase for sterols is noticeably lower than for blends made with RP1000. In fact the rate change for 10% RP1000 is faster than for the 5% RP1000 dosage whereas the rate change for 10% sterol is lower than the 5% sterol dosage. A natural expectation is that for an age-improving additive, higher dosage levels should yield better results and yet 10% RP1000 ages more rapidly than the 5% PR1000 blend.

Figure 28:
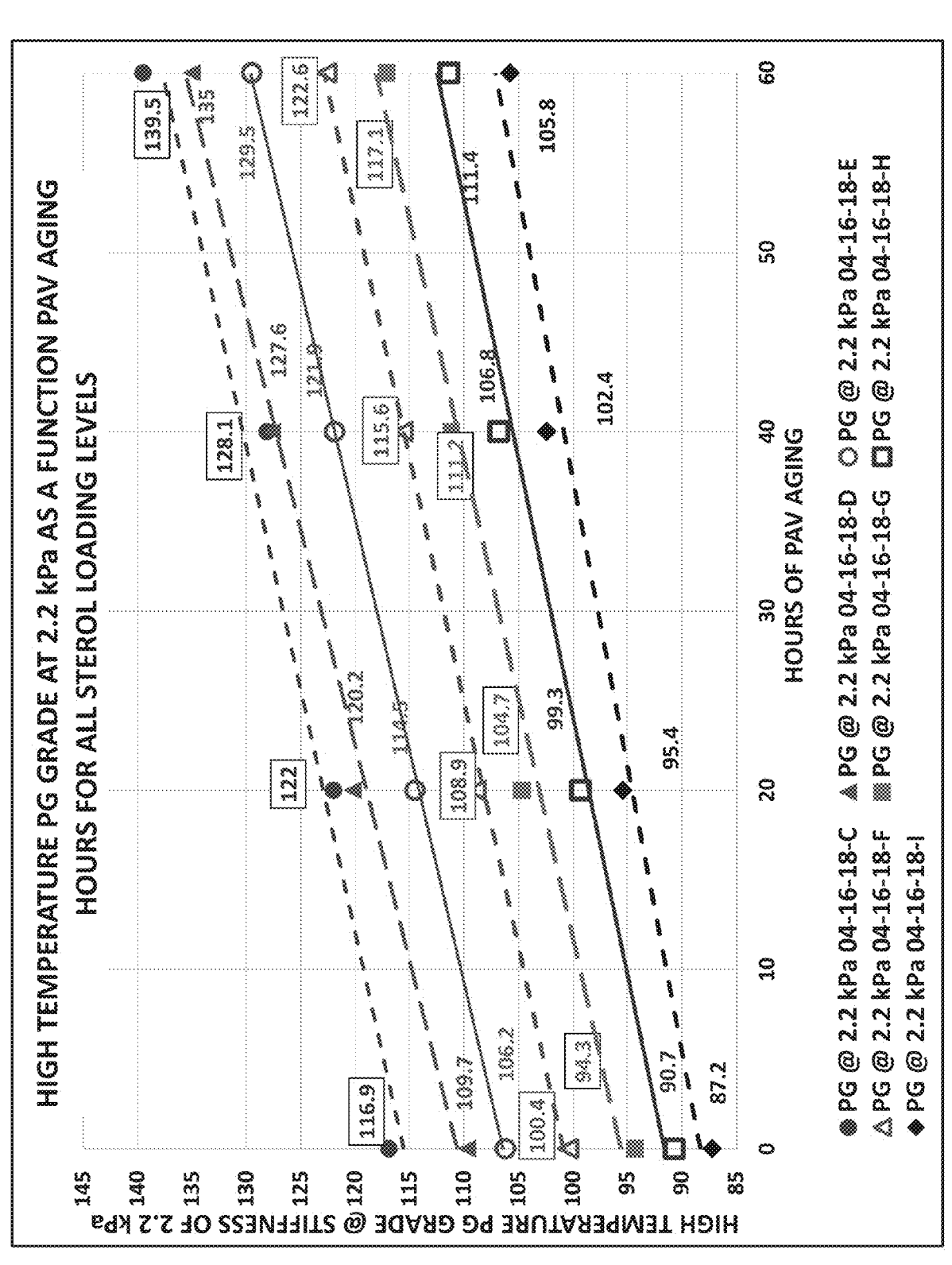
FIG. 28 shows a high temperature PG grade at 2.2 kPa as a function of PAV aging for varying sterol levels.

FIG. 28 shows high temperature PG grade at 2.2 kPa as a function of PAV aging for all sterol levels, according to various embodiments. The high temperature PG grade decreases with sterol dosage at each aging condition, but increases at a given dosage level as aging increases. Note that the high temperature PG grade at 60 hours of PAV aging for the 7.5% sterol dosage is equal to the starting high temperature PG grade of the original binder. This represents a substantial amount of aging before the binder returns to the starting high temperature grade. The 60-hour PAV aged sample of 5% sterol loading is similar to the 20 hour aged property of the original starting material.

Figure 29:
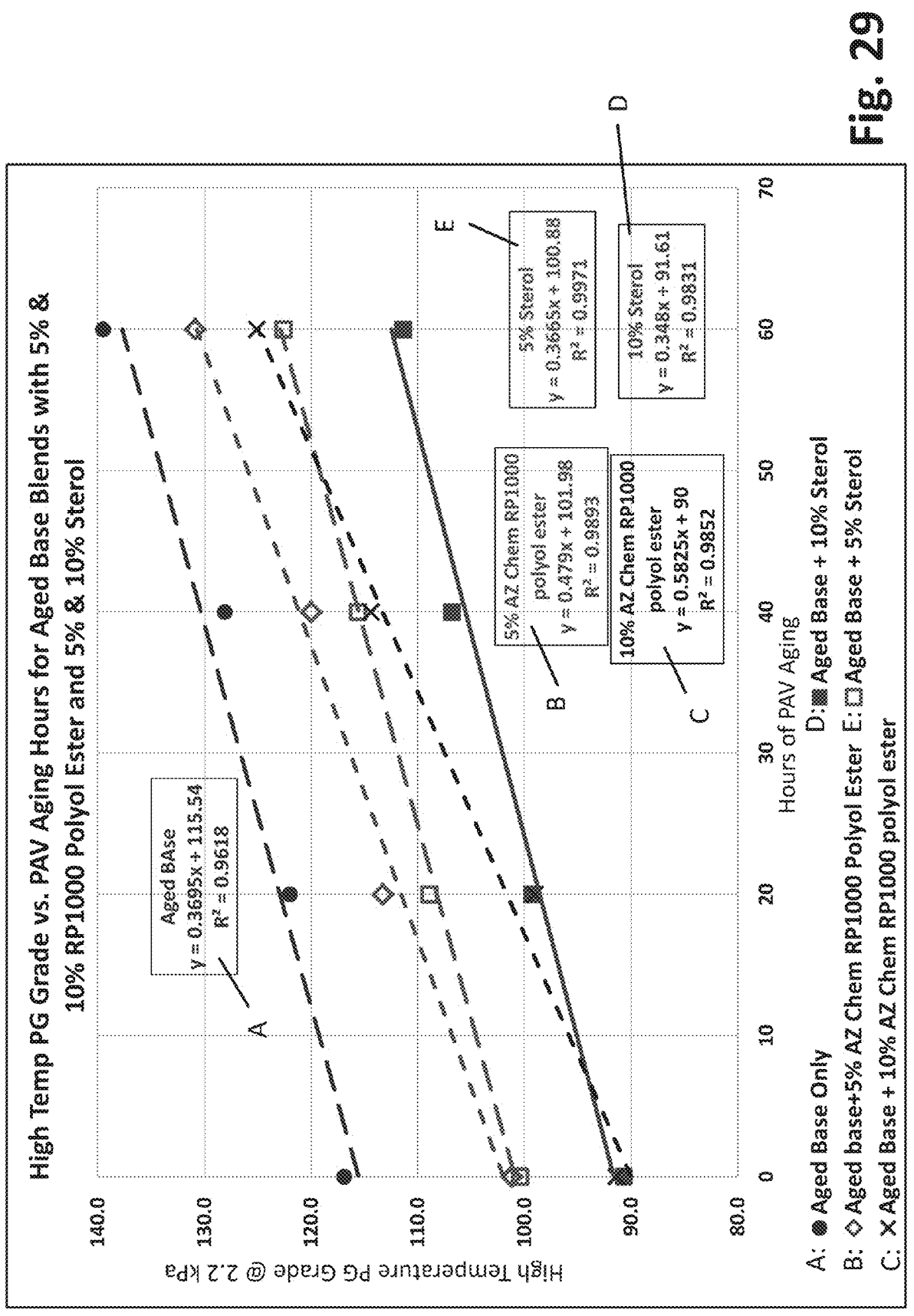
FIG. 29 shows a high temperature PG grade at 2.2 kPa versus hours of PAV aging for 5% and 10% blends with RP1000 polyol ester or sterol where all blends are produced from the same aged base binder.

FIG. 29 shows PG grade at 2.2 kPa versus hours of PAV aging for 5% and 10% blends with RP1000 polyol ester chemistry or sterol chemistry where all blends are produced from the same aged base binder, according to various embodiments. High temperature PG grades of both sterols and both RP1000 blends are nearly identical after blending. With aging even as low as 20 hours of PAV aging the sterols show a slower rate of high temperature PG increase than the RP1000 blends. By 60 hours of aging the 5% sterol blend has a high PG grade slightly lower than that of the 10% RP1000 blend.

Figure 30:
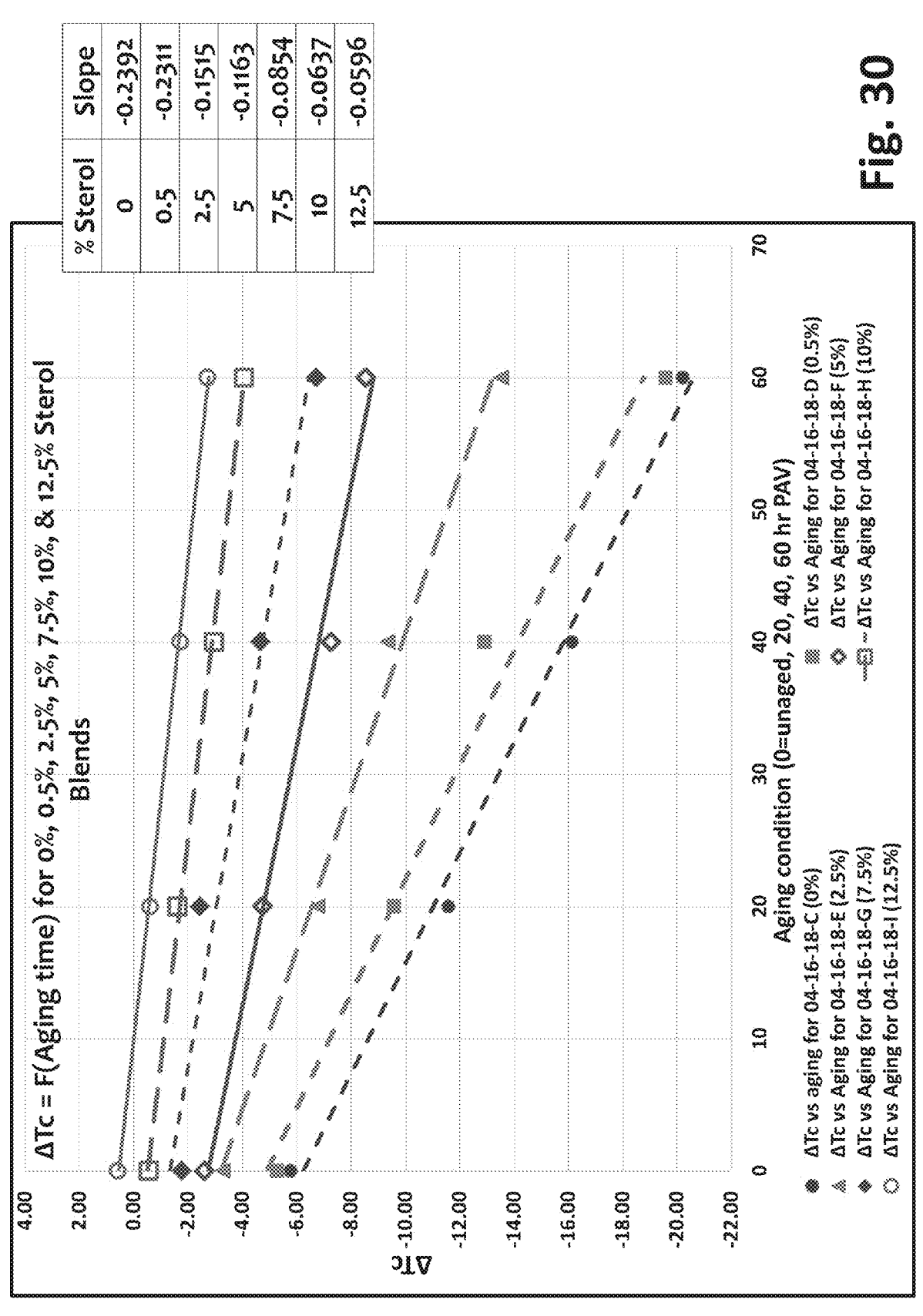
FIG. 30 shows $\Delta Tc=F(aging\ time)$ for 0%, 0.5%, 2.5%, 5%, 7.5%, 10%, and 12.5% sterols.

FIG. 30 shows ΔTc=F(aging time) for 0%, 0.5%, 2.5%, 5%, 7.5%, 10%, and 12.5% sterols, according to various embodiments. Highly negative values of ΔTc are undesirable as more negative values of ΔTc mean that the binder is more prone to fatigue cracking. FIG. 9 shows definite improvement in ΔTc starting at 2.5% sterol and continuing through 7.5% sterol. At higher sterol loadings the improvements in ΔTc are not as pronounced. As discussed previously the dose response of sterol in binders is dependent on the aging tendency of the binder. Binders that age poorly show a greater response to a given sterol dosage level compared to binders that age well.

Figure 31:
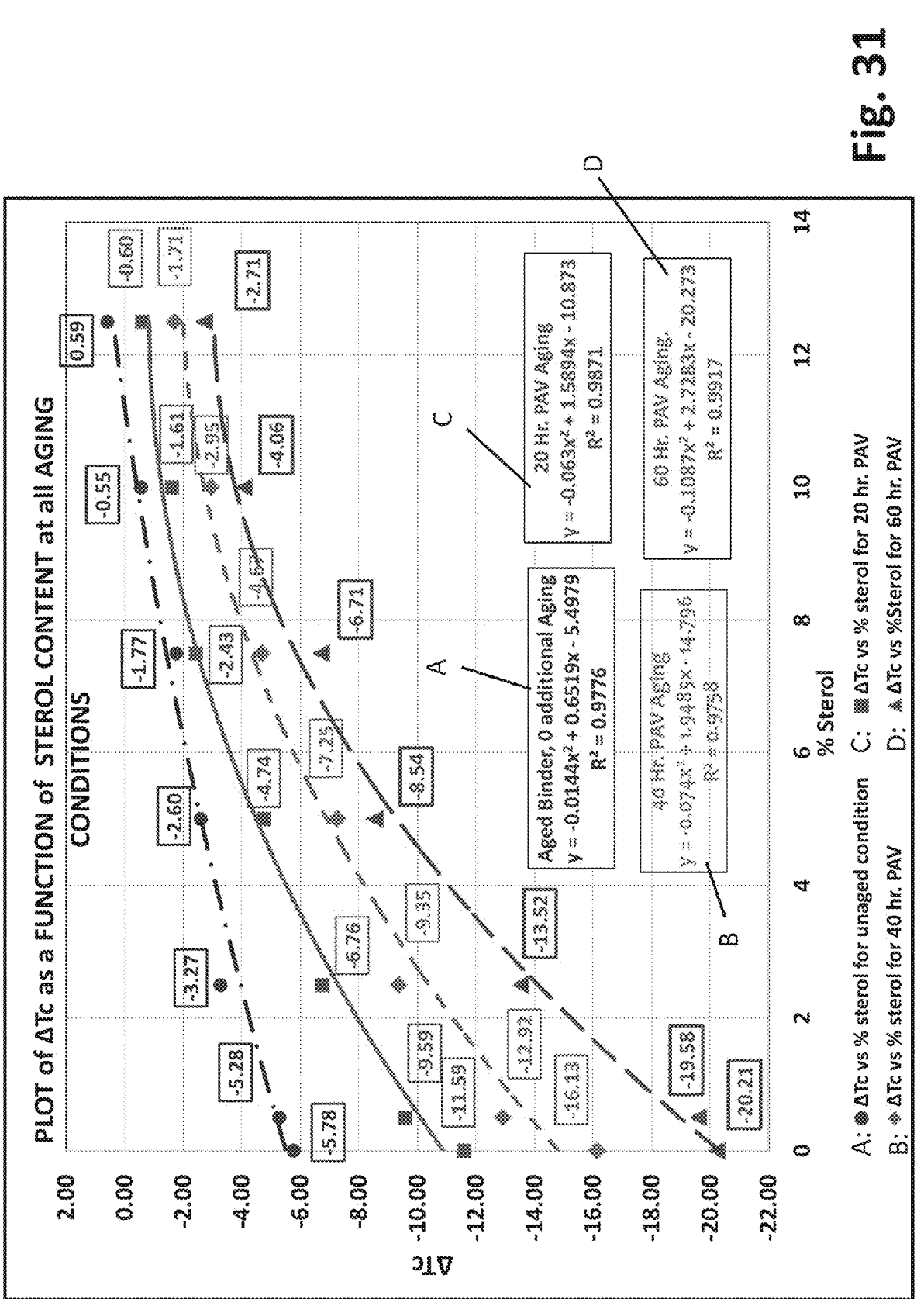
FIG. 31 is a plot of $\Delta Tc$ as a function of sterol content at varying aging conditions.

FIG. 31 is a plot of ΔTc as a function of sterol content at all aging conditions, according to various embodiments. With increased aging ΔTc is more negative for each dosage. But with increased sterol concentration the ΔTc range decreases. The rate of improvement in ΔTc follows an exponential improvement at each aging level. It is also clear that for 20 hours of aging and higher, the improvements due to aging begin to level off after 7.5% sterol loading.

Figure 32:
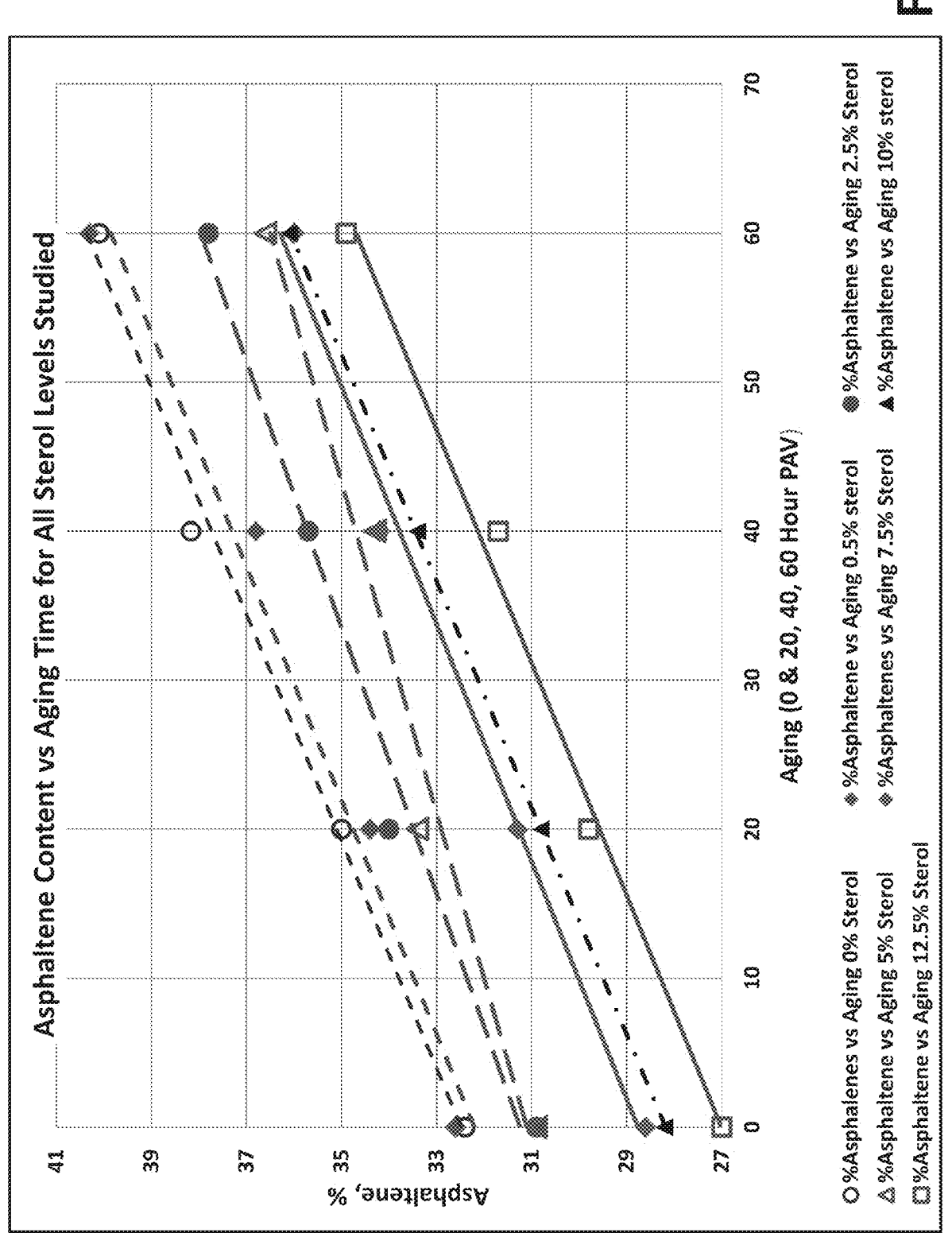
FIG. 32 shows asphaltene content versus aging time for varying sterol levels.

FIG. 32 shows asphaltene content versus aging time for all sterol levels studied, according to various embodiments. Asphaltenes decrease with increased sterol dosage at a given aging time. Asphaltenes increase with aging time for a given dosage level. This is the same for other additives as well, but the outcome is more complicated than just the decrease with dosage and increase with aging. It is possible that the asphaltene decrease at zero time is due to dilution of the aged binder with an additive (the sterol) that contains no asphaltenes. However, as aging continues at each sterol dosage level the percentage of asphaltenes show a linear increase highly indicative that reduction in asphaltenes at zero time is not simply a dilution but an actual change in the internal asphaltene structure of the original aged binder starting material.

Figure 33:
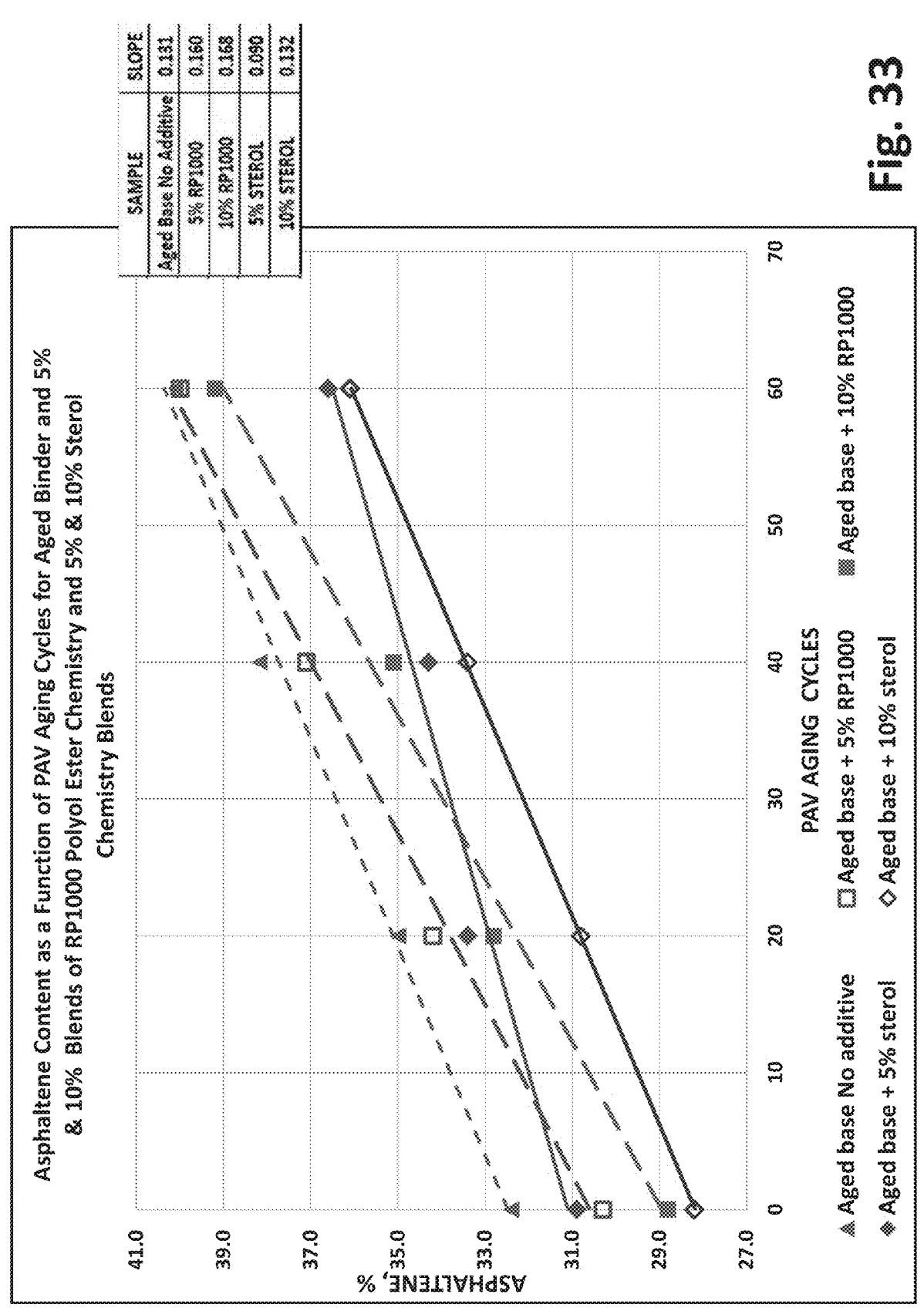
FIG. 33 shows asphaltene content as a function of PAV aging cycles for aged binder and 5% and 10% blends of RP1000 polyol ester and 5% and 10% sterol blends.

FIG. 33 shows asphaltene content as a function of PAV aging cycles for aged binder and 5% and 10% blends of RP1000 polyol ester chemistry and 5% and 10% sterol chemistry blends, according to various embodiments. Most if not all recycling/rejuvenating products contain no or very low levels of asphaltenes and therefore there is potentially a dilution effect. FIG. 33 is a plot of an RP1000 polyol ester additive dosed at 5% and 10% compared to the data for 5% and 10% sterol in samples of the same aged binder. One factor of difference is that as the RP1000 blends age they develop asphaltenes at a faster rate than the aged base binder such that the 5% RP1000 blend exhibits the same level of asphaltenes as the control binder after 60 hours of PAV aging. In contrast the sterols develop asphaltenes at a rate decidedly lower than the aged control or the RP1000 treated samples.

Figure 34:
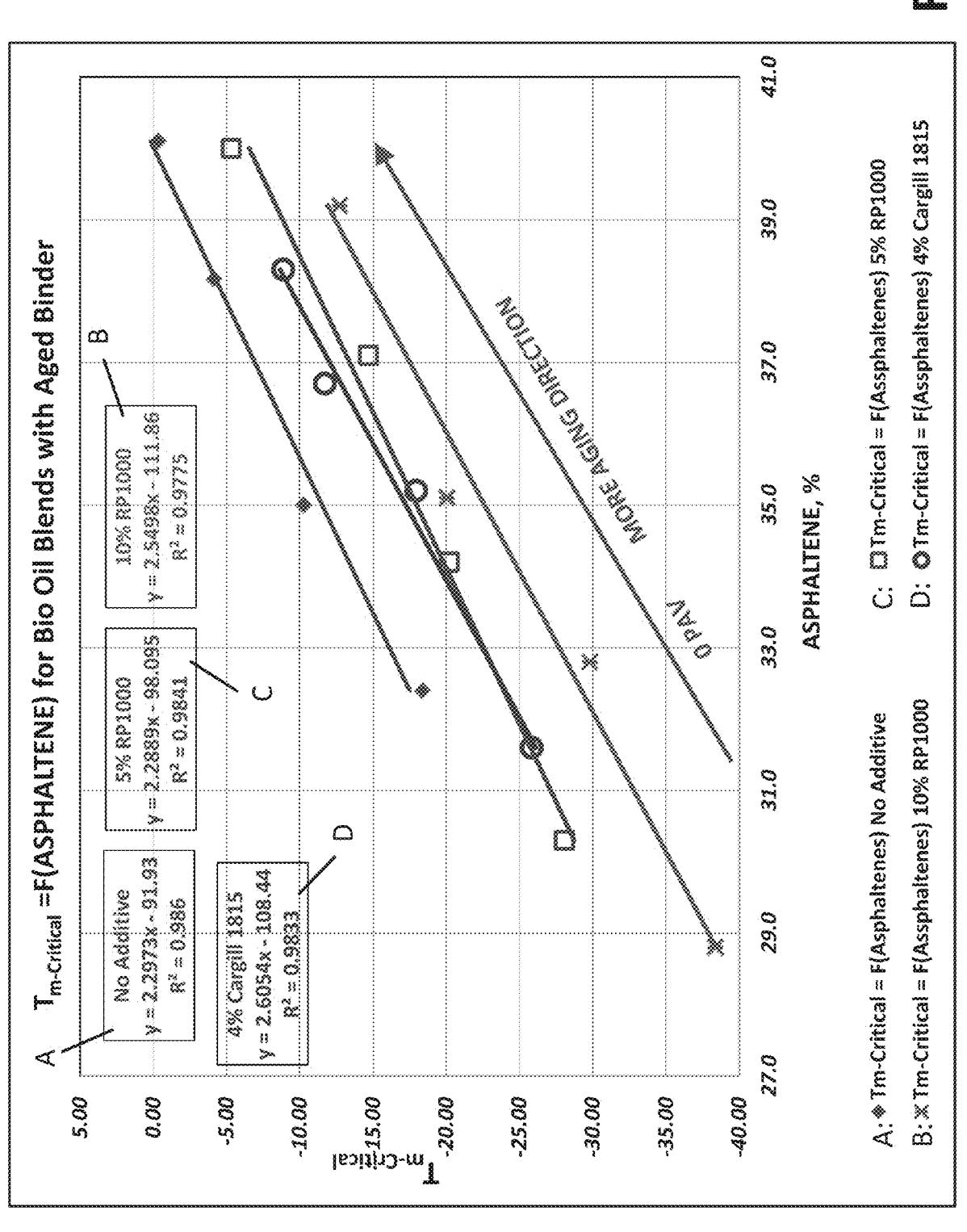
FIG. 34 shows Tm-critical=F(asphaltene) for bio oil blends with aged binder.

FIG. 34 shows Tm-critical=F(asphaltene) for bio oil blends with aged binder, according to various embodiments. When bio oils are added to an aged binder a decrease in asphaltenes due to dilution is expected, and when Tm-Critical is plotted as a function of asphaltenes there is a parallel shift downwards compared to the binder to which the oil has been added. This shift is clearly shown for 5% and 10% RP1000 polyol ester and 4% of Cargill 1815 bio oil. For these two bio oils the addition of bio oil results in a softening of the aged base control. However, the aging rate as shown by the slope values of the bio oil treated binders is equal to or greater than the aging rate of the aged control. By the time 60 hours of PAV aging has taken place the bio oil treated binders have Tm-critical values equal to or approaching the Tm-critical of the aged control with no additive even though after the initial loading of the bio oil the Tm-critical results were 0.8 to 3.6° C. lower (colder). The result is that the Tm-Critical temperature improvements from these bio oils are not sustainable over extended aging times.

FIG. 35 shows Tm-critical=F(asphaltene content), for selected sterol contents blended with the aged base control. FIG. 14 shows embodiments unique to sterol. FIG. 15 shows Tm-Critical as a function of asphaltenes for 0%, 0.5%, 2.5%, 5%, 7.5%, 10% and 12.5% sterol loading in the aged base control. Relative to the aged base control (0% sterol), the addition of sterol causes Tm-Critical to decrease or become colder which is beneficial to long term performance of the asphalt binder with respect to thermal cracking. In addition to the improvement in Tm-Critical, the rate at which asphaltenes increase with aging time is reduced (lower slope) with increased levels of sterol. The information for the four dosage levels in FIG. 35 show that the functional relationship between Tm-Critical and asphaltenes rotates towards improved low temperature properties and reduced levels of asphaltenes.

Figure 36:
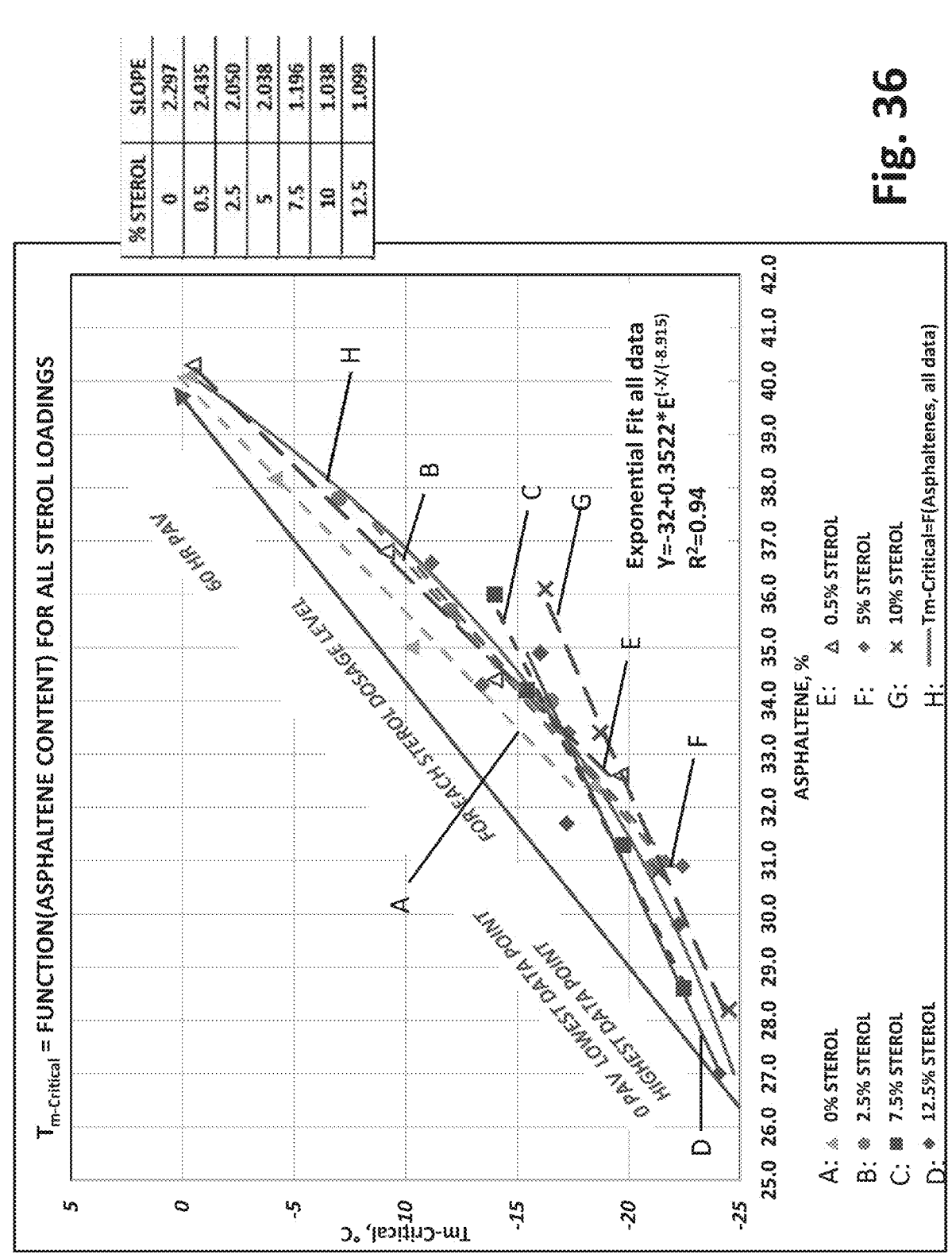
FIG. 36 shows Tm-Critical as a function of asphaltenes for 0%, 0.5%, 2.5%, 5%, 7.5%, 10% and 12.5% sterol loading in the aged base control.

FIG. 36, which includes all sterol loading data added to the data from FIG. 35, shows that at the 0.5% sterol loading the functional relationship shifts slightly to lower Tm-Critical values and nearly parallel to the 0% sterol loading. As the sterol loadings increase the data plots shift to lower Tm-Critical and rotate to reduced asphaltene levels as previously discussed. Each successive addition of sterol shows more improvement such that when all the data is plotted together a family of curves results that overall defines a unique functional relationship for this specific aged binder control and the impact of sterol on that aged binder's low temperature Tm-Critical relationship to asphaltene content. However when successive amounts of sterol are added to the same aged binder even though there is an improvement in Tm-Critical the change in with respect to asphaltene level is not one that indicates softening or dilution. The first dosage of 0.5% sterol, which has only minor benefit does show the same horizontal shift, but all other dosage levels show a clockwise rotation of the response curve indicating that with the increasing amount of sterol the rate of increase in Tm-Critical is decreasing compared to the bio oil only blends.

Figure 37:
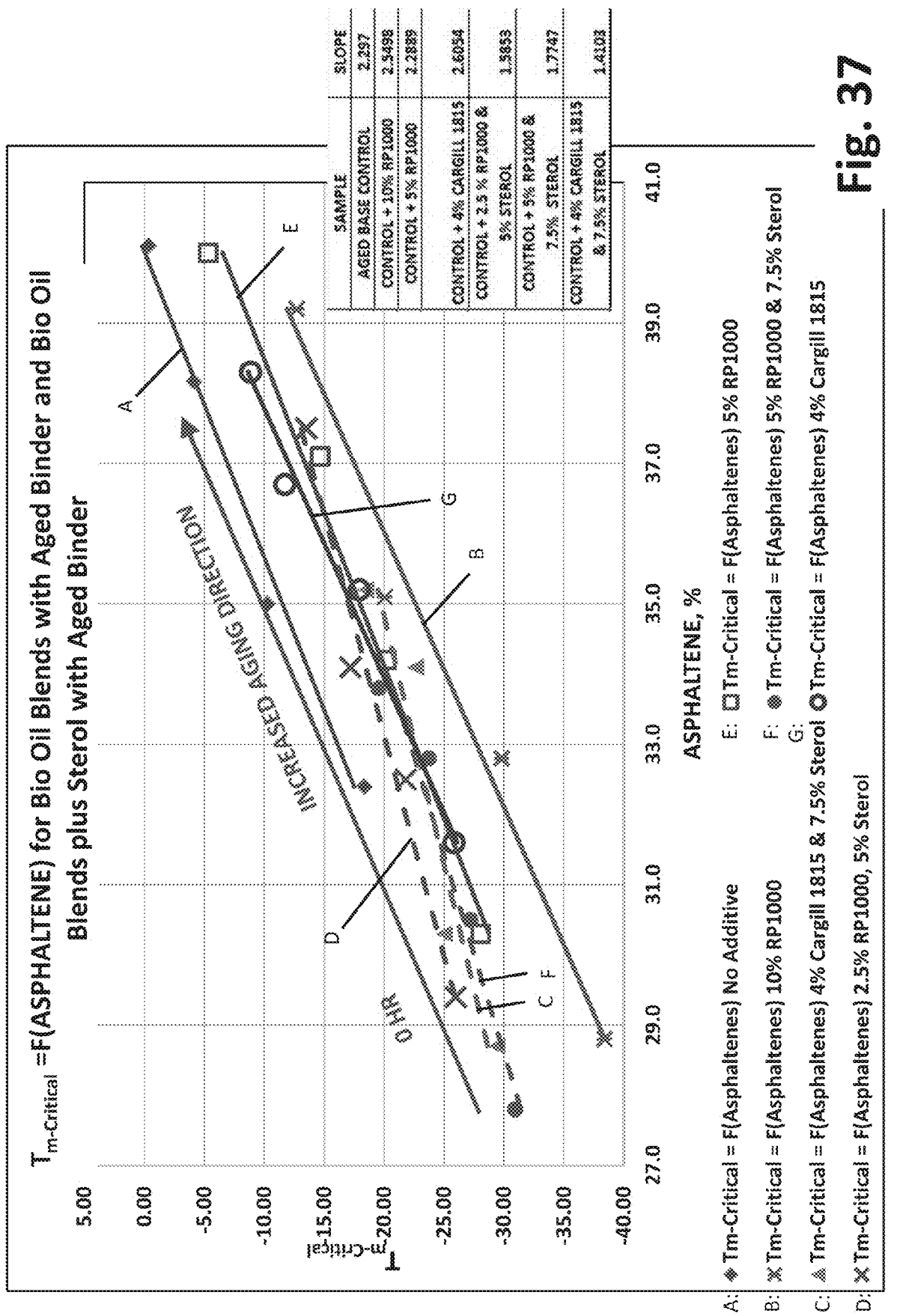
FIG. 37 shows Tm-critical=F(asphaltene) for bio oil blends with aged binder.

FIG. 37 shows Tm-critical=F(asphaltene) for bio oil blends with aged binder. When sterol is blended with the bio oil additives the effect is to not show further dilution of the Tm-Critical vs Asphaltene data plot but to flatten out the response plot. A blend of 5% RP1000 and 7.5% sterol has a Tm-Critical value at zero aging that is similar to 20 hours of aging for the 10% RP1000 blend, but the 5% RP1000 7.5% sterol at 20 hours of PAV aging is only about 2.5° C. warmer than the 20-hour 10% RP1000 blend. This is because Tm-Critical for the 10% RP1000 blend increases at a more rapid rate than does the 5% RP1000+7.5% sterol. By 60 hours of PAV aging the 5% RP1000 plus 7.5% sterol has Tm-critical of −19.6° C. with asphaltenes of 33.8% whereas the 10% RP1000 has Tm-Critical of −12.7° C. with asphaltenes of 39.2%. Any low temperature or brittleness improvements resulting from the initial loading of 10% RP1000 is lost during the aging process. Beneficial improvements to binders need to be sustainable over time and sterol is able to impart and sustain those beneficial improvements. The data in FIG. 37 shows that sterol addition in conjunction with a softening additive, which for these data is RP1000 or Cargill 1815, sets the newly formed binder on an aging path different from original aged base control and different from the blends produced with the bio oils alone. Although those bio oils soften the aged base control, the aging paths for the aged base control and the bio oil only blends are the same as evidenced by the aging slopes for those bio oil only blends. By altering the aging slopes of the bio oil plus sterols and sustaining those improved slopes, the sterol in effect produces a new binder with improved aging properties.

Figure 38:
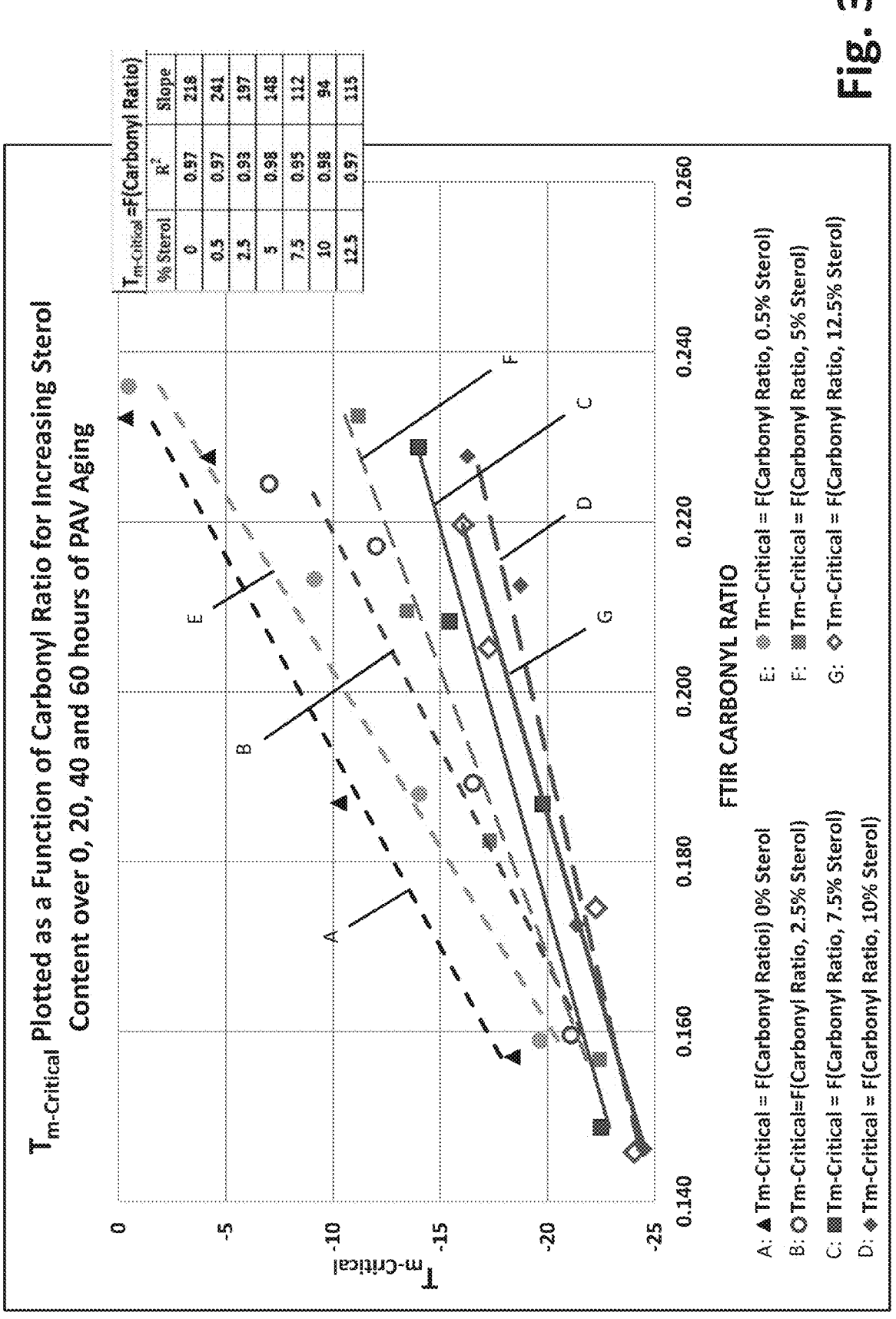
FIG. 38 shows Tm-critical plotted as a function of carbonyl ratio for increasing sterol content over 0, 20, 40, and 60 hours of PAV aging.

FIG. 38 shows Tm-critical plotted as a function of carbonyl ratio for increasing sterol content over 0, 20, 40, and 60 hours of PAV aging, according to various embodiments. As the binder is aged Tm-critical increases (becomes warmer) with increasing carbonyl ratio for each sterol dosage. At zero sterol loading and 0.5% sterol loading the decrease in Tm-Critical is nearly parallel indicating mainly a dilution effect. As sterol dosage increases the rate of increase in Tm-Critical with respect to carbonyl ratio increase becomes flatter, viz., the increase in carbonyl is having less of an impact on the degradation of Tm-Critical. As the sterol level increases from 0.5% to 5% there is a reduction in the slope of the relationship between Tm-Critical and Carbonyl Ratio. While the carbonyl ratio does not change substantially the impact of carbonyl on Tm-Critical is reduced. Between 5% and 7.5% sterol not only does the rate of increase in Tm-Critical continue to improve but at 7.5% sterol and above the initial carbonyl ratio at 0 PAV is reduced and the carbonyl ratio at 20, 40, and 60 hour PAV also shows reduced carbonyl ratio values. As sterol level increases, the rate at which Tm-Critical increases (becomes warmer) due to aging decreases with increased aging>7.5%. Even though the carbonyl ratio is similar at each aging level for all dosage levels, Tm-Critical level increases at a slower rate.

Figure 39:
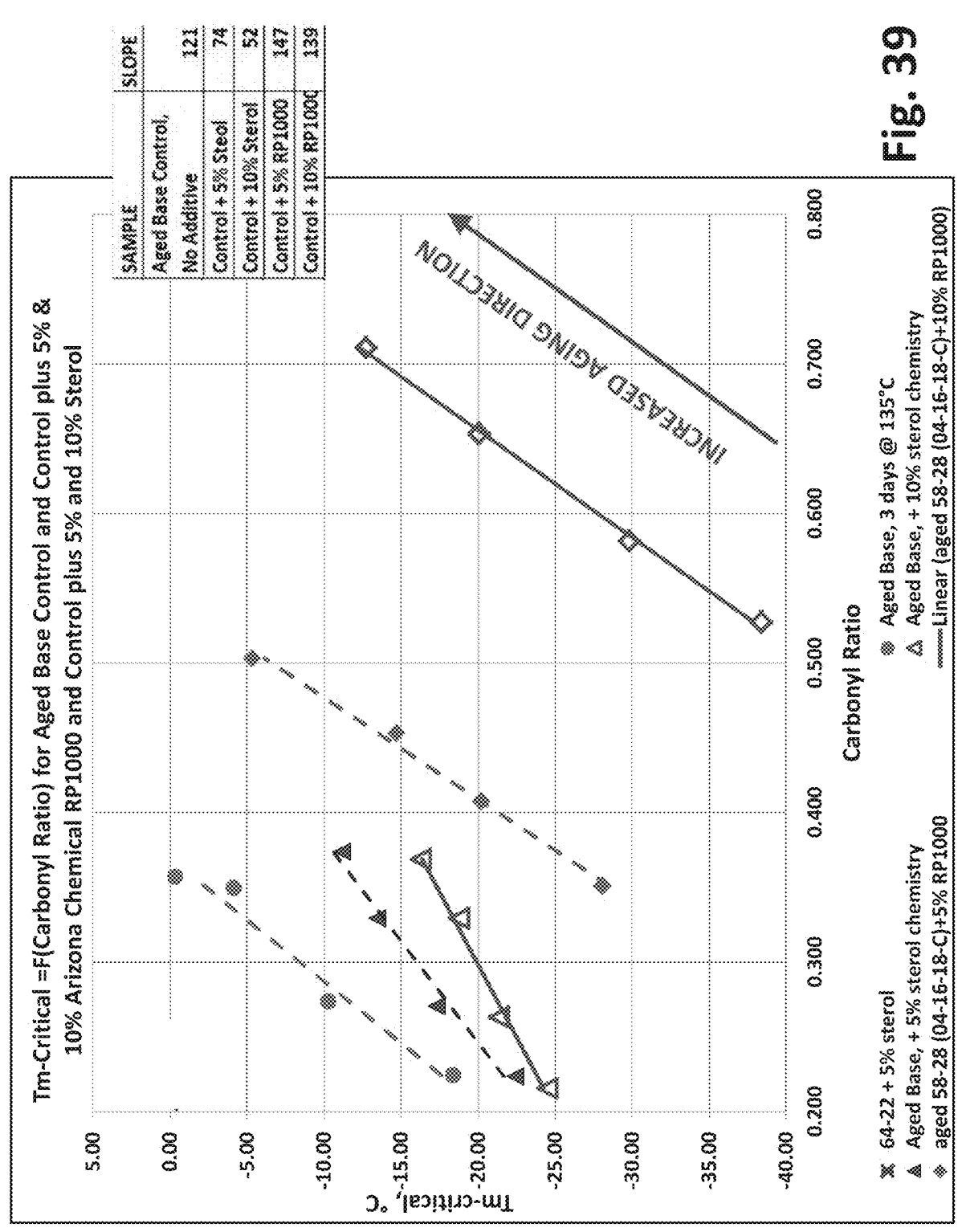
FIG. 39 shows Tm-critical=F(carbonyl ratio) for aged base blend, and aged base plus 5% and 10% Zeta chemistry and aged base plus 5% and 10% sterol chemistry.

FIG. 39 shows Tm-critical=F(carbonyl ratio) for aged base blend, aged base plus 5% and 10% RP1000 and aged base plus 5% and 10% sterol. For the bio oil additive blends the carbonyl ratio shifts to the right, but this is most likely due to the increase in carbonyls due to the carbonyl in the bio oils. However, Tm-Critical increases (becomes warmer and therefore less favorable) at a more rapid rate with aging than does the original aged base binder. The sterol containing samples, which do not add more carbonyl molecules, exhibit similar carbonyl ratios as the aged base binder at all PAV aging levels. For the sterol treated samples Tm-Critical values increase at a slower rate than the aged base material and at a very much lower rate than the RP1000 blended samples. The slope reduction of Tm-Critical as a function of carbonyl ratio data for the sterol samples and thus a reduction in the rate of increase in Tm-Critical value indicates that the presence of sterol, while it does not prevent increase of carbonyls with aging, prevents those carbonyls from causing the same increased rate of Tm-critical warming that occurs in the aged base binder itself or in the blends produced with the bio oils. The alteration in the rate of Tm-Critical increase coupled with the observation that although carbonyls increase in the binder with aging but the carbonyls do not appear to significantly impact Tm-Critical leads to the observation made previously that the sterol addition can alter the original binder to provide a new binder with its own aging profile.

Figure 40:
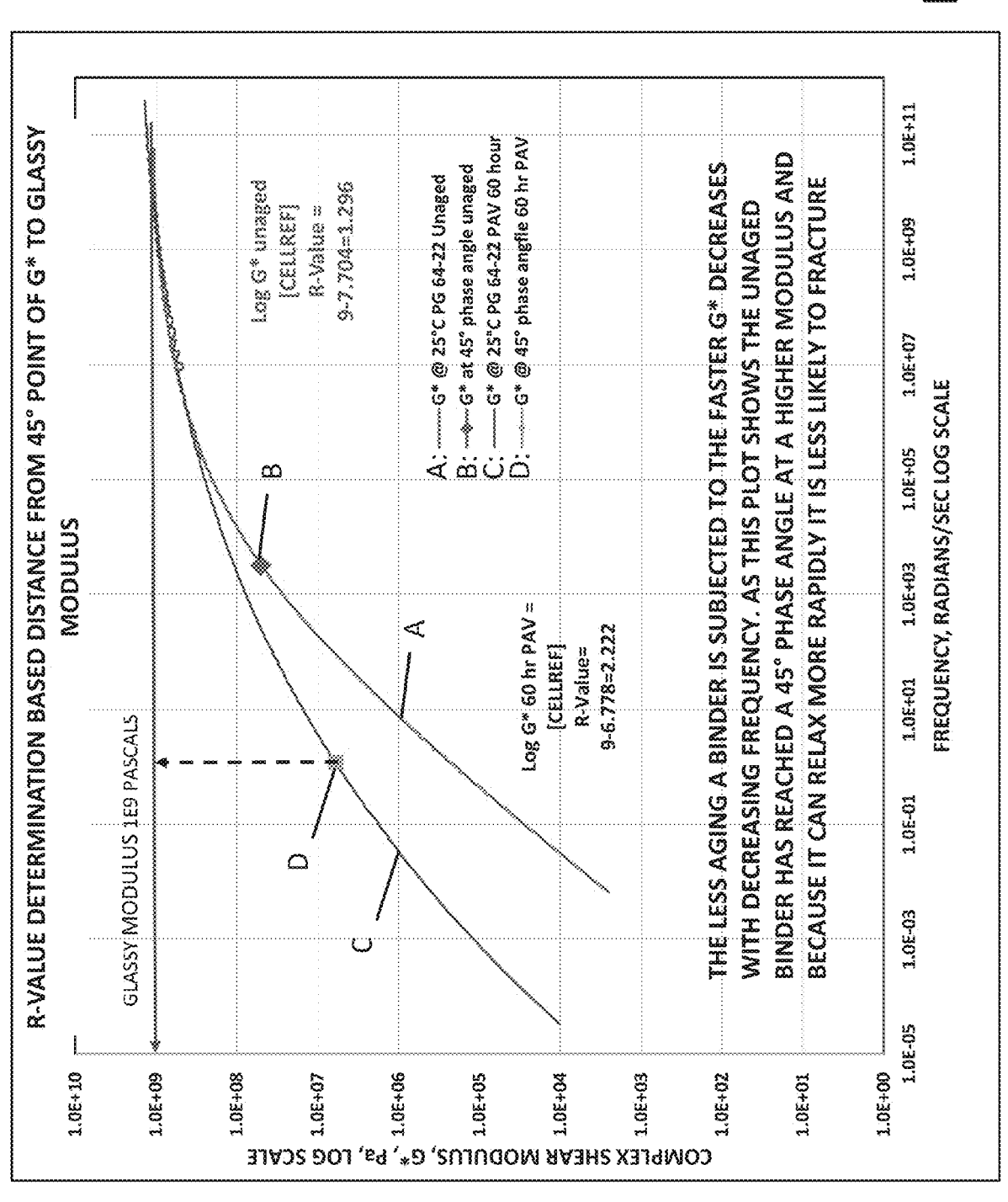
FIG. 40 shows a plot that explains how Rheological Index or R-Value is determined.

FIG. 40 shows a plot that explains how Rheological Index or R-Value is determined and also serves to explain its importance to the asphalt research community. The concept of a Rheological Index was developed during the Strategic Highway Research Program during the late 1980's and early 1990's. In the simplest terms the Rheological Index is the difference in the log stiffness of a binder at the glassy modulus (which is generally assumed to be 1 gigaPascal) and the log stiffness modulus, $G^*$, of that binder at the frequency where the binder's elastic modulus, $G'$, and its viscous modulus, $G''$, are equal. This frequency occurs when the phase angle relationship between $G'$ and $G''$ is 45°. As a binder ages the crossover frequency takes place at warmer temperatures and consequently the complex shear modulus, $G^*$, must be lower for any given binder when it has been aged compared to when it has not been aged. This means that since the glassy modulus is fixed or generally does not vary substantially and the crossover frequency is lower, therefore $G^*$ is lower as a result of aging and the difference between these two modulus values increases for any given binder as that binder ages.

Figure 41:
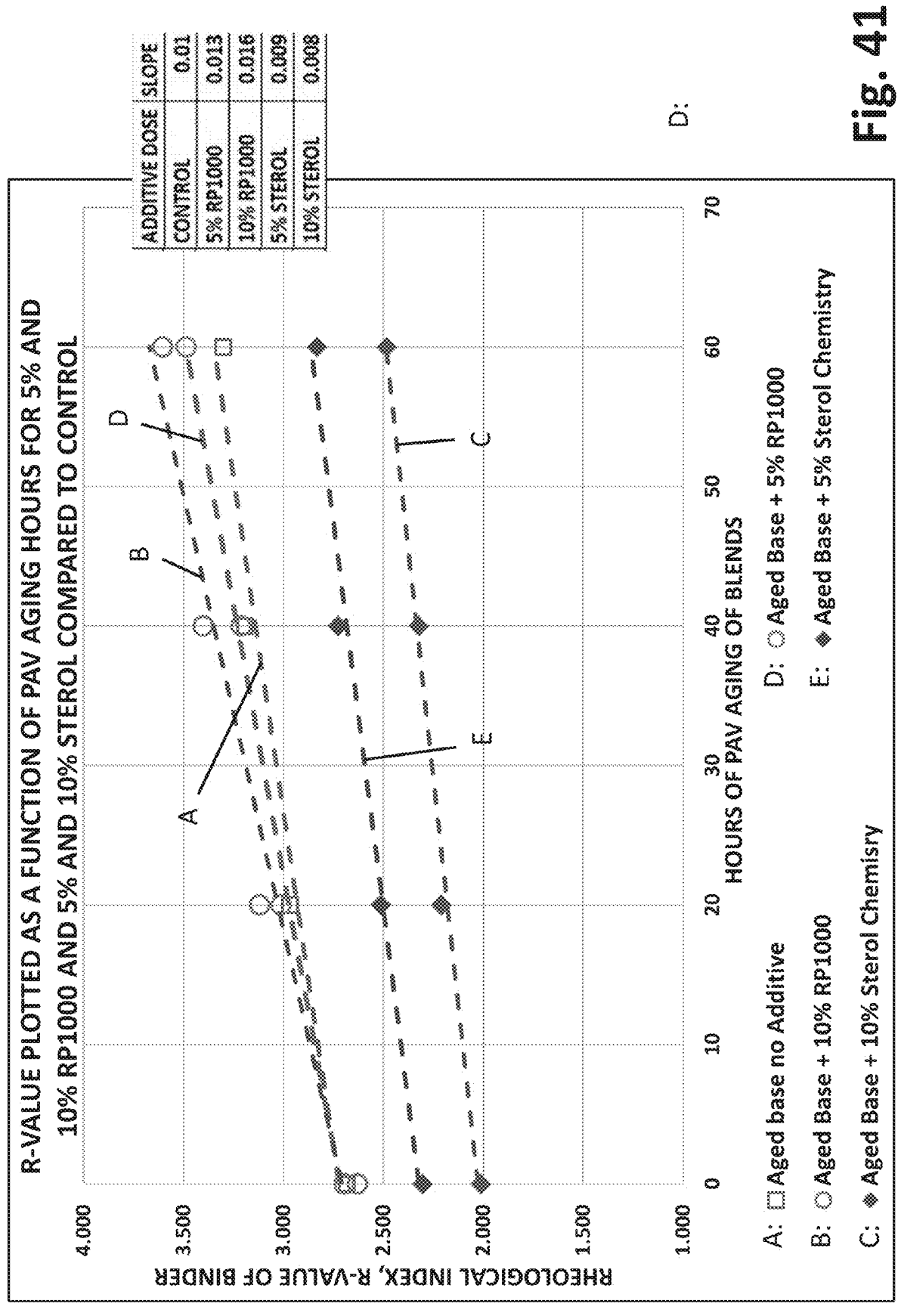
FIG. 41 shows Rheological Index (R-Value) plotted as a function of PAV aging hours.

FIG. 41 shows Rheological Index (R-Value) plotted as a function of PAV aging hours, according to various embodiments. R-Value is an important parameter because it provides a direct indication of the brittleness increase of a binder. Binders with R-values greater than 3 are very prone to fatigue cracking and every binder will have a characteristic R-value based on its aging propensity. An unaged binder can have an R-Value of 1 or slightly above. When aged in service. the R-Value will be 2 or greater depending on the binder and the extent of aging. FIG. 41 plots R-value for the aged base control and blends produced with 5% and 10% RP1000 and 5% and 10% sterol. Unlike other rheological parameters that are impacted by the softening effect of bio oils, the addition of 5% and 10% RP1000 had insignificant impact on the R-Value at zero time. However, the addition of sterol had a dose response impact on the R-Value of the control. Five percent sterol decreases the R-Value to approximately 2.3, and 10% sterol decreases the R-Value to nearly 2. The detrimental impact of RP1000 on R-Value manifests itself in that both the 5% and 10% blends exhibit faster rates of increase in R-Value with aging than does the control binder. Because R-value is well correlated to properties such as asphaltene increase and carbonyl increase, and because as discussed previously sterols can disrupt the accumulation of asphaltenes and carbonyls and thereby reduce the impact of those binder components, then if an additive does not improve R-value or at least be neutral to R-Value that additive is nothing more than a softening additive. Altering the R-Value of the aged base control as shown in FIG. 41 provides one more indication that sterol has fundamentally altered the control binder and the blend is functioning as a new binder with a different aging profile.

Figure 42:
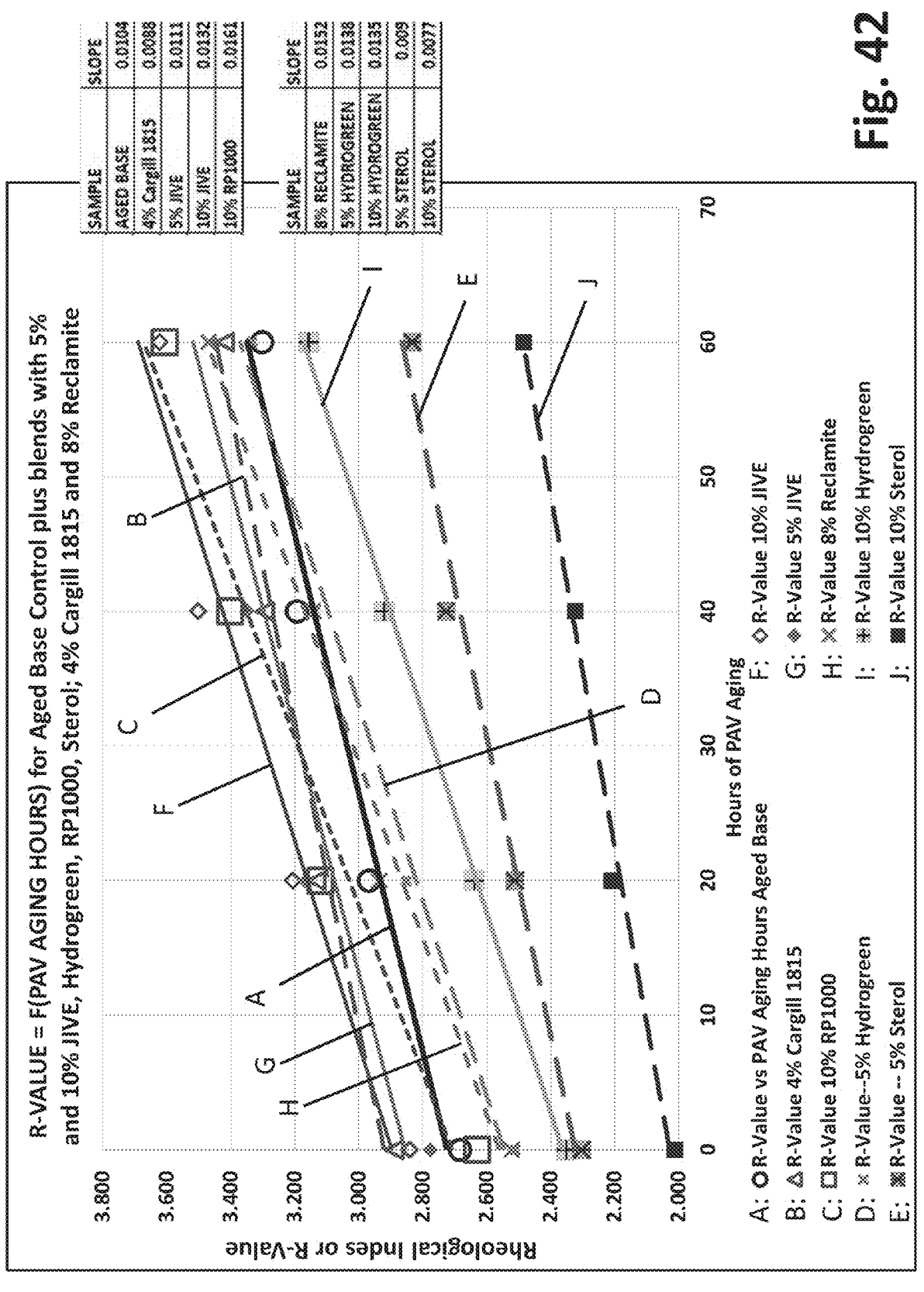
FIG. 42 shows more R-Value data with a range of bio oil additives.

FIG. 42 shows more R-Value data with a range of bio oil additives. For some bio oil additives, the softening effect is such that the R-Value at zero aging time is lower than the aged base control. RECLAMITE is petroleum derived oil that has been sold for many years as a rejuvenator. The RECLAMITE blends exhibit an R-Value less than the control but age rapidly and by 40 PAV hours has an R-Value greater than the control. Only the 10% JIVE blend does not cross over the control data and that is because of its softening ability. All the additives other than sterol have aging rates, as shown by their slopes, that represent faster aging than the control sample; and the sterol samples as shown previously have lower R-Value aging rates compared to the control.

When asphalt binders age, their low temperature stiffness property failure criteria do not change as rapidly as their low temperature relaxation property failure criteria. Because of this fact recycling additives that are mainly softening additives cannot produce binders that have good low temperature PG Grade values unless substantial levels of the softening additives are used. Because the low temperature creep or relaxation properties of nearly all binders degrade more rapidly than their stiffness, a binder will need to be highly softened so that the relaxation property meets specification after PAV aging. Data generated for several different blends including blends produced with sterol will suffice to show this point. Table 5 below summarizes the data.

TABLE 5

| SAMPLE DESCRIPTION | Temperature range of S failurefrom 0 to 60 PAV | | |
|---|---|---|---|
| | Δ Ts-0 to 60 | Δ Tm-0 to 60 | Difference |
| Aged binder + 7.5% Sterol | 4.2 | 3.5 | 4.3 |
| 5% RP1000 | 5.6 | 22.7 | 17.1 |
| 4% Cargill 1815 | 5.6 | 17 | 11.4 |
| 5% RP1000 + 7.5% sterol | 5.2 | 11.4 | 6.2 |
| 4% Cargill 1.815 + 7.5% sterol | 6.5 | 6.6 | 0.1 |

The data shows the range of low temperature stiffness and m-value failure temperatures for several blends. Regardless of binder the range for stiffness failure temperature is very narrow covering about a 2° C. spread for an aged binder such as the aged binder+7.5% sterol and the blend of 4% Cargill 1815 bio oil plus 7.5% sterol. The Tm-Critical failure range is however different for these blends. The aged binder control+sterol has a range double that of the Ts-critical failure range so that the difference means that Tm-Critical failure value is 4.3° C. warmer than the Ts-Critical failure temperature. For blends of the aged binder plus bio oils the difference is substantial at 17° C. for RP1000 and 11.4° C. for Cargill 1815. These data show that it really doesn't matter how well an additive reduces the binder stiffness because it is the binder's relaxation properties after aging that determine what the low temperature specification grade will be.

Figure 43:
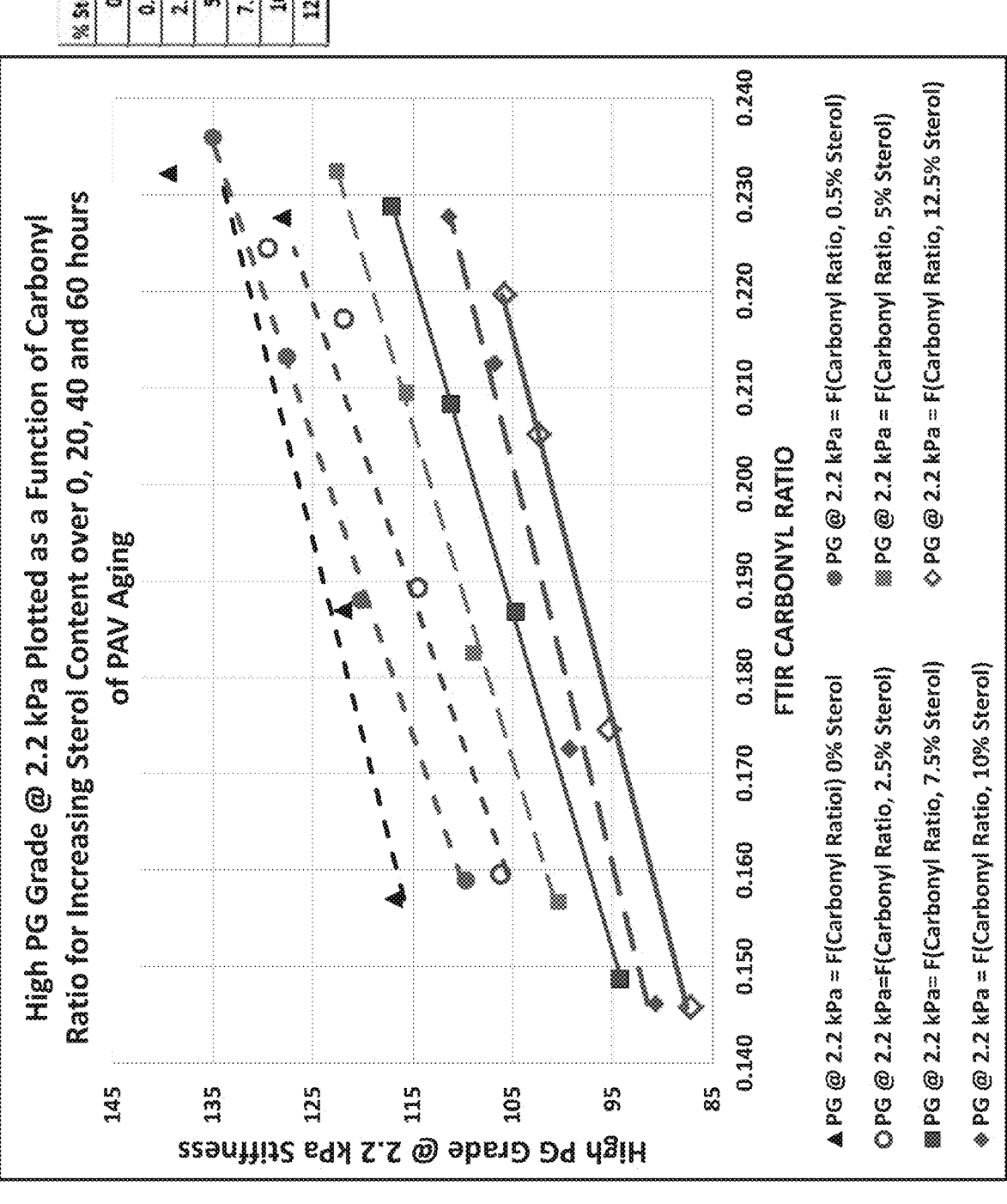
FIG. 43 shows high PG grade at 2.2 kPa plotted as a function of carbonyl ratio for increasing sterol content over 0, 20, 40, and 60 hours of PAV aging.

FIG. 43 shows high PG grade at 2.2 kPa plotted as a function of carbonyl ratio for increasing sterol content over 0, 20, 40, and 60 hours of PAV aging, according to various embodiments. The main benefit of sterol with respect to the high temperature binder grade is that at 2.5% sterol and greater the carbonyl ratio is lower at 40 and 60 hours of aging than the carbonyl ratio for the control sample. For sterol levels of 5% and greater the carbonyl ratio is lower than the control at all aging times. It is clear from the data that the high temperature PG grade at 2.2 kPa is directly related to the carbonyl ratio.

Figure 44:
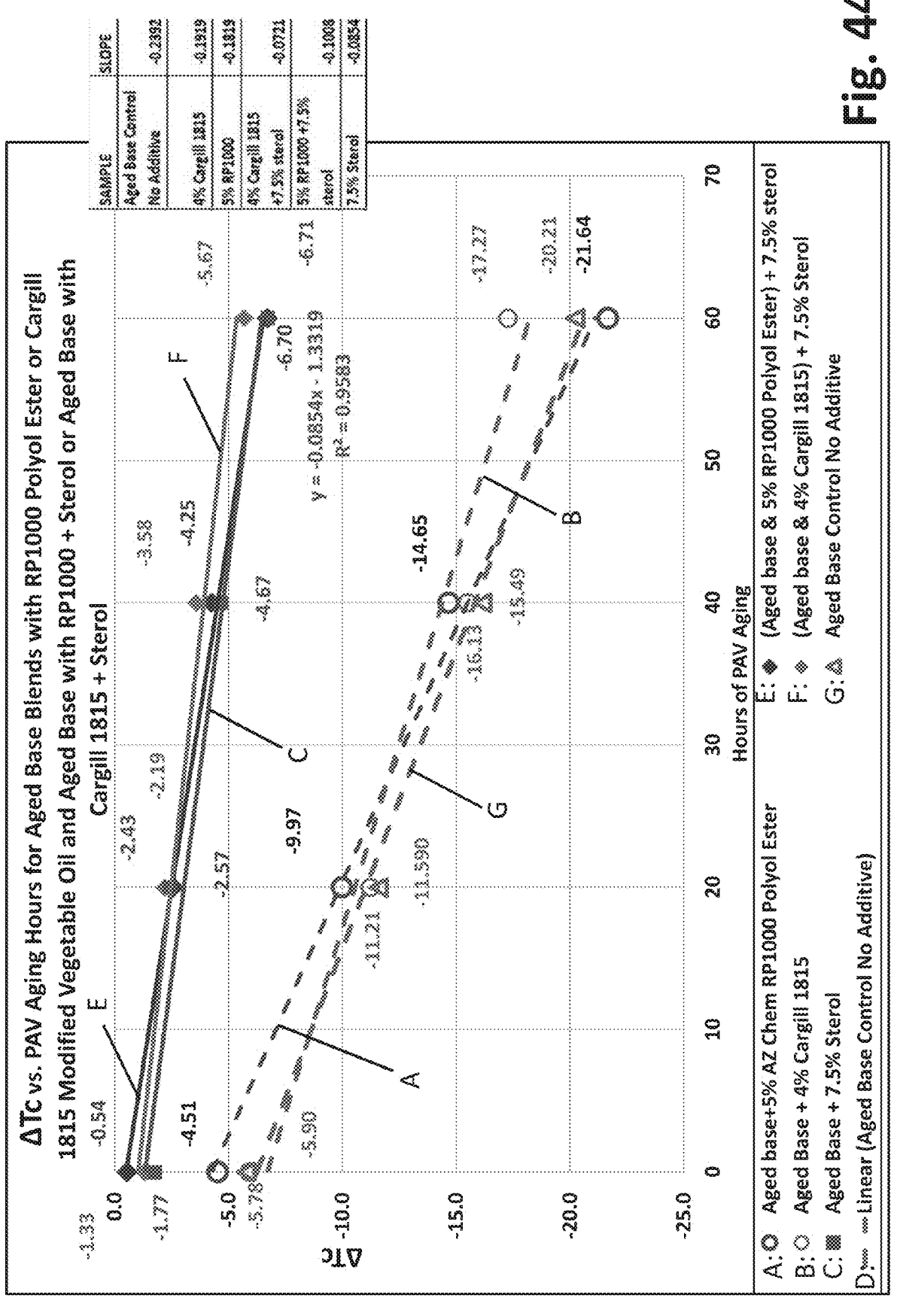
FIG. 44 shows $\Delta Tc$ versus PAV aging hours for aged base control and blends with 5% AZ Chemical RP1000 or 4% Cargill 1815 bio oil or aged base plus 5% RP1000 plus 7.5% sterol, and 4% Cargill 1815 plus 7.5%.

FIG. 44 shows ΔTc versus PAV aging hours for aged base control and blends with 5% AZ Chemical RP1000 or 4% Cargill 1815 bio oil or aged base plus 5% RP1000 plus 7.5% sterol, and 4% Cargill 1815 plus 7.5% sterol according to various embodiments. ΔTc of the bio oil only blends follow the nearly same aging profile as does the aged control with no additive while the bio oil blends with 7.5% sterol follow closely the same aging profile as the aged control plus 7.5% sterol. Other data in this document show that bio oils can soften aged binders, which is a beneficial feature; but the data has also shown that sterol can impart a new aging profile to the softened binder and sustain that new aging profile through multiple aging cycles. A beneficial feature of sterol addition is that the oil blended binders become different asphalt materials with their own unique set of aging characteristics.

Figure 45:
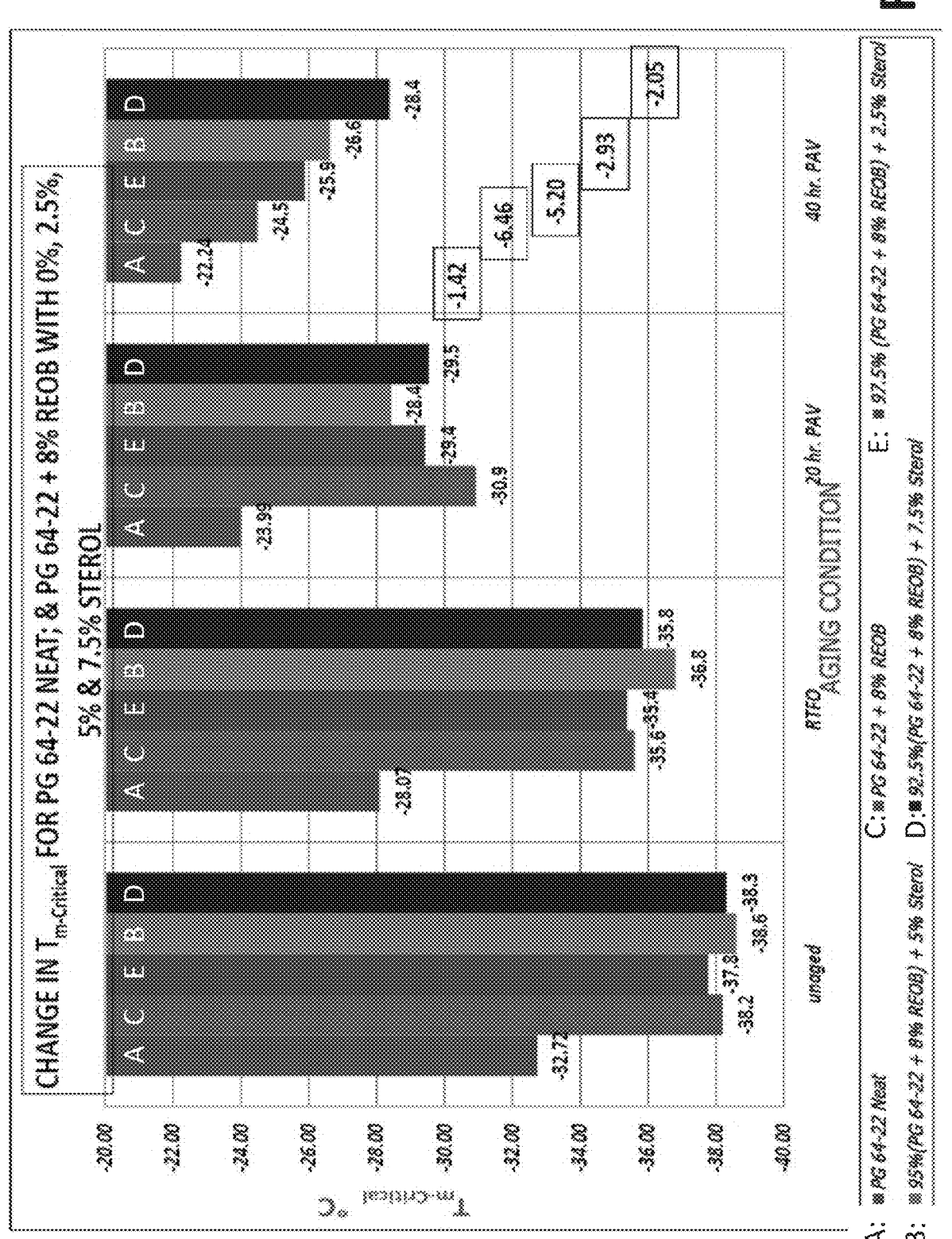
FIG. 45 shows change in Tm-critical for PG 64-22 neat and PG 64-22 plus 8% REOB (re-refined engine oil bottoms) with 0%, 2.5%, 5%, and 7.5% sterol.

FIG. 45 shows change in Tm-critical for PG 64-22 neat and PG 64-22 plus 8% REOB (re-refined engine oil bottoms) with 0%, 2.5%, 5%, and 7.5% sterol, according to various embodiments. Another example of response is the impact of three different levels of sterol on a blend of PG 64-22+8% REOB. As the blends age the negative effect of REOB takes over, but the presence of sterol is able to mitigate some of the effect of REOB. ΔTc data is listed for the 40 hour PAV samples. The data shown in the 40 hr PAV region is the change in Tm-Critical between each respect sample at 40 hours compared to 20 hours. For example the 64-22 Neat sample increases in low temperature grade by 1.42° C. when aged from 20 to 40 hours in the PAV. This is a very modest reduction in low temperature grade and reflects an asphalt that does not age appreciably. The blend of 64-22+8% REOB loses 6.46° C. in low temperature grade and the majority of that loss is due to the presence of REOB because the previous sample showed that the PG 64-22 ages only slightly. The increasing levels of sterol to the blend with 8% REOB shows the impact that sterol can make in reducing the deleterious impact of an aging accelerator such as REOB on an asphalt binder. The 7.5% sterol addition has preserved much of the low temperature softening impact of the REOB evident in the unaged and RTFO data. Between the RTFO result for neat PG64-22 and the 40 hour PAV result the neat PG 64-22 loses 5.83° C., which is in line with a well aging asphalt. The 8% REOB blend in PG 64-22 between those two aging points loses 7.4° C., which puts the two samples within 1.5° C. of each other.

Example 6

Binders can be prepared for AFM by application of a small bead to a steel stub. With a knife, the bead can be scraped against the surface of the stub and the resulting film heated to 115° C. for about 2 min to allow the film surface to level. AFM images can be captured at room temperature on a Bruker Dimension Icon-PT™ Probe microscope. Both topographic and friction images can be obtained after the asphalt films have been annealed 72 h to 96 h at room temperature. Antimony doped silicon cantilever tip AFM probes (Bruker Corporation) can be used for measurements. Topographic images can reveal vertical elevations and declinations associated to surface features, whereas the friction image allows for differentiation of surface material based on changes in elastic or adhesive properties.

Figure 46:
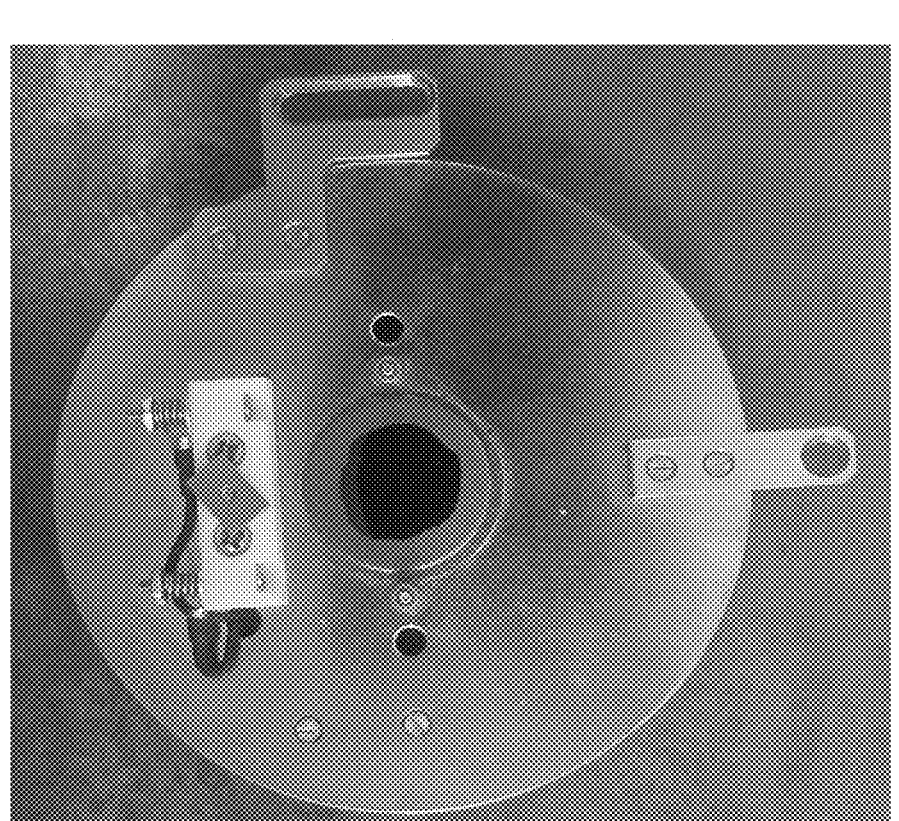
FIG. 46 shows experimental details, according to various embodiments.

FIG. 46 shows experimental details to perform Atomic Force Microscopy testing of asphalt binder. Procedures used are from literature standards.

Figure 47:
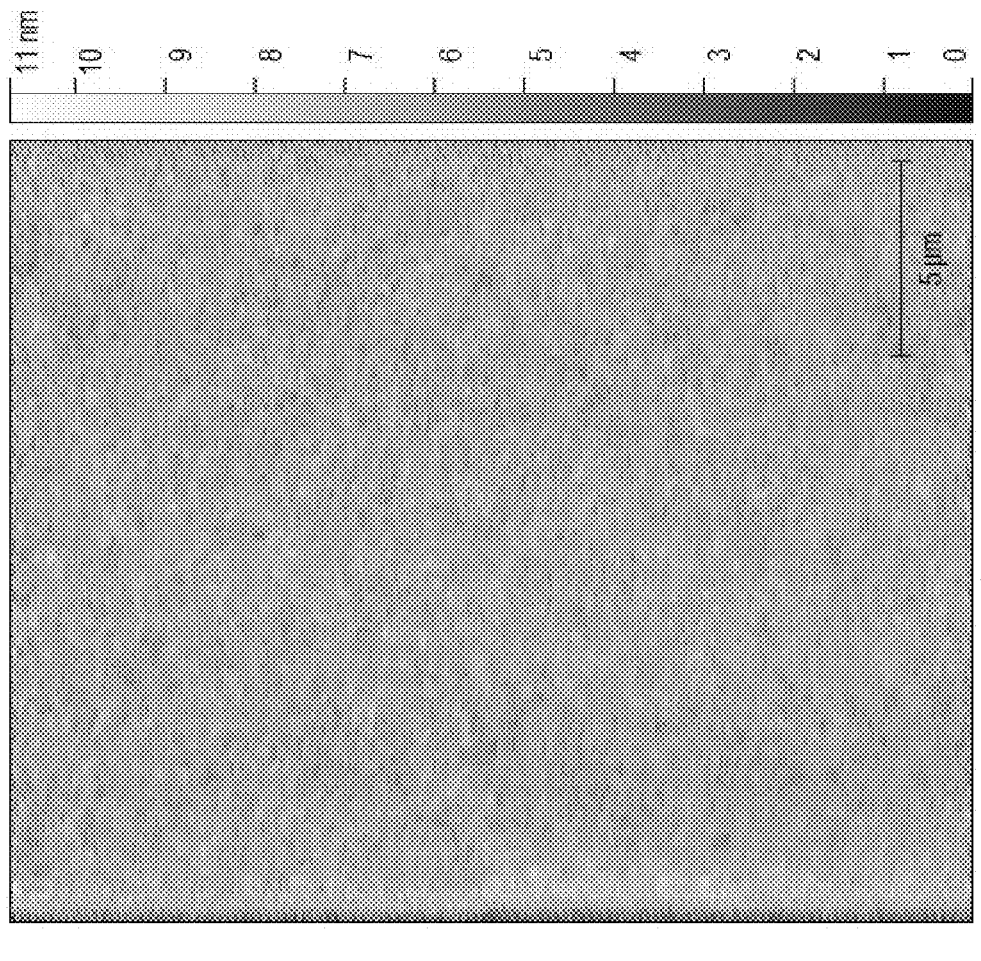
FIG. 47 shows morphology at 50° C., according to various embodiments.

FIG. 47 shows morphology at 50° C., according to various embodiments. A representative image taken at 50° C. This image is to show that the samples are heated to a temperature at which they show no features on the surface.

Figure 48:
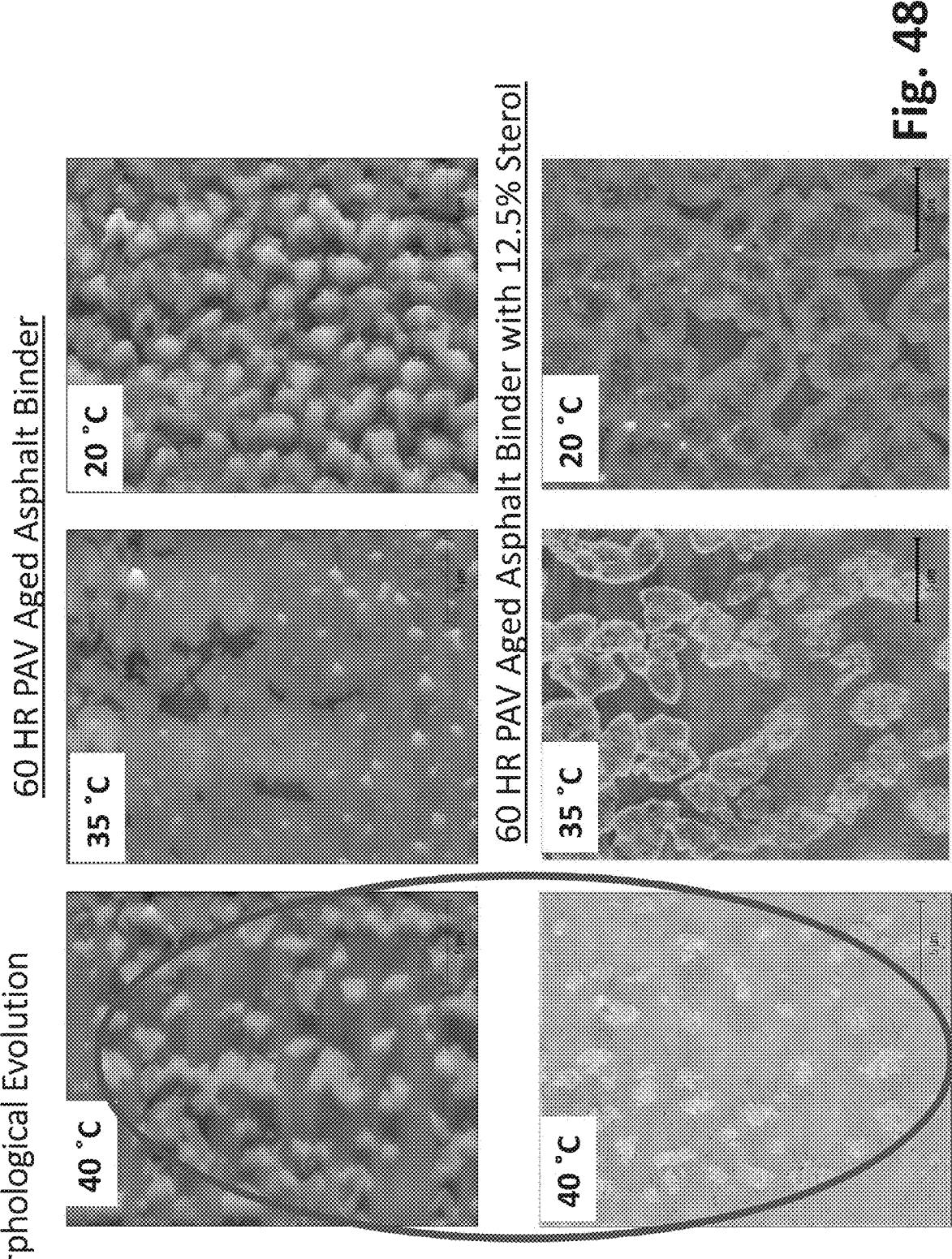
FIG. 48 shows a morphological evolution of 60-hour PAV aged asphalt binder and 60-hour PAV aged asphalt binder with 12.5% sterol, according to various embodiments.

FIG. 48 shows a morphological evolution of 60-hour PAV aged asphalt binder and 60-hour PAV aged asphalt binder with 12.5% sterol, according to various embodiments. FIG. 8 serves as an initial comparison of the temperature dependent morphology observed in a sample containing no sterol and a sample containing 12.5% sterol. At 40° C. both samples begin to form island features. As the samples are cooled to 30° C. the morphology of the material containing no sterol appears as a terrace with islands decorating the surface, while the material containing 12.5% sterol shows no terrace formation just an increase in the planar dimensions of the islands. At room temperature, 20° C., the sample containing no sterol shows a rough morphology including many small islands, while the 12.5% sample shows a further increase in the planar dimensions of the islands.

Figure 49:
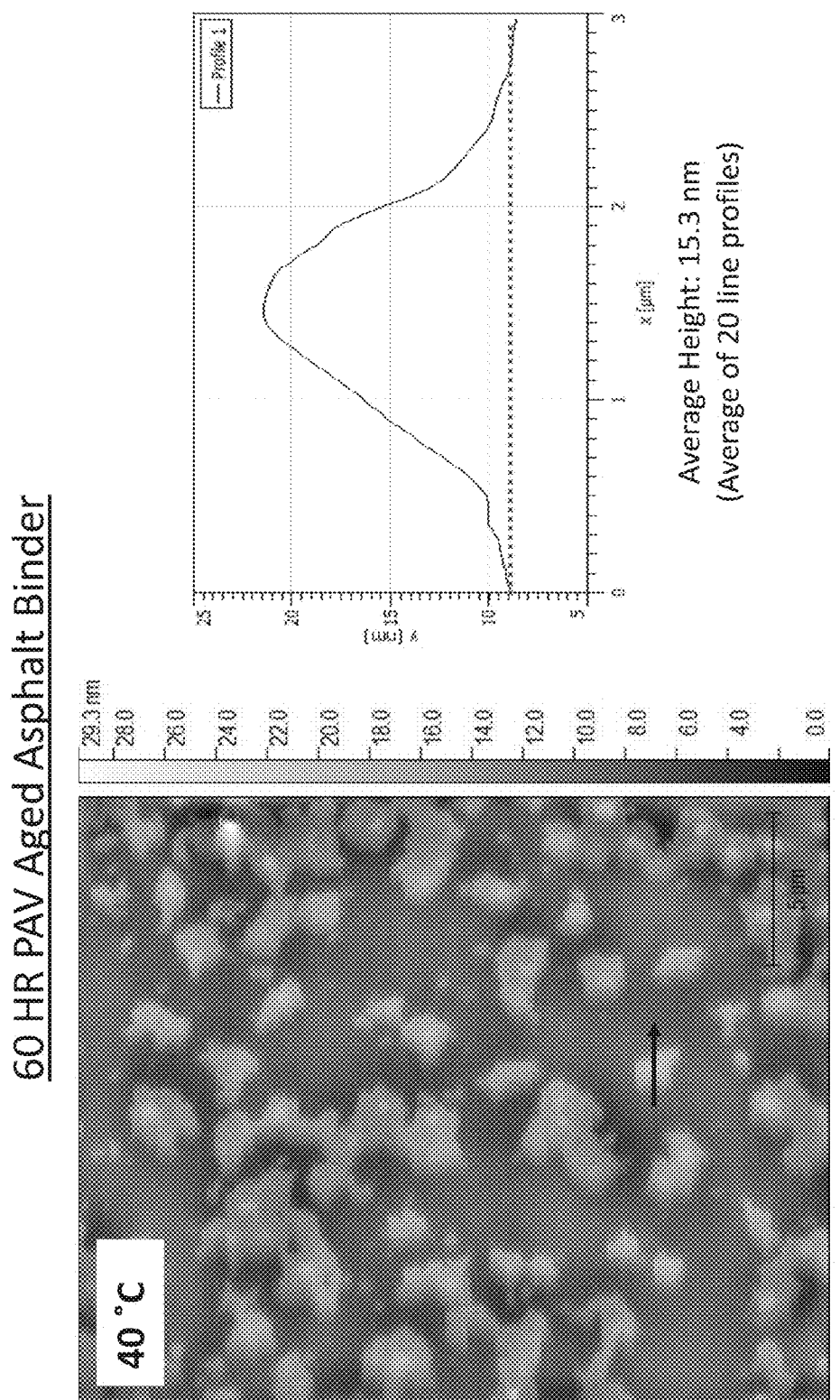
FIG. 49 shows a topological analysis of 60-hour PAV aged asphalt binder, according to various embodiments.

FIG. 49 shows a topological analysis of 60-hour PAV aged asphalt binder, according to various embodiments. FIG. 49 shows a typical line profile of an island feature observed in the no sterol sample. Averaging 20 line profiles shows that this feature is approximately 15 nm in height above the asphalt surface. In contrast, the 12.5% sterol sample has an average height of approximately 3 nm. It should be noted that the island area and height level in the no sterol sample being approximately 5 times larger than that in the 12.5% sterol sample indicates what we believe is a molecular level confirmation that sterol is preventing these regions of roughness from forming. This molecular view of the binder surface is consistent with reduction in the growth of asphaltenes and carbonyls in blends containing sterol, especially sterol at the 12.5% level. f FIG. 50 shows a topological analysis of 60-hour PAV aged asphalt binder with 12.5% sterol, according to various embodiments.

FIG. 51 shows a comparative topological analysis of 60-hour PAV aged asphalt binder and 60-hour PAV aged asphalt binder with 12.5% sterol, according to various embodiments.

Figure 50:
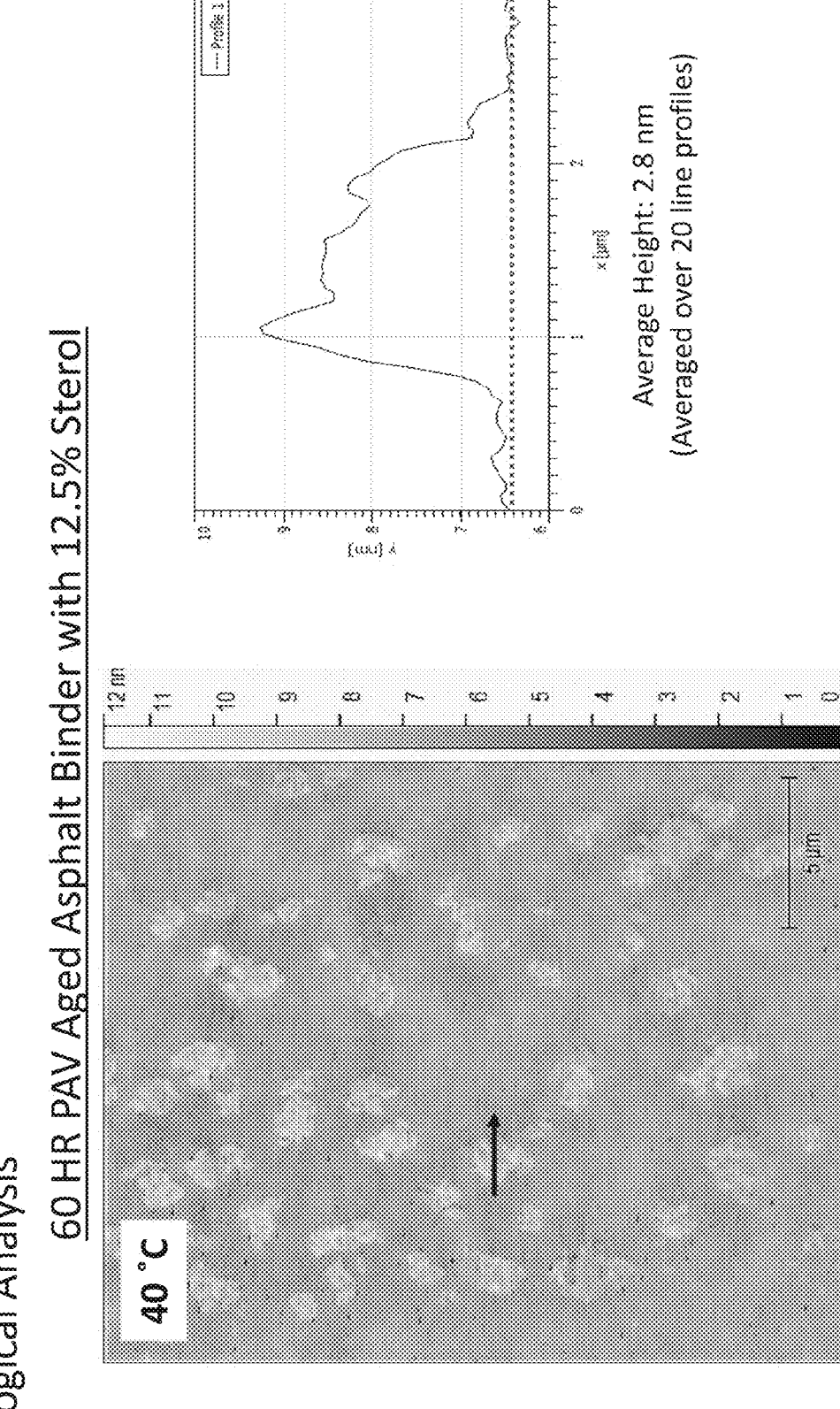
FIG. 50 shows a topological analysis of 60-hour PAV aged asphalt binder with 12.5% sterol, according to various embodiments.
Figure 52:
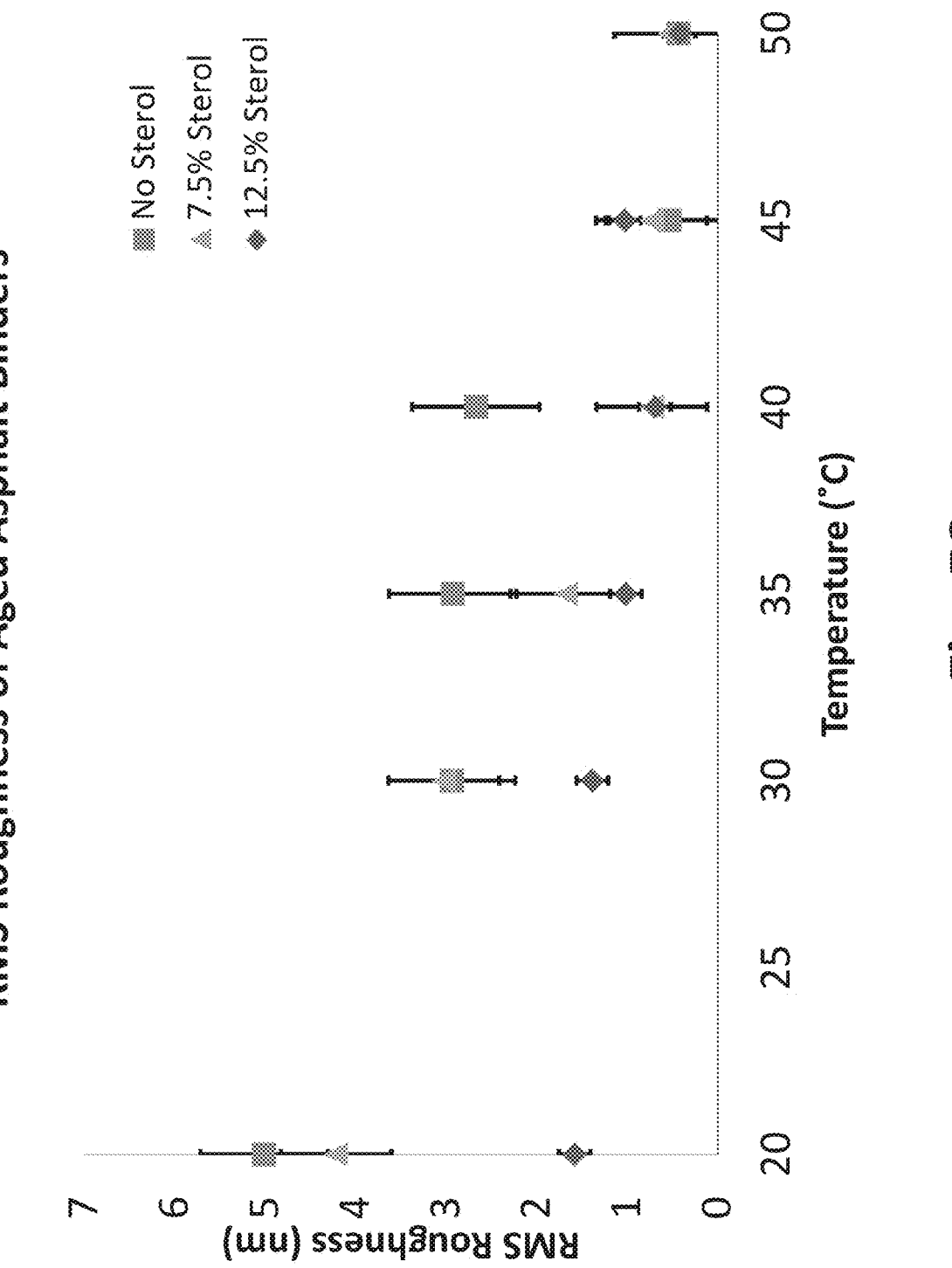
FIG. 52 shows RMS roughness of aged asphalt binders and a morphological evolution of 60-hour PAV aged asphalt binder and 60-hour PAV aged asphalt binder with 12.5% sterol, according to various embodiments.

FIGS. 49-51 show a topological analysis of the morphology discussed in the previous FIGS. Specifically, as shown, quantification is for the images obtained at 40° C. FIG. 51 shows a direct comparison of island heights as well as the RMS roughness of each sample. It is interesting to note that the sample with 12.5% sterol is substantially smoother, less RMS variation, than the sample with no sterol. This further supports the conclusion that sterol is inhibiting the formation of moieties in the bitumen that lead to AFM roughness as well the development of compositional and chemical properties such as asphaltenes and carbonyls which are reflective of poor performance FIG. 52 shows RMS roughness of aged asphalt binders shows a morphological evolution of 60-hour PAV aged asphalt binder and 60-hour PAV aged asphalt binder with 12.5% sterol, according to various embodiments. FIG. 52 shows how the RMS value varies as a function of both sterol composition and sample temperature. After 40° C. material with higher sterol concentration yields a smaller RMS variation than those containing sterol additives. The sterol is blended into the bitumen prior to aging and its function is to retard or sequester materials that would lead to the amount and roughness of products due to binder aging. The images shown in the comparative images with no sterol and 12.5% sterol are consistent with the observation that sterol is functioning to produce a binder with a unique set of properties different from those of the binder without sterol. The RMS roughness data plotted in FIG. 52 increases with test temperature and reduction in sterol content after 60 hours of PAV aging. The increase in RMS roughness reduction is reduced due to higher levels of sterol and is at the very least directionally correlated to the ability of sterol to reduce levels of asphaltenes as binders age and also render the increase in carbonyls less of of a problem as a result of aging. The AFM RMS roughness data is yet another example of sterol beneficially altering the asphalt structure as a result of aging.

Figure 53:
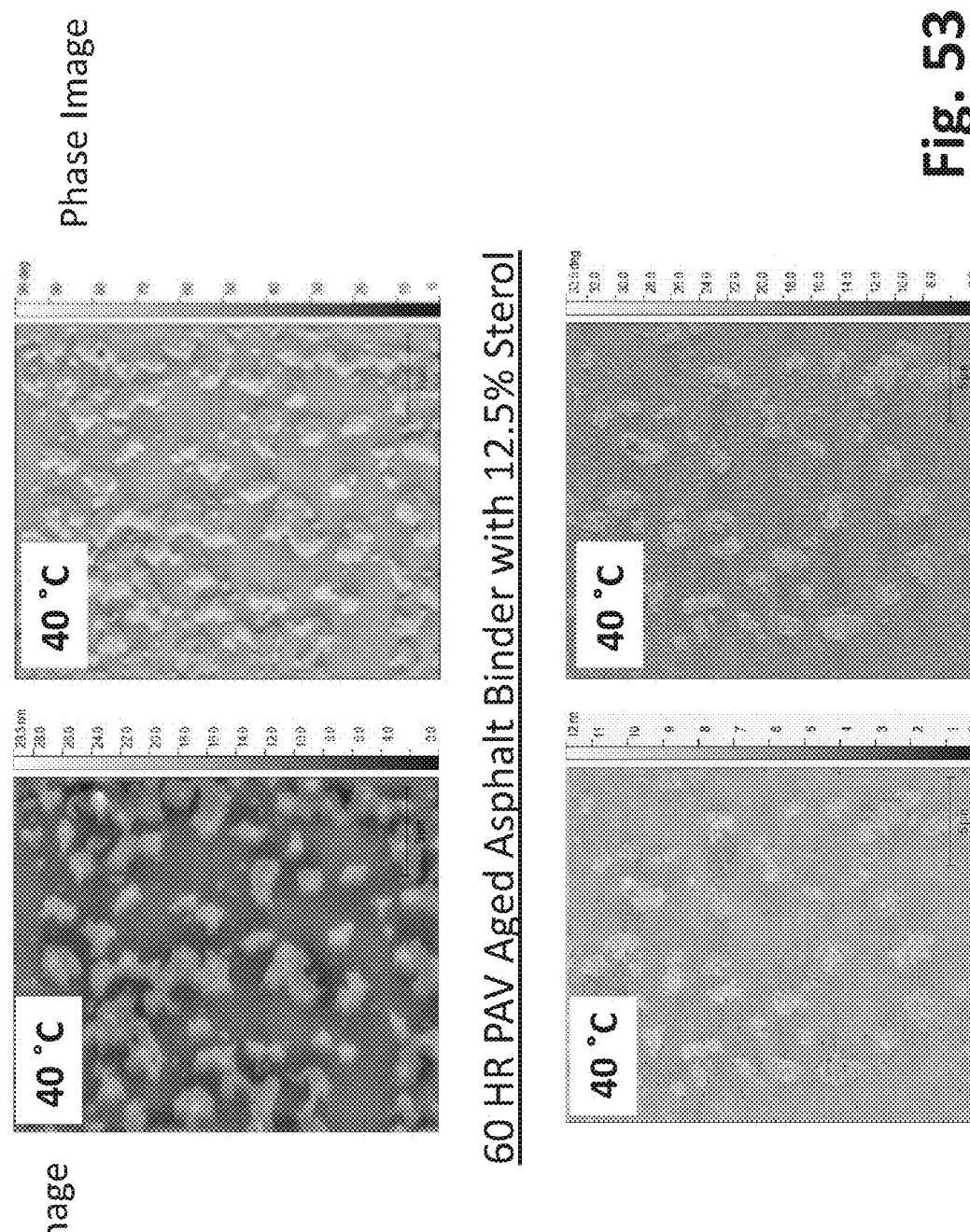
FIG. 53 shows a topology phase analysis of 60-hour PAV aged asphalt binder and 60-hour PAV aged asphalt binder with 12.5% sterol, according to various embodiments.

FIG. 53 shows a topology phase analysis of 60-hour PAV aged asphalt binder and 60-hour PAV aged asphalt binder with 12.5% sterol, according to various embodiments. FIG. 36 shows a comparison of topological imaging to phase imaging.

FIG. 54 shows a topology phase analysis of 60-hour PAV aged asphalt binder and 60-hour PAV aged asphalt binder with 12.5% sterol, according to various embodiments. Quantitative analysis of phase images of material containing no sterol and 12.5% sterol. The island features in the no sterol samples have an average phase shift of 27.75° C. and the samples with 12.5% sterol have an average phase shift of approximately 3° C. Since a phase shift is indicative of difference in composition of the material being imaged, it is suggested that the islands observed in the no sterol sample are different in composition than the immediately surrounding material, while the islands observed in the 12.5% sterol material are similar in composition to the surrounding material. This is more evidence of the sterol acting to prevent the large phase particles from forming. The low phase shift of 1.8 degrees means that the island images shown in the 12.5% sterol sample are barely protruding from the surrounding surface.

Figure 55:
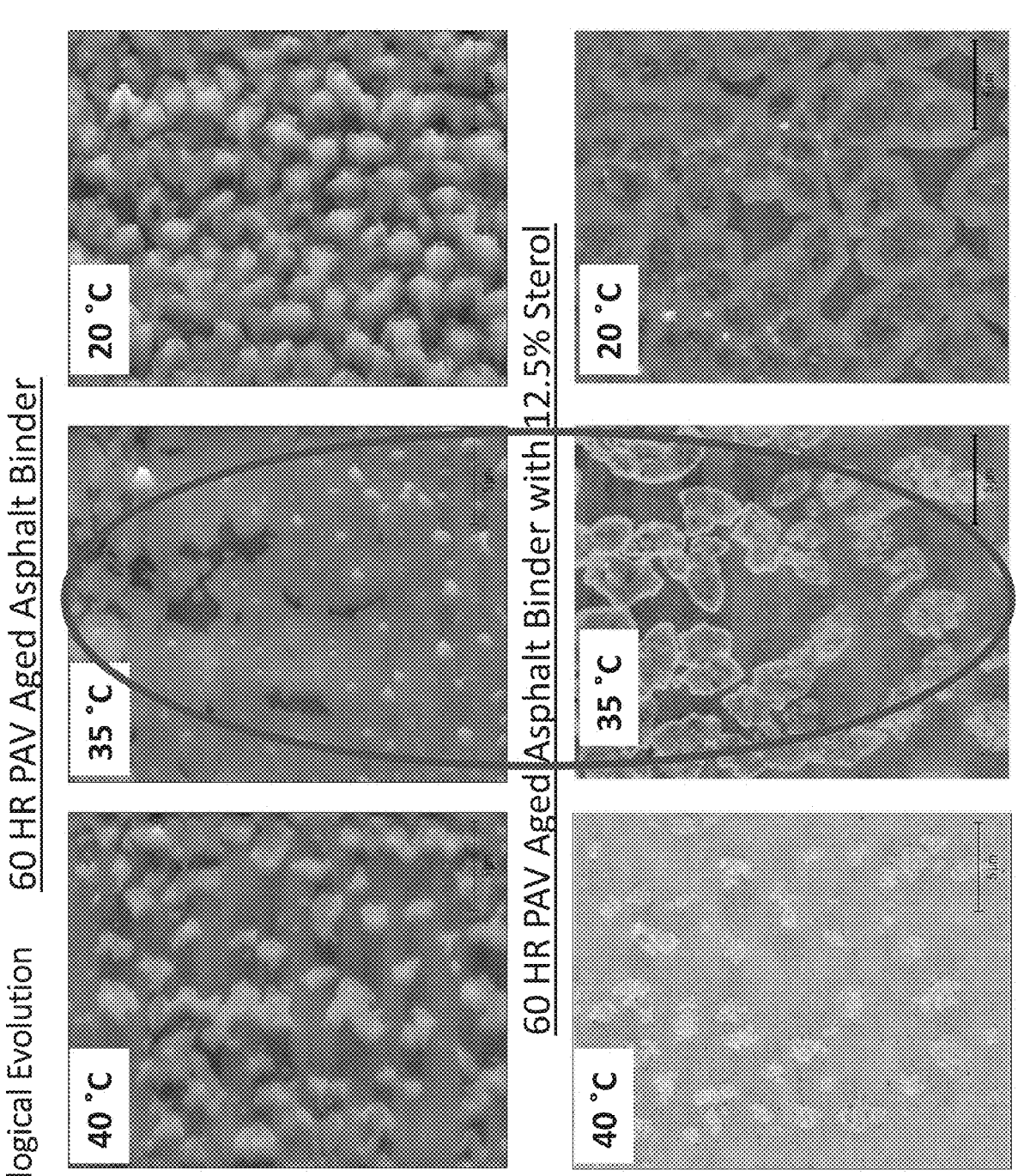
FIG. 55 shows a morphological evolution of 60-hour PAV aged asphalt binder and 60-hour PAV aged asphalt binder with 12.5% sterol, according to various embodiments.

FIG. 55 shows a morphological evolution of 60-hour PAV aged asphalt binder and 60-hour PAV aged asphalt binder with 12.5% sterol.

Figure 56:
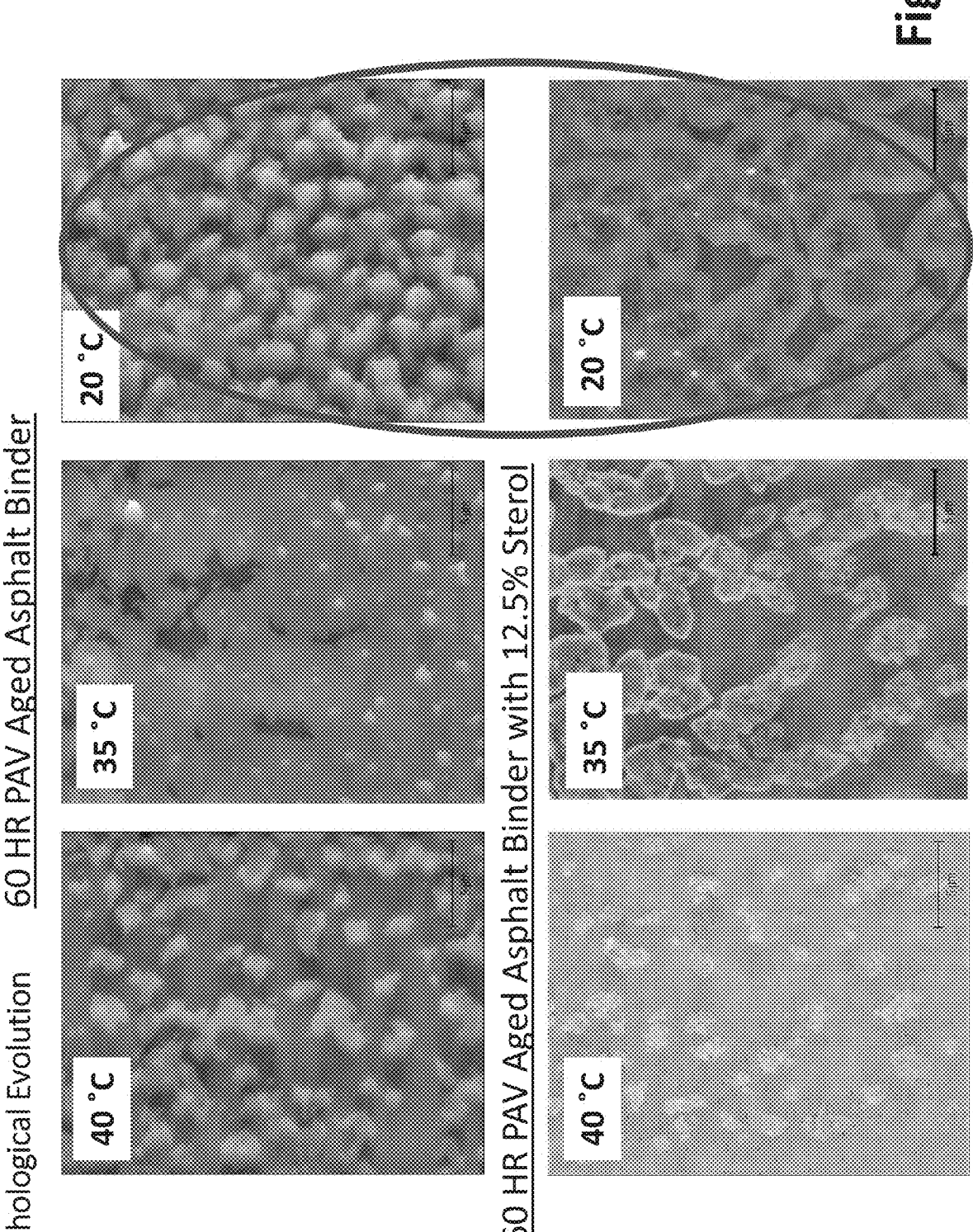
FIG. 56 shows a morphological evolution of 60-hour PAV aged asphalt binder and 60-hour PAV aged asphalt binder with 12.5% sterol, according to various embodiments.

FIG. 56 shows a morphological evolution due to AFM imaging after cooling the binder samples to three successively lower temperatures of 60-hour PAV aged asphalt binder and 60-hour PAV aged asphalt binder with 12.5% sterol. Considering the images at 20° C. for the zero sterol and 12.5% sterol samples the amount of material showing up on the surface is lower in concentration and the level of protrusion from the surface is lower for the 12.5% sterol sample. Most fatigue problems occur in a temperature region between about 15° C. to 30° C. depending on geographical location. It is important that sterol even at extended aging times can mitigate the accretion of products of aging at these intermediate temperatures is an important finding.

Figure 57:
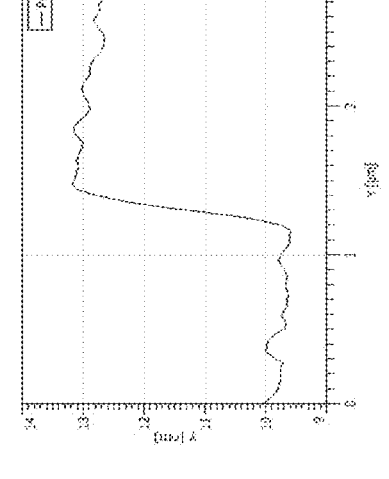
FIG. 57 shows a morphological evolution of 60-hour PAV aged asphalt binder and 60-hour PAV aged asphalt binder with 12.5% sterol, according to various embodiments.

FIG. 57 shows a morphological evolution of 60-hour PAV aged asphalt binder and 60-hour PAV aged asphalt binder with 12.5% sterol by testing surface roughness at 20° C. according to various embodiments. Lower temperatures result in greater surface roughness as the binder cools. FIG. 57 shows that even at room temperature the impact of sterol on preventing roughness from growing substantially compared to the non-sterol sample.

Figure 58:
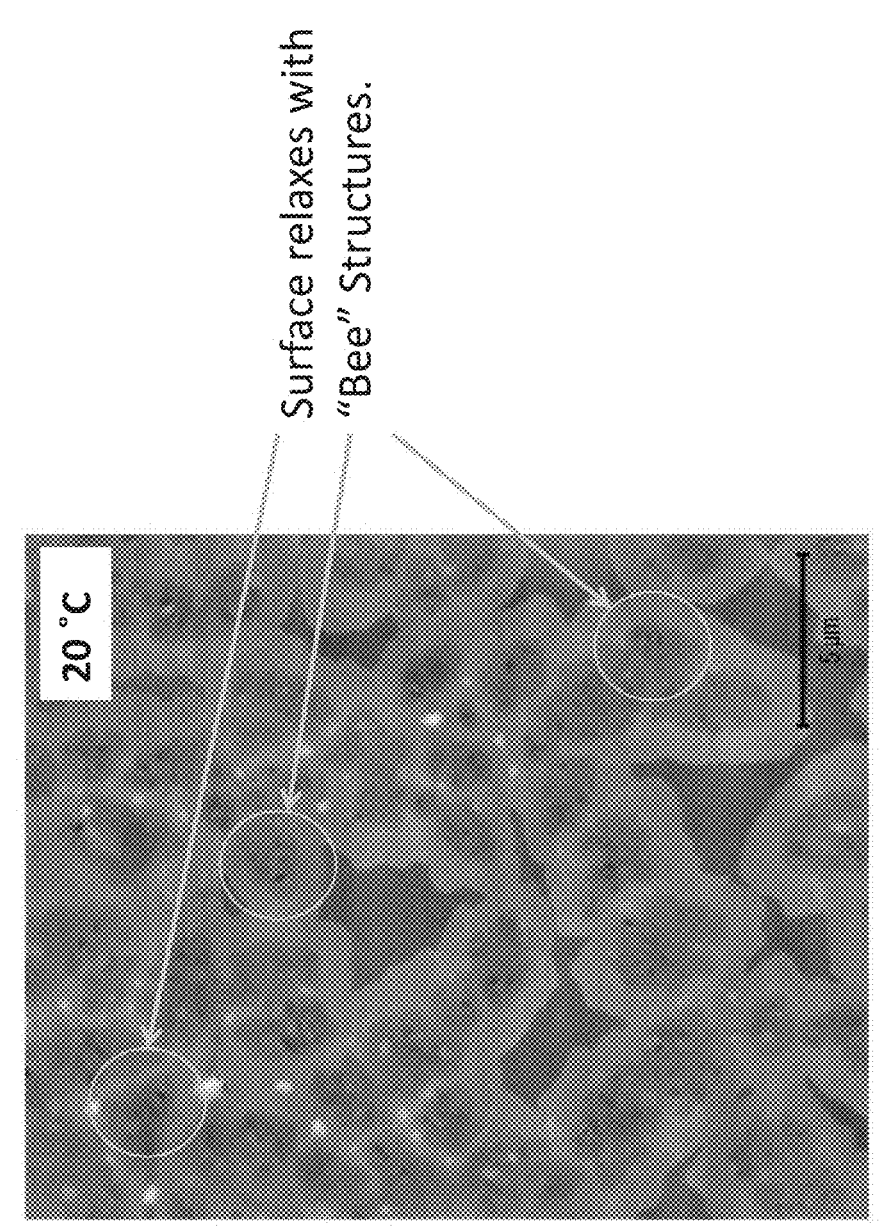
FIG. 58 shows a morphology at room temperature for a 60-hour PAV aged asphalt binder with 12.5% sterol, according to various embodiments.

FIGS. 56-58 show topological measurements of no sterol and 12.5% sterol materials at room temperature. The no sterol material exhibits a rough surface with numerous island features. These features have similar heights to the islands observed in during the initial nucleation at 40° C. It is also evident that this surface contains numerous layers of islands as indicated by the step structure observed in the line profile of FIG. 60. Similarly, the 12.5% sterol material exhibits steps of approximately 3 nm in height with no formation of multilayer steps. Additionally, the no sterol sample shows a much higher RMS roughness than the 12.5% sterol sample in agreement with the data presented in FIG. 52. At FIG. 58, the 12.5% sterol material exhibits surface relaxation "bee" structures at room temperature in direct contrast to the material containing no sterol. This indicates that the sterol additive causes the surface of the material to remain flexible enough that the surface relieves stress through this well-known wrinkling process.

FIG. 59 shows a morphology at room temperature for a 60-hour PAV aged asphalt binder with 12.5% sterol and a 60-hour PAV aged asphalt binder with 7.5% sterol, according to various embodiments.

FIG. 60 shows a morphology at room temperature for a 60-hour PAV aged asphalt binder with 12.5% sterol and a 60-hour PAV aged asphalt binder with 7.5% sterol, according to various embodiments.

Figure 62:
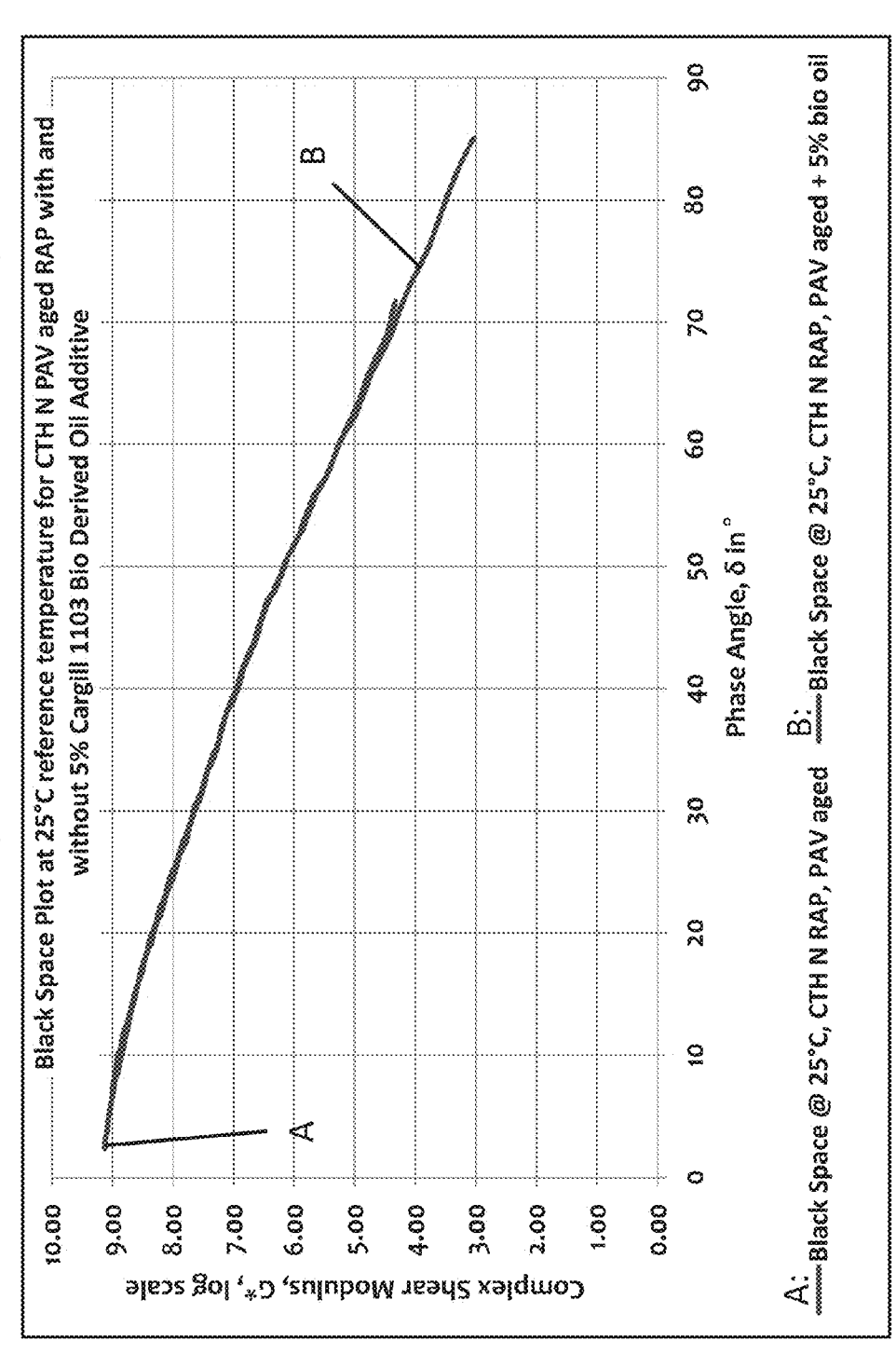
FIG. 62 is a Black Space plot of a RAP binder aged and with and without 5% bio derived oil
Figure 63:
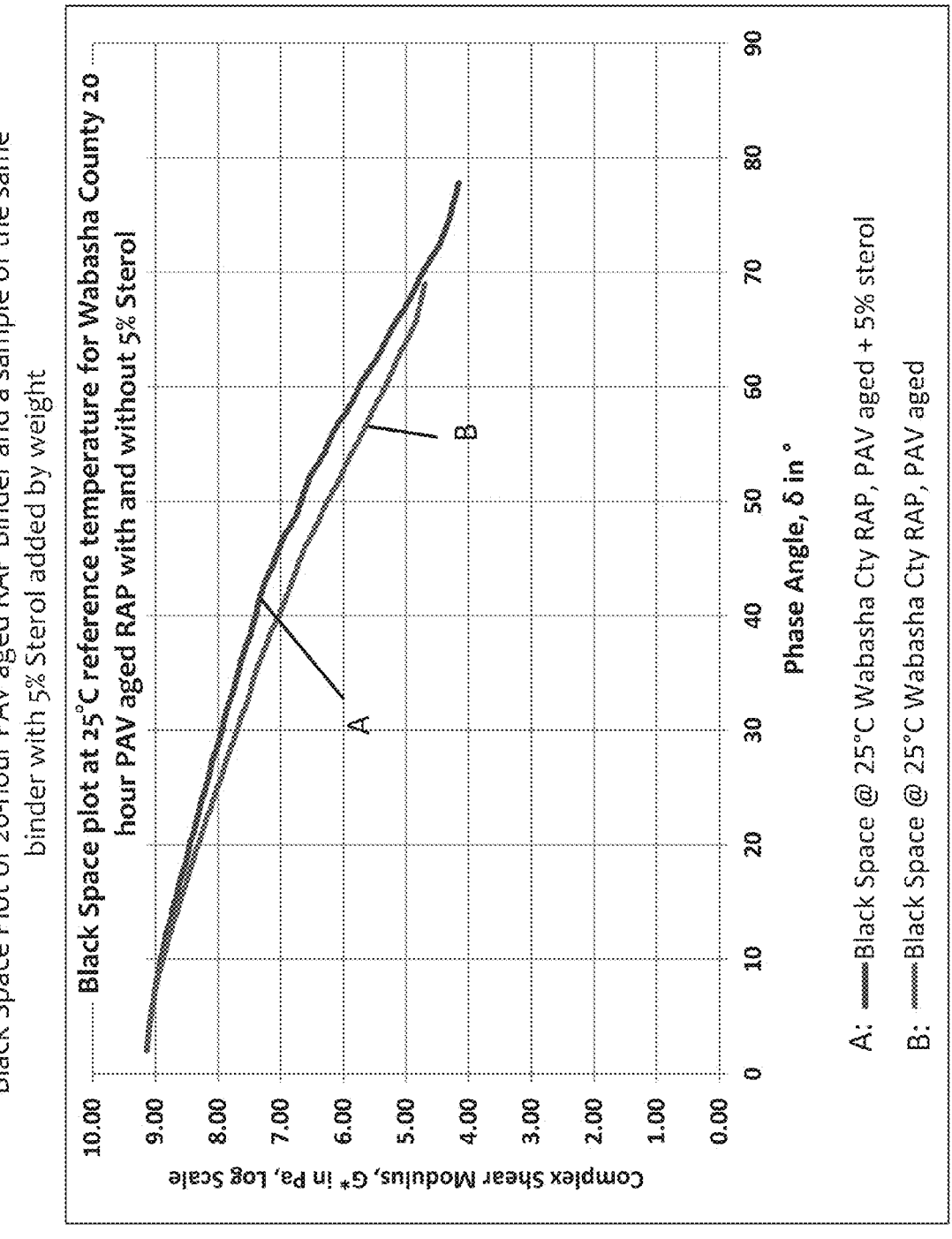
FIG. 63 is a Black Space plot of a 20 hour PAV-aged RAP binder with or without 5% sterol.

At FIGS. 59 and 60 room temperature morphology and topography of a material containing 12.5% sterol to a material containing 7.5% sterol are compared. We observe that the surface of the 7.5% sterol sample clearly shows three major features. One of these features is the bee structures described previously with reference to FIG. 58. There are fewer bees on this material than on the 12.5% sterol material which indicates that this surface is not as ductile as the material containing a higher concentration of sterol. The second feature is the island shown with line the same 20 hour PAV aged RAP binder was blended with 5% sterol by weight and the Black Space of that blend is also shown in FIG. 63. The performance difference between the bio derived oil treated aged RAP binder and the sterol treated aged RAP binder is shown by visually inspecting the Black Space plots in FIGS. 62 and 63 and by review of the data shown in Table 6. FIG. 62 visually shows that the addition of 5% bio derived oil only serves to soften the aged RAP binder. This fact is shown by the extension of the Black Space plot of the original aged RAP binder to lower complex shear modulus (G*) values and higher phase angles but following the same path as the original aged RAP binder. FIG. 63 shows that addition of sterol moves the complex shear modulus (G*) to higher phase angles for any given modulus value. This direction of movement is towards properties representative of less aged binder. Tables 6 and 7 summarize physical property data for each aged RAP binder and its companion sample blended with either bio derived oil or sterol.

TABLE 6

Rheological Properties of Aged RAP and Blend Produced
with 5% by weight of Cargill 1103 bio derived oil

| Sample Info | G*/sin(δ) = 1 kPa | G*/sin(δ) = 2.2 kPa | $T_{S\text{-}critical}$ | $T_{m\text{-}critical}$ | ΔTc | R-Value |
|---|---|---|---|---|---|---|
| CTH N RAP, 20 hr. PAV aged | 91.7 | 85.6 | −26.57 | −21.17 | −5.40 | 2.77 |
| CTH N RAP, 20 hr. PAV aged + 5% Cargill 1103 Bio Oil | 82.7 | 76.2 | −36.48 | −31.43 | −5.05 | 2.73 |

TABLE 7

Rheological Properties of Aged RAP and Blend Produced with 5% by weight of Sterol

| Sample Info | G*/sin(δ) = 1 kPa | G*/sin(δ) = 2.2 kPa | $T_{S\text{-}critical}$ | $T_{m\text{-}critical}$ | ΔTc | R-Value |
|---|---|---|---|---|---|---|
| Wabasha County RAP, 20 hr. PAV aged | 96.1 | 89.8 | −22.70 | −18.01 | −4.69 | 2.74 |
| Wabasha County RAP, 20 hr. PAV aged + 5% Sterol | 90.8 | 84.6 | −21.7 | −20.4 | −1.3 | 2.26 | profile FIG. 59. This island feature agrees with the islands observed on the no sterol sample both at 40° C. as well as at room temperature. The third feature of interest is examined via line profile at FIG. 60 and includes an island feature at the perimeter of a bee. The averaged line profile analysis, as indicated at FIG. 60, further indicates that the features are similar in nature to the island observed in the no sterol additive, and that the exterior and interior regions of the bee structure are separated by 3 nm step observed in the 12.5% sterol material.

Example 7

Figure 64:
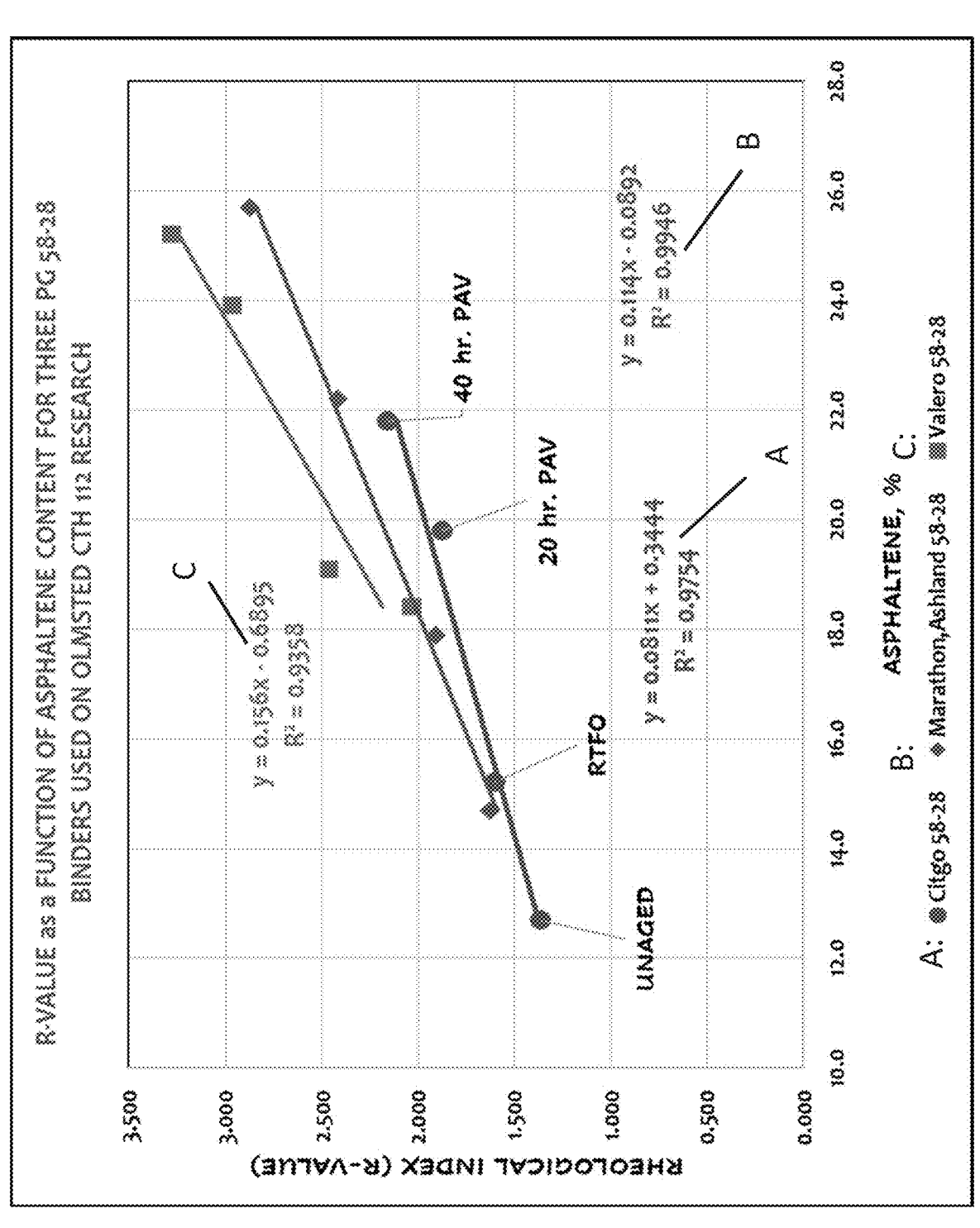
FIG. 64 is a plot of R-Value as a function of asphaltene content from different crude sources.

FIG. 62 is a Black Space plot of a RAP binder recovered from a pavement on country trunk highway N in Wisconsin. The RAP binder was further aged in the PAV for 20 hours. Five percent by weight of a bio derived oil, CARGILL 1103, was added to the PAV aged RAP binder. FIG. 63 is the Black Space plot for a 20 hour PAV aged RAP binder recovered from a pavement in Wabash County, Minnesota. A sample The data in Table 6 shows that the bio derived oil does reduce the high temperature stiffness grade of the binder by 9° C. at 1 kPa and 9.4° C. at 2.2 kPa. A similar reduction at these two stiffness levels is typical for conventional binders. The low temperature stiffness grade ($T_{S\text{-}Critical}$) is reduced (becomes cooler) by 9.9° C. and the low temperature creep or relaxation grade ($T_{m\text{-}Critical}$) is reduced (becomes cooler) by 10.3° C. When bio derived oils are referred to as softening additives it is this reduction in high and low temperature grade properties which is being addressed. The parameter ΔTc is calculated by subtracting the TS-Critical grade from the $T_{m\text{-}Critical}$ grade. Research reported in 2011 by Anderson, et al the Association of Asphalt Paving Technologists meeting found that when ΔTc, determined as described here, reaches a value of −3° C. or lower the risk of non-load associated pavement cracking can occur and if the value is −5° C. or lower cracking is likely. The R-Value or Rheological Index was a parameter developed during the Strategic Highway Research Program (SHRP). In the SHRP A-369 the Rheological Index is referred to as "R is asphalt specific". It is a characteristic property of an asphalt binder. In the SHRP-A-369-A paper presented at the Association of Asphalt Paving Technologists meeting in 1991, the authors show in Table 2 (page 80) that for the eight SHRP core asphalts representing a range of crude oil sources that R-Value is specific for each binder and that R-Value increases with each aging step to which the specific binders are subjected. These criteria are important with respect to the data for the binders and blends reflected in Tables 6 and 7. The R-value for the CTH N RAP is 2.77 and the R-value for that RAP sample plus 5% 1103 bio-oil is 2.73 which reflect no change in R-Value. The R-Value for the Wabash County aged RAP is 2.74 nearly identical to the CTH N aged RAP. This could be because most of the asphalt binders used in the Minnesota and Wisconsin area comes from refineries in the Minnesota Twin Cities and they refine crude from Western Canada. However, when 5% sterol is added to the Wabasha County aged RAP the R-Value is reduced to 2.26. An R-value reduction of approximately 0.5 is significant when one considers that for unaged binders reported in A-369 Table 2 the R-Value change from virgin asphalt in the unaged condition, followed by thin film oven aging and then PAV aging the R-Value increases range from 0.20 to 0.68. The Black Space plots shown in FIGS. 62 and 63 shows the addition of 5% sterol to an aged RAP binder can result in an improved Black Space plot. Further the data associated with the samples in Tables 6 and 7 shows that the bio derived oil is capable of reducing in stiffness at both high and low temperatures but is incapable of reducing the Rheological Index. Sterol only provides moderate softening of 5° C. at high temperature and 2.4° C. reduction at low temperature for $T_{m\text{-}Critical}$. The significance of using sterol in asphalt binders is not to soften but to alter the structure of the binder resulting in a different binder than the original material into which the sterol was added. The improvement of R-Value and the improvement in Black Space is evidence of this. Every binder obtained from a specific crude source or specific blend of crudes has its own unique aging profile. Asphaltenes increase with aging in all binders but each binder follows a unique path. Also, each binder will follow a unique aging profile as the R-Value of that binder increases with aging. FIG. 64 is a plot of R-Value as a function of asphaltenes for three binders from three very different crude sources used on a research project in Olmsted County Minnesota. The binders used on the research project age at different rates; their asphaltenes have different values in the unaged condition and those differences are maintained throughout the aging steps. Their R-Values also increase to higher levels at different aging steps. The result is a unique aging profile for each binder. The Citgo PG 58-28 was produced from a Venezuelan crude, the MARATHON-ASHLAND PG 58-28 was produced from Western Canadian Crude and the VALERO PG 58-28 was produced from a Mideast crude from KIRKUK and approximately 8% re-refined engine oil bottoms were added to meet the PG 58-28 grade. Not only do these three different binders age at different rates but the binder with the lowest rate of aging, the lowest R-Values at each aging step and the lowest asphaltenes also performed better. The VALERO with the poorest aging rate for R-values and asphaltenes performed worse than the other two binders and the MARATHON-ASHLAND binder was intermediate in field aging performance. After eight years in service the MARATHON-ASHLAND binder had performance closer to that of the VALERO binder. These data show that aging characteristics impact serviceability.

Figure 65:
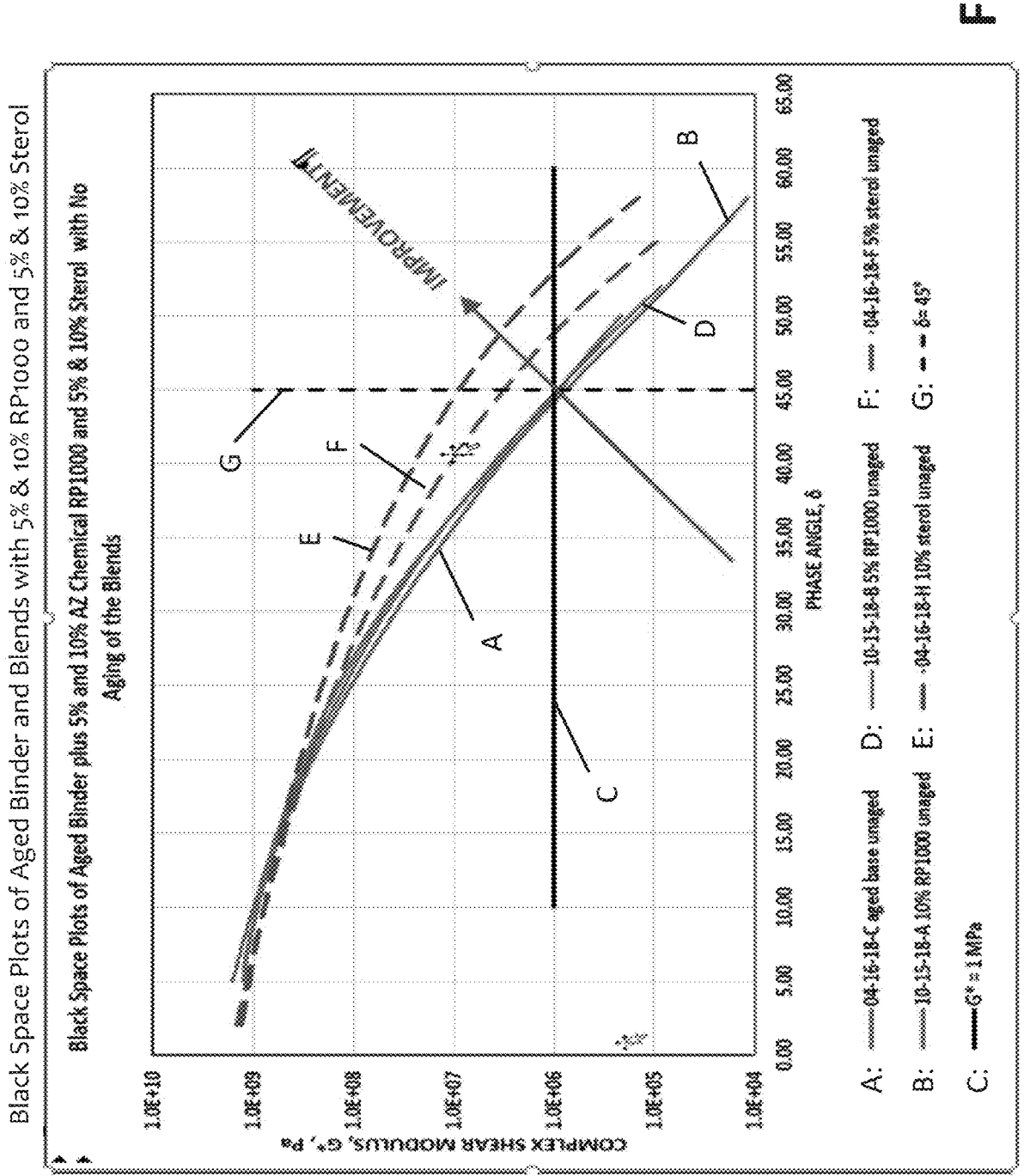
FIG. 65 is a Black Space plot of an aged binder, with 5% and 10% bio derived oil or 5% and 10% sterol.

FIG. 65 is a Black Space plot of an aged binder serving as a surrogate RAP, 5% and 10% RP1000 by weight bio derived oil blended with the aged binder and 5% and 10% sterol by weight blended with the aged binder. The Black Space plot shows a slight softening impact due to 5% RP1000 and a larger softening impact due to the 10% RP1000. However, both data plots track the Black Space plot of the original binder. The 5% and 10% sterols show improved Black Space plots and a greater improvement for 10% sterol than for 5% sterol.

Figure 66:
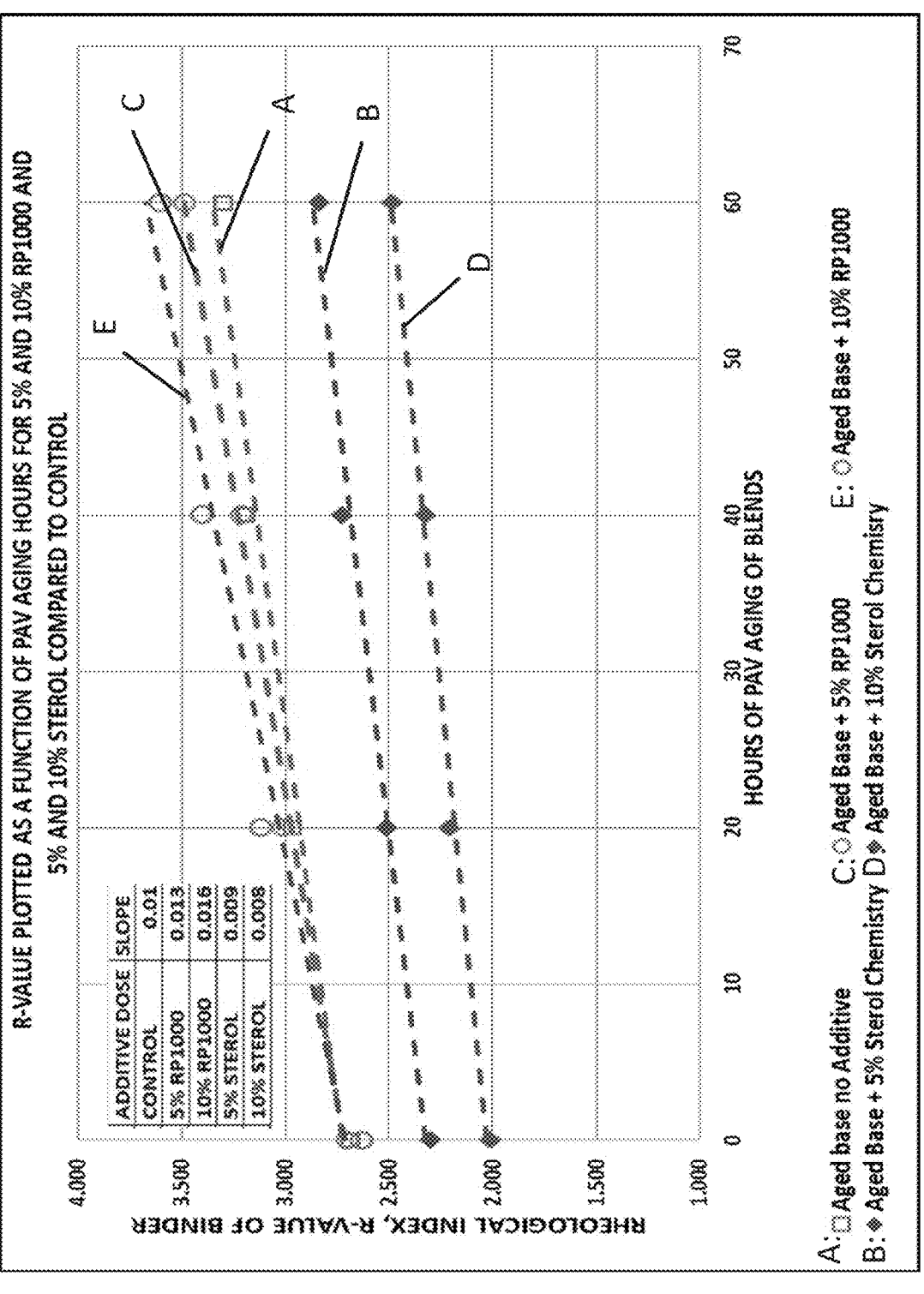
FIG. 66 is a plot of R-Value as a function of PAV aging for the same binders shown in FIG. 54.

FIG. 66 is a plot of R-Value as a function of hours of PAV aging for the same binders shown in FIG. 65. The R-Values for the bio derived oil show no improvement at zero aging time, while the sterols show a decrease in R-Value at zero time and a slower rate of R-value increase than the control binder. The change in aging profile for R-Value shows these blends to be different and better performing binders.

Figure 67:
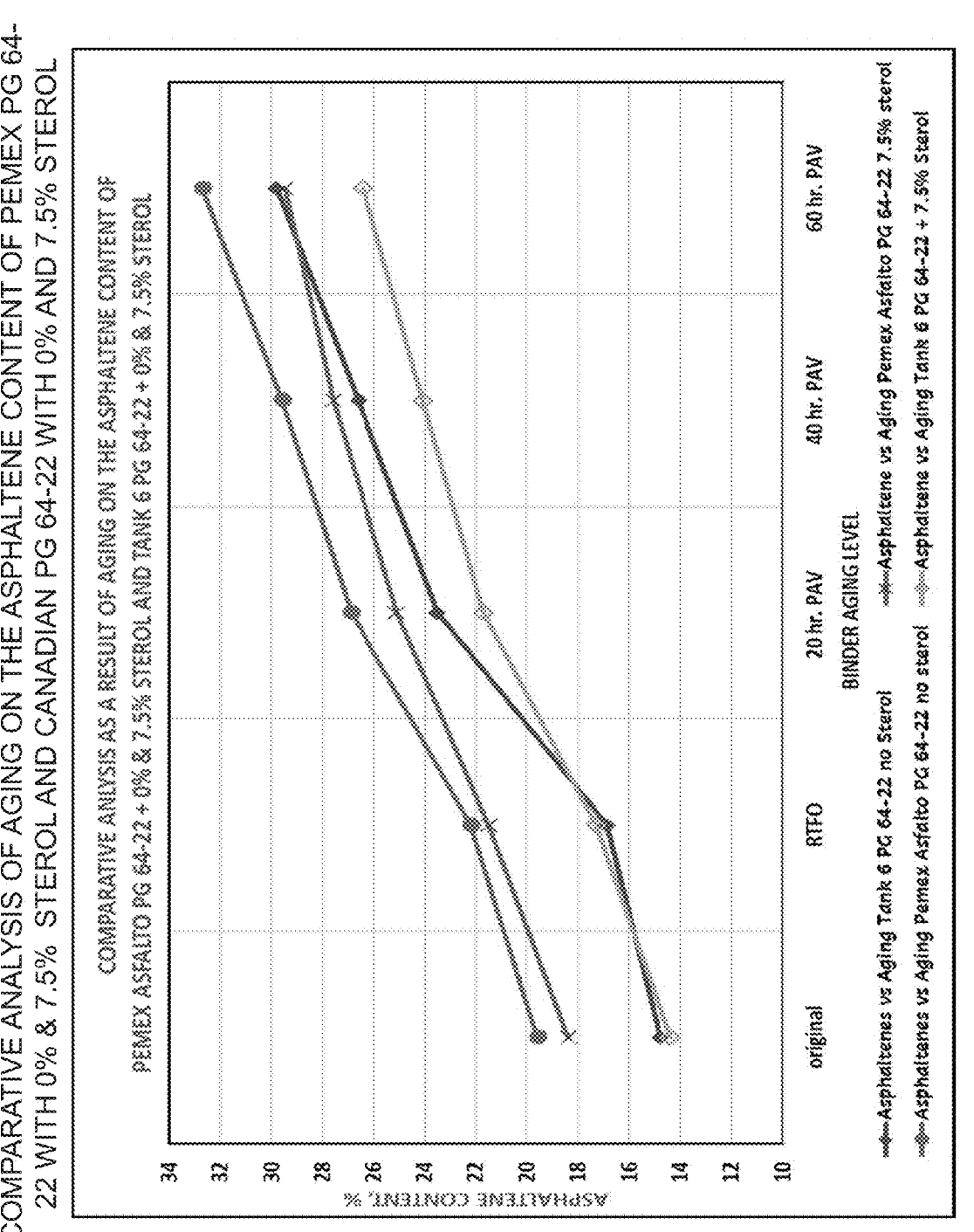
FIG. 67 is a comparative plot showing aging on asphaltene content with or with sterol.

Within this document has been shown that when sterol is added to a binder the binder is altered such that aging behavior of the sterol containing binder is improved relative to the original binder without sterol. An evaluation was performed with a PG 64-22 produced from a Mayan crude by the PEMEX refiner in Mexico and data from that binder was compared to a PG 64-22 produced from a Canadian crude in the Upper Midwest of the United States. Mayan crude-based asphalt binders age very poorly, and Canadian crude-based binders generally age well. FIG. 67 is a comparative plot showing the impact of adding 7.5% sterol into the original PG 64-22 binders from Mayan crude and Canadian crude followed by RTFO aging and PAV aging at 20, 40 and 60 hours. Each binder exhibits a unique asphaltene aging profile. The asphaltene content for each binder shows a slight increase as aging proceeds from the unaged to RTFO condition. When the 20, 40 and 60 hour PAV aging steps take place there is a noticeable increase in asphaltenes for both binders. The Mayan crude base binder however always exhibits higher asphaltene levels than the Canadian crude base binder. When 7.5% sterol is added to each binder there is change in the aging profile for each binder, especially during the PAV aging steps. Asphaltene content of the Mayan PG 64-22 with 7.5% sterol is reduced at every PAV aging condition and by 40 hours of PAV aging is within 1% asphaltenes of the Canadian PG 64-22 with no sterol and by 60 hours of aging matches the asphaltene content of the Canadian PG 64-22 with no sterol. This data shows that with sterol it is possible to effect a change in a binder and produce a binder with improved properties that are sustainable over time. Because reduced asphaltene levels are associated with better pavement performance this is positive. The Canadian PG 64-22 also benefits from 7.5% sterol addition as shown, but because that binder already exhibits good aging properties there is less need to incur the expense to further improve the Canadian crude-based PG 64-22.

Figure 68:
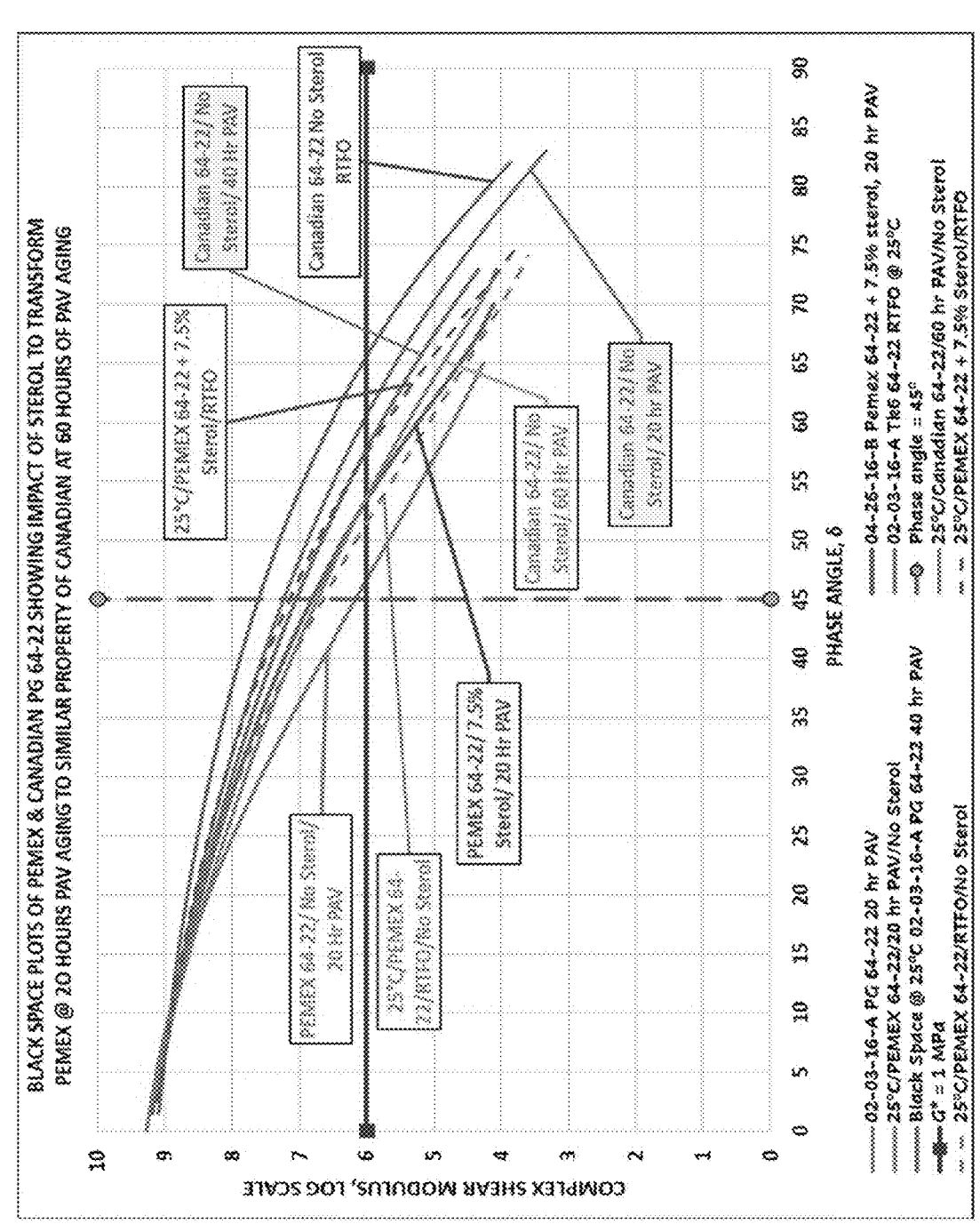
FIG. 68 shows Black Space plots of Mayan (Pemex) PG 64-22 with 7.5% sterol at different PAV aging times compared to Canadian PG 64-22 with no sterol at different PAV aging times.

FIG. 68 shows Black Space plots of Mayan (PEMEX) PG 64-22 with 7.5% sterol at different PAV aging times compared to Canadian (tank 6) PG 64-22 with no sterol at different PAV aging times. The Canadian PG 64-22 with no sterol aged for 60 hours in the PAV has Black Space plot similar to the Mayan PG 64-22 with 7.5% sterol at 20 hours PAV aging. At higher phase angle levels above about 55° the Canadian PG 64-22 Black Space plot is slightly higher in stiffness than the Mayan PG 64-22 at 20 hours of aging. This difference is slight but in keeping with the Canadian PG 64-22 having better relaxation properties than the Mayan based PG 64-22. The Mayan PG 64-22 with 7.5% sterol RTFO aged binder has Black Space plot similar to the Canadian PG 64-22 with no sterol but aged for 40 hours in the PAV. This plot overall shows how the addition of sterol can alter a binder such as the Mayan PG 64-22 to have improved properties compared to the binder without sterol.

FIG. 69 is a Black Space plot of the CITGO, MARA-THON-ASHLAND and VALERO PG 58-28 binders used on Olmsted County Minnesota research study. The 20 and 40 PAV aged binder results shown in FIG. 64 shown that these binders have unique property characteristics. For these binders their Black Space plots move to lower phase angles at any given complex shear modulus.

FIG. 70 shows Black Space plots for three of the materials discussed in FIG. 4 of this submission. Black Space plots for zero percent sterol, 7.5% sterol and 12.5% are shown for the unaged binders and the 40 hour PAV aged binders. For all three samples there are unique plots for the unaged sample and a Black Space plot for the samples after aging. The comparison to the samples in FIG. 69 is that regardless of whether binders are derived from different crude sources or modified with an additive that yields binders with unique properties that are sustainable as the additive modified binders age the result is the same; a different binder is produced due to the properties imparted by the additive.

FIG. 71 shows the Black Space plots for the unaged condition of an aged binder and sterol dosage levels of 0.5%, 2.5%, 5%, 7.5%, 10% and 12.5% blend into the aged binder. FIG. 71 shows a unique Black space plot for each dosage level with the exception that at 0.5% there is very little change in the Black Space plot indicating very little beneficial impact resulted from the low level addition.

FIG. 72 shows Black Space plots for the same samples as FIG. 71 after 60 hours of PAV aging. The relative positioning of each samples Black Space plot is maintained after this level of aging, but as has been discussed previously the Black Space plots have lower phase angles at any given complex shear modulus as a result of aging. Being able to preserve the relative uniqueness of each blend over extended aging times means that these blends are unique binders and not just samples of a binder to which some chemicals were added.

Published patent applications with publication numbers US20160362338, WO2017027096, WO2017213692, WO2017213693, WO2018031540, US20180215919, WO2018144731, and WO2019023172 are hereby incorporated by reference for all purposes.

The application is further described below with additional non-limiting embodiments:

1. An upcycled asphalt binder composition comprising, asphalt binder and sterol, wherein the asphalt binder comprises aged asphalt binder and the sterol comprises a reclaimed sterol.
2. The asphalt binder composition of embodiment 1, wherein the asphalt binder is an aged asphalt binder-containing reclaimed sterol.
3. The asphalt binder composition as in one of embodiments 1-2, wherein the aged asphalt binders is derived from reclaimed asphalt pavement (RAP), reclaimed asphalt shingles (RAS), or combinations of both.
4. The asphalt binder composition as in one of embodiments 1-3, wherein the asphalt binder composition further comprises virgin asphalt binder, aged asphalt binder, or combinations thereof.
5. The asphalt binder composition as in one of embodiments 1-4 wherein the asphalt binder composition further comprises a softening agent.

6. The asphalt binder composition as in one of embodiments 1-5, wherein softening agent further comprises bio-derived or petroleum derived oils.
7. The asphalt binder composition as in one of embodiments 1-6, wherein the sterol comprises reclaimed sterol, fresh sterol, or combinations thereof.
8. The asphalt binder composition as in one of embodiments 1-7, wherein the fresh sterol comprises pure sterol, crude sterol, or combinations thereof.
9. The asphalt binder composition as in one of embodiments 1-8, wherein the fresh sterol comprises a 5:95 to 95:5 weight ratio of pure sterol to crude sterol.
10. The asphalt binder composition as in one of embodiments 1-9, wherein the crude sterol comprises a bio-derived source or distilled residue of the bio-derived source.
11. The asphalt binder composition as in one of embodiments 1-10, wherein the crude sterol comprises a tall oil pitch.
12. The asphalt binder composition as in one of embodiments 1-11, wherein the crude sterol comprises soybean oil, corn oil or a combination thereof.
13. The asphalt binder composition as in one of embodiments 1-12, wherein the sterol comprises 0.5 to 20 wt % of the asphalt binder composition.
14. The asphalt binder composition as in one of embodiments 1-13, wherein sterol comprises campesterol, stigasterol, stigmasterol, β-sitosterol, Δ5-avenosterol, Δ7-stigasterol, Δ7-avenosterol, brassicasterol, cycloartenol, 24-methylene, citrostadienol or mixtures thereof.
15. The asphalt binder composition as in one of embodiments 1-14, wherein the sterol comprises beta-sitosterol, campesterol, stigmasterol, or mixtures thereof
16. The asphalt composition as in one of embodiments 1-15, wherein the sterol comprises 40-60% beta-sitosterol, 20-40% campesterol, 5% stigmasterol, or mixtures thereof.
17. The asphalt binder composition as in one of embodiments 1-16, further comprising added aggregate, wherein the asphalt binder composition with added aggregate is compacted over a base surface to form a paved surface.
18. The asphalt binder composition as in one of embodiments 1-17, wherein the sterol is present in an amount effective to provide a less negative ΔTc value of the aged asphalt binder composition compared to an asphalt binder composition without the sterol.
19. The asphalt binder composition as in one of embodiments 1-18, wherein the sterol retards the aging rate of the asphalt binder composition compared to a similarly aged asphalt binder composition that does not include the sterol.
20. A method of forming an upcycled asphalt binder composition comprises adding a reclaimed sterol to an asphalt binder composition, the asphalt binder composition comprising an aged asphalt binder.
21. The method of embodiment 20, wherein the asphalt binder is an aged asphalt binder-containing reclaimed sterol.
22. The method as in one of embodiments 20-21, wherein the aged asphalt binders is derived from reclaimed asphalt pavement (RAP), reclaimed asphalt shingles (RAS), or combinations of both.

23. The method as in one of embodiments 20-22, wherein the asphalt binder composition further comprises virgin asphalt binder, aged asphalt binder, or combinations thereof.

24. The method as in one of embodiments 20-23, wherein the asphalt binder composition further comprising a softening agent.

25. The method as in one of embodiments 20-24, wherein softening agent further comprises bio-derived or petroleum derived oils.

26. The method as in one of embodiments 20-25, wherein the sterol is reclaimed sterol, fresh sterol, or combinations thereof.

27. The method as in one of embodiments 20-26, wherein the fresh sterol comprises pure sterol, crude sterol, or combinations thereof.

28. The method as in one of embodiments 20-27, wherein the fresh sterol comprises a 5:95 to 95:5 weight ratio of pure sterol to crude sterol.

29. The method as in one of embodiments 20-28, wherein the crude sterol comprises a bio-derived source or distilled residue of the bio-derived source.

30. The method as in one of embodiments 20-29, wherein the crude sterol comprises a tall oil pitch.

31. The method as in one of embodiments 20-30, wherein the crude sterol comprises soybean oil, corn oil or a combination thereof.

32. The method as in one of embodiments 20-31, wherein the sterol comprises 0.5 to 20 wt % of the asphalt binder composition.

33. The method as in one of embodiments 20-32, wherein sterol comprises campesterol, stigasterol, stigmasterol, β-sitosterol, Δ5-avenosterol, Δ7-stigasterol, Δ7-avenosterol, brassicasterol, cycloartenol, 24-methylene, citrostadienol or mixtures thereof.

34. The method as in one of embodiments 20-33, wherein the sterol comprises beta-sitosterol, campesterol, stigmasterol, or mixtures thereof.

35. The method as in one of embodiments 20-34, wherein the sterol comprises 40-60% beta-sitosterol, 20-40% campesterol, 5% stigmasterol, or mixtures thereof.

36. The method as in one of embodiments 20-35, further comprising adding aggregate; and compacting the added aggregate over a base surface to form a paved surface.

37. The method as in one of embodiments 20-36, wherein the sterol additive is present in an amount effective to provide a less negative ΔTc value of the aged asphalt binder composition compared to an asphalt binder composition without the sterol additive.

38. The method as in one of embodiments 20-37, wherein the sterol additive retards the aging rate of the asphalt binder composition compared to a similarly aged asphalt binder composition that does not include the sterol.

39. A road pavement as in any one of embodiments 1-38.

The invention claimed is:

1. An upcycled asphalt binder composition comprising i) a recycled asphalt comprising reclaimed asphalt pavement (RAP), reclaimed asphalt shingles (RAS), or a combination of both RAP and RAS, the recycled asphalt containing aged asphalt binder and reclaimed sterol, ii) virgin asphalt binder, and iii) fresh sterol wherein the reclaimed sterol and fresh sterol collectively are 2.5 wt. % to 35 wt % of the collective weight of the aged asphalt binder and virgin asphalt binder, and wherein the reclaimed sterol reduces or retards an asphalt binder aging rate of the upcycled asphalt binder composition.

2. The upcycled asphalt binder composition of claim 1, wherein the reclaimed sterol is present in an amount in the range of 2.5-7.5 wt. % of the aged asphalt binder.

3. The upcycled asphalt binder composition of claim 1, wherein the reclaimed sterol is present in an amount in the range of 2.5-12.5 wt. % of the aged asphalt binder.

4. The upcycled asphalt binder composition of claim 1, wherein the reclaimed sterol is present in an amount in the range of 5-12.5 wt. % of the aged asphalt binder.

5. The upcycled asphalt binder composition of claim 1, wherein the upcycled asphalt binder composition further comprises a softening agent.

6. The upcycled asphalt binder composition of claim 1, wherein the fresh sterol is 0.5 to about 20 wt % of the upcycled asphalt binder composition.

7. The upcycled asphalt binder composition of claim 1, further comprising added aggregate.

8. The upcycled asphalt binder composition of claim 1, wherein the reclaimed sterol and fresh sterol are present in an amount effective to provide a less negative ΔTc value of the upcycled asphalt binder composition compared to an asphalt binder composition without the reclaimed sterol and fresh sterol.

9. A method of forming an upcycled asphalt binder composition comprising mixing i) a recycled asphalt comprising reclaimed asphalt pavement (RAP), reclaimed asphalt shingles (RAS), or a combination of both RAP and RAS, wherein the recycled asphalt contains aged asphalt binder and reclaimed sterol, (ii) virgin asphalt binder, and iii) fresh sterol to form the upcycled asphalt binder composition, wherein the aged sterol reduces or retards an asphalt binder aging rate of the upcycled asphalt binder composition, and wherein the reclaimed sterol and fresh sterol collectively are 2.5 wt. % to 35 wt % of the collective weight of the aged asphalt binder and virgin asphalt binder.

10. The method of claim 9, wherein the upcycled asphalt binder composition further comprises a softening agent.

11. The method of claim 9, wherein the fresh sterol is 0.5 to 20 wt % of the upcycled asphalt binder composition.

12. A method of forming a paved surface comprising mixing the upcycled asphalt binder composition of claim 9 with added aggregate to provide a paving mixture and compacting the paving mixture over a base surface to form a paved surface.

13. The method of claim 9, wherein the reclaimed sterol is present in an amount effective to provide a less negative ΔTc value of the upcycled asphalt binder composition compared to an upcycled asphalt binder composition without the reclaimed sterol.

14. An upcycled asphalt binder composition comprising i) recycled asphalt comprising reclaimed asphalt pavement (RAP), reclaimed asphalt shingles (RAS), or combinations of both RAP and RAS, the recycled asphalt containing, aged asphalt binder and reclaimed sterol, ii) virgin asphalt binder, and iii) fresh sterol, and wherein the reclaimed sterol and the fresh sterol collectively are 2.5 wt. % to 35 wt. % of collective weight of the aged asphalt binder and virgin asphalt binder, and wherein both the reclaimed sterol and fresh sterol reduce or retard an asphalt binder aging rate of the upcycled asphalt binder composition.

15. The upcycled asphalt binder composition of claim 14, comprising a ratio of reclaimed sterol to fresh sterol in the range of 5:95 to 95:5.

* * * * *